United States Patent
Raizen et al.

(10) Patent No.: US 8,261,068 B1
(45) Date of Patent: Sep. 4, 2012

(54) SYSTEMS AND METHODS FOR SELECTIVE ENCRYPTION OF OPERATING SYSTEM METADATA FOR HOST-BASED ENCRYPTION OF DATA AT REST ON A LOGICAL UNIT

(75) Inventors: Helen S. Raizen, Jamaica Plain, MA (US); John Harwood, Paxton, MA (US); Michael E. Bappe, Loveland, CO (US); Sathiyamoorthy Kothandan, Woburn, MA (US); Edith Epstein, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 613 days.

(21) Appl. No.: 12/242,638

(22) Filed: Sep. 30, 2008

(51) Int. Cl.
*G06F 21/00* (2006.01)

(52) U.S. Cl. ......... 713/165; 713/164; 713/189; 713/193

(58) Field of Classification Search .................. None
See application file for complete search history.

(56) References Cited

U.S. PATENT DOCUMENTS

| | | | |
|---|---|---|---|
| 5,742,792 A | 4/1998 | Yanai et al. | |
| 5,995,511 A | 11/1999 | Zhou et al. | |
| 6,101,497 A | 8/2000 | Ofek | |
| 6,145,028 A | 11/2000 | Shank et al. | |
| 6,230,229 B1 | 5/2001 | Van Krevelen et al. | |
| 6,249,866 B1 * | 6/2001 | Brundrett et al. | 713/165 |
| 6,408,348 B1 | 6/2002 | Blount et al. | |
| 6,434,637 B1 | 8/2002 | D'Errico | |
| 6,493,772 B1 | 12/2002 | Hughes | |
| 6,542,944 B2 | 4/2003 | D'Errico | |
| 6,542,994 B1 | 4/2003 | Dircks et al. | |
| 6,564,336 B1 | 5/2003 | Majkowski | |
| 6,629,189 B1 | 9/2003 | Sandstrom et al. | |
| 6,810,398 B2 | 10/2004 | Moulton | |
| 6,883,049 B1 | 4/2005 | Fuld et al. | |
| 6,947,556 B1 | 9/2005 | Matyas, Jr. et al. | |
| 6,973,529 B2 | 12/2005 | Casper et al. | |
| 7,032,041 B2 | 4/2006 | Sahara et al. | |
| 7,065,619 B1 | 6/2006 | Zhu et al. | |
| 7,076,690 B1 | 7/2006 | Todd et al. | |
| 7,080,221 B1 | 7/2006 | Todd et al. | |
| 7,080,225 B1 | 7/2006 | Todd | |

(Continued)

OTHER PUBLICATIONS

EMC Corporation, EMC Invista Deployment Scenarios, by M. Waxman and B. Carr, EMC World Boston 2006, 31 pages.

(Continued)

*Primary Examiner* — Nathan Flynn
*Assistant Examiner* — Michael R Vaughan
(74) *Attorney, Agent, or Firm* — Daly, Crowley, Mofford & Durkee, LLP

(57) ABSTRACT

A method is provided for providing an operating system (OS) independent input/output (I/O) filter driver capable of encrypting at least a portion of a logical unit (LUN), the method comprising the unordered steps of: providing an I/O filter driver component to an I/O stack for a host in communication with the LUN; determining, based at least in part on at least one of OS requirements and an arrangement of data on the LUN, at least one region in the LUN that contains data that is used below the I/O filter driver in an I/O stack on the host; and performing at least one of a read and a write of the one or more regions while keeping the one or more regions in plaintext, while permitting other regions of the LUN to be at least one of encrypted and decrypted.

20 Claims, 21 Drawing Sheets

U.S. PATENT DOCUMENTS

| | | | |
|---|---|---|---|
| 7,093,088 B1 | 8/2006 | Todd et al. | |
| 7,130,928 B2 | 10/2006 | Hayashi et al. | |
| 7,143,251 B1 | 11/2006 | Patterson | |
| 7,146,499 B2 | 12/2006 | Yellepeddy | |
| 7,206,863 B1 | 4/2007 | Oliveira et al. | |
| 7,240,135 B2 | 7/2007 | Bai et al. | |
| 7,272,602 B2 | 9/2007 | Moulton | |
| 7,305,532 B2 | 12/2007 | Zhu et al. | |
| 7,337,235 B2 | 2/2008 | Allen et al. | |
| 7,362,868 B2 | 4/2008 | Madoukh et al. | |
| 7,424,498 B1 | 9/2008 | Patterson | |
| 7,451,168 B1 | 11/2008 | Patterson | |
| 7,469,313 B1 | 12/2008 | Venkatanarayanan et al. | |
| 7,472,242 B1 | 12/2008 | Deshmukh et al. | |
| 7,500,246 B2 | 3/2009 | Saake et al. | |
| 7,519,635 B1 | 4/2009 | Haustein et al. | |
| 7,526,623 B1 | 4/2009 | Rao | |
| 7,536,503 B1 | 5/2009 | Venkatanarayanan et al. | |
| 7,539,710 B1 | 5/2009 | Haustein et al. | |
| 7,558,916 B2 | 7/2009 | Chikusa et al. | |
| 7,562,186 B2 | 7/2009 | Li et al. | |
| 7,567,188 B1 | 7/2009 | Anglin et al. | |
| 7,568,052 B1 | 7/2009 | Cwiakala et al. | |
| 7,594,085 B1 | 9/2009 | Rao | |
| 7,603,529 B1 | 10/2009 | MacHardy et al. | |
| 7,603,532 B2 | 10/2009 | Rajan et al. | |
| 7,747,584 B1 | 6/2010 | Jernigan | |
| 7,770,053 B1 | 8/2010 | Bappe et al. | |
| 7,809,912 B1 | 10/2010 | Raizen et al. | |
| 7,904,681 B1 | 3/2011 | Bappe et al. | |
| 7,957,398 B1 | 6/2011 | Yochai et al. | |
| 7,958,372 B1* | 6/2011 | Natanzon | 713/189 |
| 7,984,022 B2 | 7/2011 | Cannon et al. | |
| 8,166,314 B1* | 4/2012 | Raizen et al. | 713/193 |
| 8,171,098 B1* | 5/2012 | Zelikov et al. | 709/213 |
| 2002/0099944 A1* | 7/2002 | Bowlin | 713/185 |
| 2002/0133512 A1 | 9/2002 | Milillo et al. | |
| 2002/0166005 A1 | 11/2002 | Errico | |
| 2003/0056095 A1* | 3/2003 | Elliott et al. | 713/164 |
| 2003/0065871 A1 | 4/2003 | Casper et al. | |
| 2003/0105734 A1* | 6/2003 | Hitchen et al. | 707/1 |
| 2003/0140209 A1 | 7/2003 | Testardi | |
| 2003/0177290 A1 | 9/2003 | Ayukawa et al. | |
| 2003/0226059 A1 | 12/2003 | Braun | |
| 2004/0042489 A1 | 3/2004 | Messick et al. | |
| 2004/0080558 A1 | 4/2004 | Blumenau et al. | |
| 2004/0250021 A1 | 12/2004 | Honda et al. | |
| 2005/0076154 A1 | 4/2005 | Chambliss et al. | |
| 2005/0086501 A1* | 4/2005 | Woo et al. | 713/189 |
| 2005/0108304 A1 | 5/2005 | Wilson et al. | |
| 2005/0114286 A1 | 5/2005 | Bai et al. | |
| 2005/0138308 A1 | 6/2005 | Morishita et al. | |
| 2005/0144199 A2 | 6/2005 | Hayden | |
| 2005/0144332 A1 | 6/2005 | Nellitheertha | |
| 2005/0172094 A1 | 8/2005 | Goodwin | |
| 2005/0228950 A1 | 10/2005 | Karr | |
| 2005/0235132 A1 | 10/2005 | Karr et al. | |
| 2005/0278465 A1 | 12/2005 | Qi | |
| 2005/0283552 A1 | 12/2005 | Kobashi et al. | |
| 2006/0069862 A1 | 3/2006 | Kano | |
| 2006/0095686 A1 | 5/2006 | Miller et al. | |
| 2006/0150247 A1* | 7/2006 | Gafken | 726/17 |
| 2006/0195704 A1* | 8/2006 | Cochran et al. | 713/193 |
| 2007/0061373 A1 | 3/2007 | Kilday | |
| 2007/0079095 A1* | 4/2007 | Hanley | 711/163 |
| 2007/0150956 A1* | 6/2007 | Sharma et al. | 726/24 |
| 2007/0168569 A1 | 7/2007 | Bonwick et al. | |
| 2007/0226519 A1* | 9/2007 | Elbring | 713/190 |
| 2007/0233707 A1 | 10/2007 | Osmond et al. | |
| 2008/0034268 A1 | 2/2008 | Dodd et al. | |
| 2008/0162735 A1 | 7/2008 | Voigt et al. | |
| 2008/0184001 A1 | 7/2008 | Stager | |
| 2008/0209448 A1 | 8/2008 | Ayres et al. | |
| 2008/0232592 A1 | 9/2008 | Lee et al. | |
| 2008/0244172 A1 | 10/2008 | Kano | |
| 2008/0250178 A1 | 10/2008 | Haustein et al. | |
| 2008/0282047 A1 | 11/2008 | Arakawa et al. | |
| 2008/0295174 A1* | 11/2008 | Fahmy et al. | 726/23 |
| 2009/0049217 A1 | 2/2009 | Shimada | |
| 2009/0049260 A1 | 2/2009 | Upadhyayula | |
| 2009/0063528 A1 | 3/2009 | Yueh | |
| 2009/0063795 A1 | 3/2009 | Yueh | |
| 2009/0076849 A1* | 3/2009 | Diller | 705/3 |
| 2009/0119449 A1 | 5/2009 | Chengal | |
| 2009/0193223 A1 | 7/2009 | Saliba et al. | |
| 2009/0198805 A1 | 8/2009 | Ben-Shaul et al. | |
| 2009/0216774 A1 | 8/2009 | Rao et al. | |
| 2009/0216788 A1 | 8/2009 | Rao et al. | |
| 2009/0235022 A1 | 9/2009 | Bates et al. | |
| 2009/0276595 A1* | 11/2009 | Abzarian et al. | 711/163 |
| 2009/0327720 A1* | 12/2009 | Cathro | 713/168 |
| 2010/0031056 A1* | 2/2010 | Harada | 713/193 |
| 2010/0250896 A1 | 9/2010 | Matze | |

OTHER PUBLICATIONS

EMC Corporation, Non-disruptive Data Migration with PowerPath Migration Enabler—a breakthrough technology from EMC, by J. Crum and H. Raizen, EMC World Boston 2006, 26 pages.

EMC Corporation, EMC plans array-based encryption via PowerPath, Feb. 8, 2007, ComputerWeekly.com. http://www.computerweekly.com/Articles/ArticlePge.aspx?ArticleID=221890&PrinterFriendly=true.

EMC Corporation, EMC Adds Disk Encryption to Security Portfolio, Heidi Biggar, Apr. 2008, Enterprise Strategy Group, Inc. http://www.emc.com/collateral/analyst-reports/esg-disc-encryption-security-portfolio.pdf.

Encrypting Data at Rest, Stacy Collett, Mar. 27, 2006, Computerworld. http://www.computerworld.com/action/article.do?command=printArticleBasic&articleId=109826.

EMC Corporation White Paper, Approaches for encryption of Data-at-Rest in the Enterprise, A Detailed Review, Jan. 2008, pp. 1-24. Part No. H4173. http://www.emc.com/collateral/hardware/white-papers/h4173-approaches-encryption-data-at-rest-enterprise-wp.pdf.

Guide to Storage Encryption Technologies for End User Devices, Karen Scarfone, Murugiah Souppaya and Matt Sexton, National Institute of Standards and Technology, U.S. Department of Commerce Special Publication 800-111, Nov. 2007. http://csrc.nist.gov/publications/histpubs/800-111/SP800-111.pdf.

EMC Corporation, PowerPath® Encryption with RSA, The EMC Solution for Securing Data in Enterprise Storage, Aug. 2008. http://www.emc.com/collateral/software/white-papers/rkmpp-sb-0808-lowres.pdf.

EMC Corporation, Press Release: EMC Strengthens Disk-Based Security with New Encryption Capabilities, Hopkinton, MA, Apr. 8, 2008. http://www.emc.com/about/news/press/2008/20080408-02.htm.

U.S. Appl. No. 11/478,897, Prakash Venkatanarayanan, et al., filed Jun. 30, 2006, file through Mar. 10, 2009, 100 pages.

U.S. Appl. No. 11/478,946, Prakash Venkatanarayanan, et al., filed Jun. 30, 2006, file through Mar. 10, 2009, 291 pages.

U.S. Appl. No. 11/536,995, Helen S. Raizen, et al., filed Sep. 29, 2006, file through Mar. 10, 2009, 541 pages.

U.S. Appl. No. 11/863,745, Bradford B. Glade, et al., filed Sep. 28, 2007, file through Mar. 10, 2009, 541 pages.

U.S. Appl. No. 11/682,049, Yechiel Yochai, et al., filed Mar. 5, 2007, file through Mar. 10, 2009, 123 pages.

U.S. Appl. No. 11/607,067, Michael E. Bappe, et al., filed Dec. 1, 2006, file through Mar. 10, 2009, 544 pages.

U.S. Appl. No. 11/427,889, Michael E. Bappe, et al., filed Jun. 30, 2006, file through Mar. 10, 2009, 156 pages.

U.S. Appl. No. 12/242,690, Helen S. Raizen, et al., filed Sep. 30, 2008, file through Mar. 10, 2009, 152 pages.

Office Action dated Mar. 7, 2012, U.S. Appl. No. 12/242,690, filed Sep. 30, 2008.

Final Office Action dated Jun. 18, 2012, U.S. Appl. No. 12/242,690, filed Sep. 30, 2008, 5 pages.

Press Release, EMC Expands Data Deduplication Capabilities to Industry's Broadest Backup Portfolio, http://www.emc.com/about/news/press/2009/20090519-01.htm, dated Oct. 19, 2009, 3 pages.

Lauren Whitehouse, Data Backup Tips: Backup and Recovery, Data Deduplication Methods Block-level versus byte-level dedupe, http:// searchdatabackup.techtarget.com/tip/0,289483,sid187_gci1335090,000.html, dated Oct. 19, 2009, 3 pages.
Joe Spurr, Data Center News: Deduping: an essential backup tool in the data center?, http://searchdatacenter.techtarget.com/news/article/0,289142,sid80_gci1192939,00.html, dated Oct. 19, 2009, 3 pages.
BitWackr™—Data Deduplication for Microsoft Windows Servers, Hardware-Assisted Data Deduplication and Compression with Thin Provisioning, Plug and Play Deduplication, HIFN, www.hifn.com, 2009, 2 pages.
Deduping Your Way to Storage Efficiency, Data Deduplication Cuts Down on Repeated Data, Processor, Cover Focus Articles, General Information Jan. 26, 2007, vol. 29, Issue 4, http://www.processsor.com/editorial/PrntArticle.asp?prnt=1&article=aricles%2FP2904%2F21p04%2F2, Oct. 24, 2009 4 pages.
IDC White Paper, Data Deduplication for Backup: Accelerating Efficiency and Driving Down IT Costs, Sponsored by EMC Corporation, Laura DuBois, May 2009, www.idc.com, 16 pages.
EMC White Paper, Optimized Backup and Recovery for Vmware Infrastructure with EMC Avamar, Vmware, Inc. www.vmware.com, Revision 2007, 11 pages.
EMC White Paper, Data Sheet, EMC CLARiion CX4: the Best Energy Efficiency in Midrange Storage, "EMC CLARiiON Virtual Provisioning", Applied Technology, Sep. 2009, www.emc.com, 23 pages.
EMC White Paper, EMC Perspective, An EMC Perspective on Data De-Duplication for Backup, www.emc.com, 2008, 11 pages.
EMC White Paper, Implementing Virtual Provisioning on EMC CLARiiON and Celerra with Vmware Infrastructure, Applied Technology, Feb. 2009, 49 pages.
EMC White Paper, Optimized Vmware Backup and Recovery with EMC Avamar and EMC CLARiiON Replication Technology, Applied Technology, Dec. 2008, 15 pages.
EMC White Paper, Data Sheet, Next-generation backup and recovery with global, source data deduplication, www.EMC.com, 2007, 2009, 4 pages.
EMC Avamar—Backup and Recovery Product—EMC, www.emc.com/products/detail/software/avamar.htm, Oct. 19, 2009, 3 pages.
EMC Avamar, ESG Lab Validation Report, Revolutionizing Backup and Recovery, by Brian Garrett, May 2008, 21 pages.
EMC White Paper, ESG, Disk Backup and EMC: Addressing Today's Business Problems by Heidi Biggar, May 2008, 9 pages.
EMC White Paper, Virtual Provisioning Options for EMC Unified Storage Platforms, A Detailed Review, Sep. 2009, 20 pages.
Dell/EMC CX4 Virtual Provisioning Overview, Dell Inc., www.Dell.com, Aug. 2008, 14 pages.
EMC White Paper, EMC Centera, Optimizing Archive Efficiency, by Terri McClure with Brian Garrett, Jan. 2009, 11 pages.
EMC White Paper, Implementing Virtual Provisioning on EMC Symmetrix DMX with Vmware Virtual Infrastructure, Vmware, Inc., www.vmware.com, 2008, 30 pages.
Response to Office Action dated Aug. 18, 2011, for U.S. Appl. No. 12/346,412, filed Dec. 30, 2008, 21 pages.
Helen S. Raizen, et. All, U.S. Appl. No. 12/642,071, filed Dec. 18, 2009, et al., 92 pages.
Office Action dated Oct. 11, 2011 for U.S. Appl. No. 12/642,071, Helen S. Raizen, et al., 10 pages.
Response to Office Action dated Oct. 11, 2011 for U.S. Appl. No. 12/642,071, Helen S. Raizen, et al., 10 pages.
Notice of Allowance dated Dec. 12, 2011 for U.S. Appl. No. 12/642,071, Helen S. Raizen, et al., 5 pages.
Helen S. Raizen, et. All, U.S. Appl. No. 12/642,109, filed Dec. 18, 2009, et al., 88 pages.
Office Action dated Oct. 11, 2011 for U.S. Appl. No. 12/642,109, Helen S. Raizen, et al.,10 pages.
Response to Office Action dated Oct. 11, 2011 for U.S. Appl. No. 12/642,109, Helen S. Raizen, et al., 7 pages.
Notice of Allowance dated Dec. 14, 2011 for U.S. Appl. No. 12/642,109, Helen S. Raizen, et al., 5 pages.
"Approaches for Encryption of Data-at-Rest in the Enterprise *A Detailed Review*"; EMC Corporation, Part No. H4173; Jan. 2008, pp. 1-24.
"Securing data at rest white paper, An enterprise strategy for data encryption and key management"; Hewlett-Packard Development Company, L.P. 4AA1-617OENW, Oct. 2007, pp. 1-8.
U.S. Appl. No. 12/242,690, Helen S. Raizen, et al., filed Sep. 30, 2008 file from Mar. 11, 2009 through Oct. 11, 2011, 299 pages, Part1.
U.S. Appl. No. 12/242,690, Helen S. Raizen, et al., filed Sep. 30, 2008 file from Mar. 11, 2009 through Oct. 11, 2011, 308 pages, Part2.
U.S. Appl. No. 12/242,690, Helen S. Raizen, et al., filed Sep. 30, 2008 file from Mar. 11, 2009 through Oct. 11, 2011, 272 pages, Part3.
U.S. Appl. No. 12/242,690, Helen S. Raizen, et al., filed Sep. 30, 2008 file from Mar. 11, 2009 through Oct. 11, 2011, 395 pages, Part4.
U.S. Appl. No. 12/242,690, Helen S. Raizen, et al., filed Sep. 30, 2008 file from Mar. 11, 2009 through Oct. 11, 2011, 270 pages, Part5.
U.S. Appl. No. 12/242,690, Helen S. Raizen, et al., filed Sep. 30, 2008 file from Mar. 11, 2009 through Oct. 11, 2011, 269 pages, Part6.
U.S. Appl. No. 12/242,690, Helen S. Raizen, et al., filed Sep. 30, 2008 file from Mar. 11, 2009 through Oct. 11, 2011, 272 pages, Part7.
U.S. Appl. No. 12/242,690, Helen S. Raizen, et al., filed Sep. 30, 2008 file from Mar. 11, 2009 through Oct. 11, 2011, 562 pages, Part8.
U.S. Appl. No. 12/242,690, Helen S. Raizen, et al., filed Sep. 30, 2008 file from Mar. 11, 2009 through Oct. 11, 2011, 205 pages, Part9a.
U.S. Appl. No. 12/242,690, Helen S. Raizen, et al., filed Sep. 30, 2008 file from Mar. 11, 2009 through Oct. 11, 2011, 190 pages, Part9b.
U.S. Appl. No. 12/242,690, Helen S. Raizen, et al., filed Sep. 30, 2008 file from Mar. 11, 2009 through Oct. 11, 2011, 441 pages, Part10.
U.S. Appl. No. 11/863,745, Bradford B. Glade, et al., filed Sep. 28, 2007, file from Mar. 11, 2009 through Sep. 26, 2011, 151 pages.
U.S. Appl. No. 13/096,397, filed Apr. 28, 2011, 93 pages.
U.S. Appl. No. 12/346,412, filed Dec. 30, 2008, 233 pages, Part1.
U.S. Appl. No. 12/346,412, filed Dec. 30, 2008, 162 pages, Part2.
U.S. Appl. No. 12/346,412, filed Dec. 30, 2008, 562 pages, Part3.
U.S. Appl. No. 12/346,412, filed Dec. 30, 2008, 272 pages, Part4a.
U.S. Appl. No. 12/346,412, filed Dec. 30, 2008, 269 pages, Part4b.
U.S. Appl. No. 12/346,412, filed Dec. 30, 2008, 270 pages, Part5.
U.S. Appl. No. 12/346,412, filed Dec. 30, 2008, 395 pages, Part6.
U.S. Appl. No. 12/346,412, filed Dec. 30, 2008, 272 pages, Part7.
U.S. Appl. No. 12/346,412, filed Dec. 30, 2008, 308 pages, Part8.
U.S. Appl. No. 12/346,412, filed Dec. 30, 2008, 285 pages, Part9.
U.S. Appl. No. 12/642,071, filed Dec. 18, 2009, 173 pages, Part1.
U.S. Appl. No. 12/642,071, filed Dec. 18, 2009, 174 pages, Part2.
U.S. Appl. No. 12/642,071, filed Dec. 18, 2009, 174 pages, Part3.
U.S. Appl. No. 12/642,109, filed Dec. 18, 2009, 169 pages, Part1.
U.S. Appl. No. 12/642,109, filed Dec. 18, 2009, 169 pages, Part2.
U.S. Appl. No. 12/642,109, filed Dec. 18, 2009, 170 pages, Part3.
Response to Office Action dated Mar. 7, 2012, U.S. Appl. No. 12/242,690, filed Sep. 30, 2008, 173 pages.

* cited by examiner

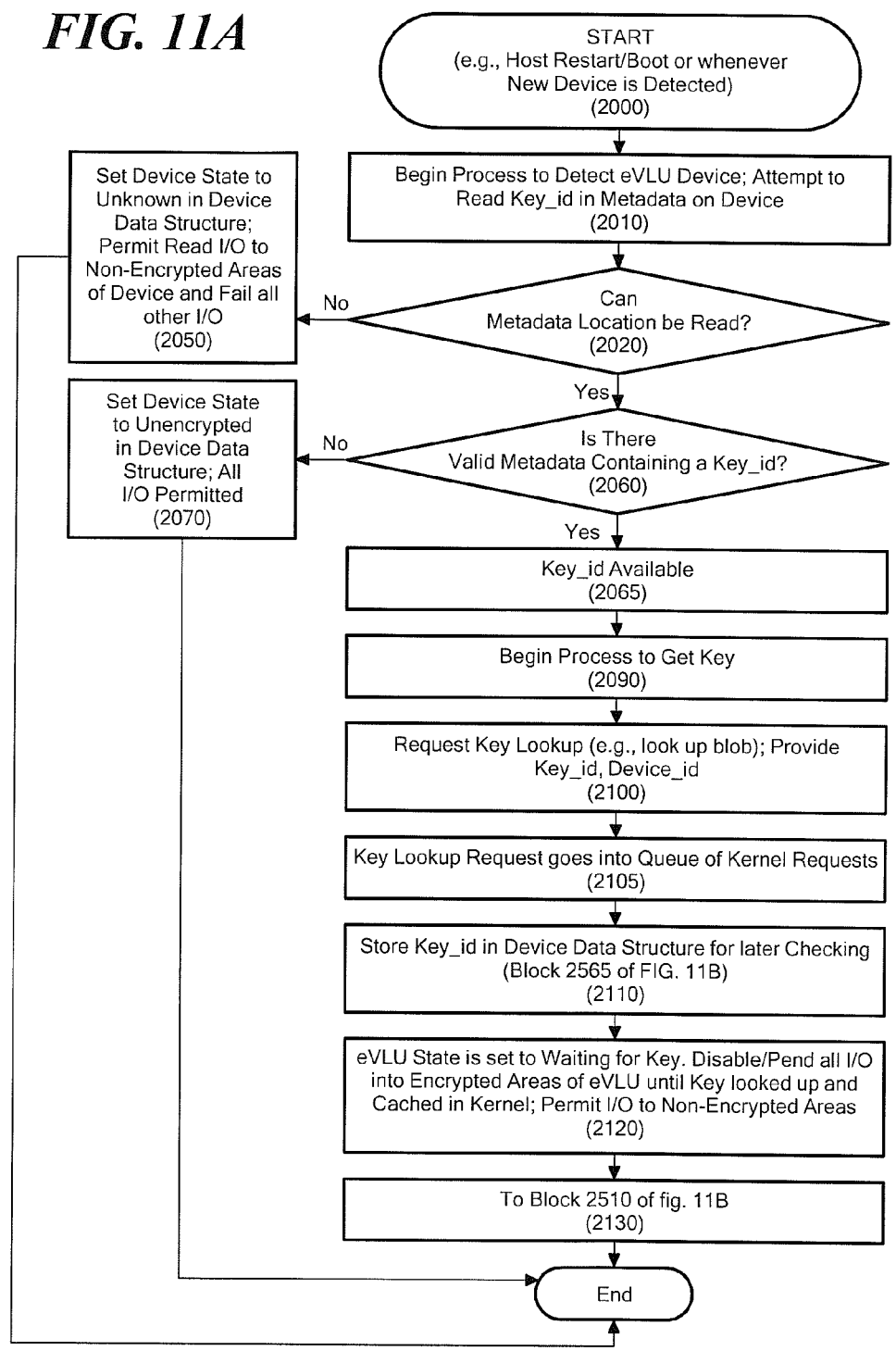

SYSTEMS AND METHODS FOR SELECTIVE ENCRYPTION OF OPERATING SYSTEM METADATA FOR HOST-BASED ENCRYPTION OF DATA AT REST ON A LOGICAL UNIT

CROSS REFERENCE TO RELATED APPLICATIONS

This application is related to the following commonly assigned United States Patent Applications and/or United States Patents, each of which is hereby incorporated by reference: Helen S. Raizen, David Freund, Michael Bappe, and Jack Harwood, "SYSTEMS AND METHODS FOR ACCESSING STORAGE OR NETWORK BASED REPLICAS OF ENCRYPTED VOLUMES WITH NO ADDITIONAL KEY MANAGEMENT", Ser. No. 12/242,690, filed Sep. 30, 2008; and Prakash Venkatanarayanan et. al, "Methods and Systems for Preserving Disk Geometry of Virtualized Data Volumes," application Ser. No. 11/478,897, filed Jun. 30, 2006, allowed Sep. 9, 2008, U.S. Pat. No. 7,469,313.

It is expressly contemplated that that the invention described herein can be combined and/or implemented together with any one or more of the above incorporated-by-reference patent applications.

FIELD OF THE INVENTION

Embodiments of the invention generally relate to devices, systems, and methods for data storage in computer systems. More particularly, the invention relates to systems and methods for transparent encryption and decryption of data being written to and read from logical units and for replication of encrypted logical units.

BACKGROUND OF THE INVENTION

Protecting confidential data (such as medical records, financial records, personal data, social security numbers, credit card numbers, corporate records, intellectual property, etc.) and other sensitive information from theft and/or unauthorized access is becoming increasingly important to businesses, computer users, and government organizations. Confidential data can exist as so-called "data-at-rest", which is data stored on some type of a storage system such as an array or tape), as well as "data in flight," (also referred to as "data in motion" or "data in transit") which includes data as it exists during its transmission or that is temporarily residing in computer memory to be read or updated).

In recent years there have been numerous examples of security breaches involving thefts of both data-at-rest and data in motion from tens of millions of users. Information technology (IT) professionals use various methods to help prevent such data theft. Currently, different techniques are used to protect data in motion as compared with protection of data at rest. For example, secure sockets layers (SSL), virtual private networks (VPNs) and combinations of these are two examples of security technologies that can be fairly effective in protecting and securing data in flight, especially when combined with other methods that protect that data from start to finish, such as message level security and application level security. Data at rest, however, requires different types of protection. Because of data mobility, data storage consolidation, and data replication, a single breach into data at rest can compromise many millions more records than with a single breach of data in flight.

Organizations have many options for securing data-at-rest, including authentication controls, logical separation, physical security, and encryption of information. Although each option has advantages and disadvantages, when extremely large amounts of data are involved, encryption can provide the most workable solution. Encryption of data, as is well known, involves converting data to an unintelligible form called ciphertext, which cannot be read unless a key is used to decrypt the data (in some types of encryption the same key also is used to encrypt the data). Encryption also can be an important way to protect data at rest in other situations, including the electronic and physical movement of data for backup, data recovery, and/or maintenance. In addition, encryption helps to limit exposure to security breaches, so even if someone is able to access the storage media, the data is still protected to prevent unauthorized access to sensitive information on the storage media. Use of encryption also helps address compliance with industry regulations that require encryption, such as the payment card industry Data Security Standard (PCI/DSS), the Sarbanes-Oxley Act, the Gramm-Leach Bliley Act (GLBA), the Health Insurance Portability and Accountability Act (HIPAA), the United Kingdom Data Protection act (UK DPA), the European Union Directive on personal information, (95/46/EC,), various state statutes protecting personal information such as California's CA 1798, and the like.

The best place to implement encryption in a computer system, especially a networked or enterprise computer system, can vary depending on the use case and/or the customer. For example, in an enterprise-level computer system, encryption can be provided at the application level, the host or operating system level, within the network, and/or at the level where the physical device resides.

Encrypting at the application level allows for a significant amount of control over the encryption process, because application users can dictate how to classify information, who can access it, and when. In addition, application level encryption allows for granular, specific information to be secured as it leaves the application. However, encrypting at the application level has several disadvantages. For example, one disadvantage of application based encryption is that it requires modification of the application, which can be costly, time consuming, and difficult to implement, especially if lots of legacy data that needs to be encrypted is involved.

Another disadvantage is that application-based encryption does not take into account the impact of the encryption it provides on replicated data (especially backed up or mirrored data, data stored for disaster recovery purposes, etc.). Data that is written by one application and encrypted cannot be used by another application without the first application also decrypting the data or providing a consistent encryption/key management interface for applications to share data. This makes some use cases of replication more difficult. Also, for Disaster Recovery, the application would have to be configured to use the same key(s) on both sites, resulting in an extra management step.

Network-based encryption may be appropriate when network or storage level threats are a concern to the organization, and network-based encryption offloads the cost of encryption from the host. Here, a network appliance can be used to present an unencrypted side and an encrypted side to the network. Network-based encryption also presents challenges when coupled with storage-based functionality such as replication. In particular, network-level encryption doesn't take into account its impact on replicated data. Any locally replicated information in storage (e.g., a mirror or clone) does not have visibility into the network device management and the keys, and the network device does not have visibility into the replication process. Key management can become more complex and require more manual intervention, as well as coordination between the security and storage domains, which is time consuming and more expensive.

Encryption done where the physical device resides, such as encryption on intelligent arrays, includes encryption of storage media such as arrays, disks, or tapes, which protects sensitive information residing on the storage media. Data written to the physical device is encrypted and stored as such and is decrypted when read from the device. Encryption done where the physical device resides is application and host independent and can be transport-independent, as well. This type of encryption can be advantageous when theft of the storage media is a concern. However, because data is decrypted immediately off the storage media when accessed, security breaches can occur throughout the network, on the host and at the application. Keys can be acquired at the disk or tape level.

Tape encryption also presents key management challenges. For example, tapes may be stored for an extended period of time before an attempt is made to recover information. During the normal process of managing encrypted data, the program that originally wrote the tapes (e.g., an archiving application) may have re-keyed the data on tape, updating all data on the tape to a new key. Doing this would present the application with active "live" data using one key and data on tape using an older key. For example, one problem arises when the "live" data is stored with a newer key and the user wants to restore some older data from tape that was stored with a different key. This rekeying problem exists with any data which is archived in an encrypted form but the archiving application is not in charge of the encryption. It can be difficult to manage keys for the lifetime of the data, regardless of where the data is stored. A tape can be restored using any number of tape drives, each of which would need access to a key. Another issue is that because tapes are transportable, keys must be as well. If an encrypted tape is replicated, association of the correct key with the replica needs to be done manually, adding an extra step and burden.

Organizations have sometimes been reluctant to deploy encryption of data at rest for various reasons. Some reasons include the complexity of managing many keys, the need to add extra steps to existing processes for data storage (which can be difficult and time consuming, especially if existing management scripts for replication need to be modified), the expense, the time, and (for some implementations), the need to add one or more appliances to a network. Other issues with deployment of encryption include management complexity (the cost and complexity associated with deploying and managing multiple encryption technologies and key manager); scalability across an enterprise (many "point' solutions for encryption do not scale across application types or infrastructure elements) and disruption to service levels (installing encryption technologies and appliances may require a network outage and/or reconfiguration).

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Encrypting in the host below the applications (or encrypting in the network or encrypting on the array) is simpler to deploy than techniques such as application level encryption, because applications don't have to be modified and the same encryption deployment can benefit multiple applications. Other advantages include that implementation can be immediate and non-disruptive, requiring no application or hardware modifications. Host-based encryption involves encrypting information on host-based systems, and host-based encryption is deployed between storage systems and a server/ host. Host-based encryption can be done in software using host processing resources and encryption keys stored in host memory. Alternatively, the host can be configured to offload encryption to specialized hardware. For example, a host bus adaptor (HBA) resident on the host can dedicate encryption to a particular transport connection from the host, such as Fibre Channel.

With host-based encryption, encryption can be performed at the file level for all applications running on a host. In some instances, implementations of host-based encryption can be implemented to encrypt any data leaving the host as files, blocks, or objects. For example, in accordance with one embodiment of the invention, a host-based implementation operating on a logical unit, at the block level is provided by providing the encryption as part of an operating system (OS) independent input/output (I/O) filter system with I/O filter driver, such as the EMC POWERPATH ENCRYPTION with RSA product, available from EMC Corporation of Hopkinton, Mass. As is explained further herein, however, the invention is not limited to providing the I/O filter system with I/O filter driver as part of a host-based implementation. In other embodiments, the invention is implemented in other environments where I/O filtering is or can be used, including but not limited to in a switch, in a virtualization appliance, in a network, and in an intelligent array of storage.

If the encryption is implemented using an OS independent I/O filter system (including an I/O filter driver) running on a host, as is described for at least some embodiments herein, the host-based encryption can support multiple operating systems running on enterprise servers or across a domain. Another advantage is that this type of host-based encryption can be storage and array independent, for example, to support legacy storage systems without requiring new hardware. Still another advantage is that host-based encryption can support multiple applications and multiple arrays.

Host-based encryption also can present a challenge when coupled with storage-based functionality such as replication, because of the need to track replicas and keys. If replication is employed underneath the host encryption level, for example, it is advantageous if the host-based encryption is able to track replicas and associated encryption keys, to eliminate the need for user to manually manage replication and encryption technology. In at least one embodiment of the invention, further described herein, systems and methods are provided to manage replicas of encrypted information so as to allow for coordinated key management between source and replicated volumes independent of user intervention.

For example, consider a situation where the property of encryption is turned on for a logical unit (LU) (the logical unit is the entity upon which an encryption key is applied); an LU identifier can be stored with the encryption key, so that the encryption key for the LU can be found in the future. An external key manager provides the encryption key. One concern with this approach is how to find the key for a replica of such an LU. At least some embodiments of the invention resolve this concern by virtualizing the LU when the encryption property is turned on and dedicating a small area in the LU storage to store metadata relating to encryption. Within this metadata, an identifier ("key_id"), which optionally can be unique globally, unique across a given domain, etc., that is associated with the key can be stored and can be used to obtain the key, provided that all permissions and credentials are in place.

For example, when the key_id is presented to the key manager with appropriate credentials, the host system is allowed to obtain the key used to encrypt/decrypt the LU. When replicas of the LU are created, this metadata is replicated along with the encrypted areas of the LU. Replicating the metadata means that the key for decrypting the encrypted data on the LU also can be obtained for the replica with no need to store knowledge of specific devices within the key manager. This allows a user to continue to use replicas as the user already has been using them, without introducing new management steps when a replica is created. Further, no other software used in the enterprise needs to be modified, and no specific management actions are required, to permit replication of the encrypted volume and the ability to read/write the encrypted data on the replica. These and other embodiments of the invention can be applied to data encrypted at the network or logical device level, as well.

In one embodiment, the invention provides a method for providing an operating system (OS) independent input/output (I/O) filter driver capable of encrypting at least a portion of a logical unit (LUN), the method comprising the unordered steps of: providing an I/O filter driver component to an I/O stack for a host in communication with the LUN; determining, based at least in part on at least one of the OS and the type of LUN, at least one region in the LUN that is accessed below the I/O filter driver in an I/O stack on the host; and performing at least one of a read and a write of the one or more regions while keeping the one or more regions in plaintext, while permitting other regions of the LUN to be at least one of encrypted and decrypted.

In another embodiment, a method is provided for providing an operating system (OS) independent input/output (I/O) filter driver capable of encrypting at least a portion of a logical unit (LUN), the method comprising the unordered steps of: providing an I/O filter driver component to an I/O stack for a host in communication with the LUN; determining, based at least in part on at least one of OS requirements and an arrangement of data on the LUN, at least one region in the LUN that contains data that is used below the I/O filter driver in an I/O stack on the host; and performing at least one of a read and a write of the one or more regions while keeping the one or more regions in plaintext, while permitting other regions of the LUN to be at least one of encrypted and decrypted.

In a further embodiment, the method further comprises storing information defining the one or more regions in the LUN that execute below the I/O filter driver as being plaintext regions that are not encrypted.

In yet another embodiment, the method further comprises comparing an I/O request to the LUN to the stored information to determine whether the I/O request relates to a plaintext region; leaving unencrypted any writes to the LUN if, based on the stored information, the region to be written to is a plaintext region; and reading without decryption any reads from the LUN if, based on the stored information, the region to be read from is a plaintext region.

In another embodiment, the method further comprises encrypting writes to the LUN if, based on the stored information, the write is to a region other than the plaintext region; and decrypting reads from the LUN if, based on the stored information, the read is to a region other than the plaintext region.

In a still further embodiment, the stored information is stored in a metadata region on the LUN. In yet another embodiment, the stored information is implemented s part of the I/O filter driver itself.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein:

FIG. 11A is a flow chart showing a method for configuring a device to a host after a host restarts or whenever a new device is detected, in accordance with one embodiment of the invention;

FIG. 12 or FIG. 13 are completed;

The drawings are not necessarily to scale, emphasis instead generally being placed upon illustrating the principles of the invention. In the Figures, like numbers denote like elements.

DETAILED DESCRIPTION

Before discussing the details of the invention, a preliminary discussion is provided giving an overview of the type of computing environment in which at least some embodiments of the invention are realized, followed by a brief overview of operation of one embodiment of the invention. The methods and apparatus of at least some embodiments of the invention may take the form, at least partially, of program code (i.e., instructions) embodied in tangible media, such as floppy diskettes, CD-ROMs, hard drives, universal serial bus (USB) memory devices, memory cards, random access or read only-memory, or any other machine-readable storage medium, including a transmission medium. When the program code is loaded into and executed by a machine, such as a computer, the machine becomes an apparatus for practicing the invention. The methods and apparatus of the invention also may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

Systems and methods in accordance with at least some embodiments of the invention can be implemented using any type of general purpose computer system, including but not limited to a personal computer (PC), laptop computer, client, network appliance, server, workstation, personal digital assistant (PDA), mobile communications device, interconnected group of general purpose computers, host computer systems, enterprise computer system, etc., running any one of a variety of operating systems. The general purpose computer system advantageously includes and/or is capable of communicating with storage devices or systems (including enterprise storage systems, remote storage systems, intelligent storage systems, disaster recovery systems, etc.) that store data and/or computer programs used by the general purpose computer system. An example of a system 10 that includes a general-purpose computer system 1 and storage systems 3, 4, usable with at least one embodiment of the invention is shown in FIG. 1.

Figure 1:
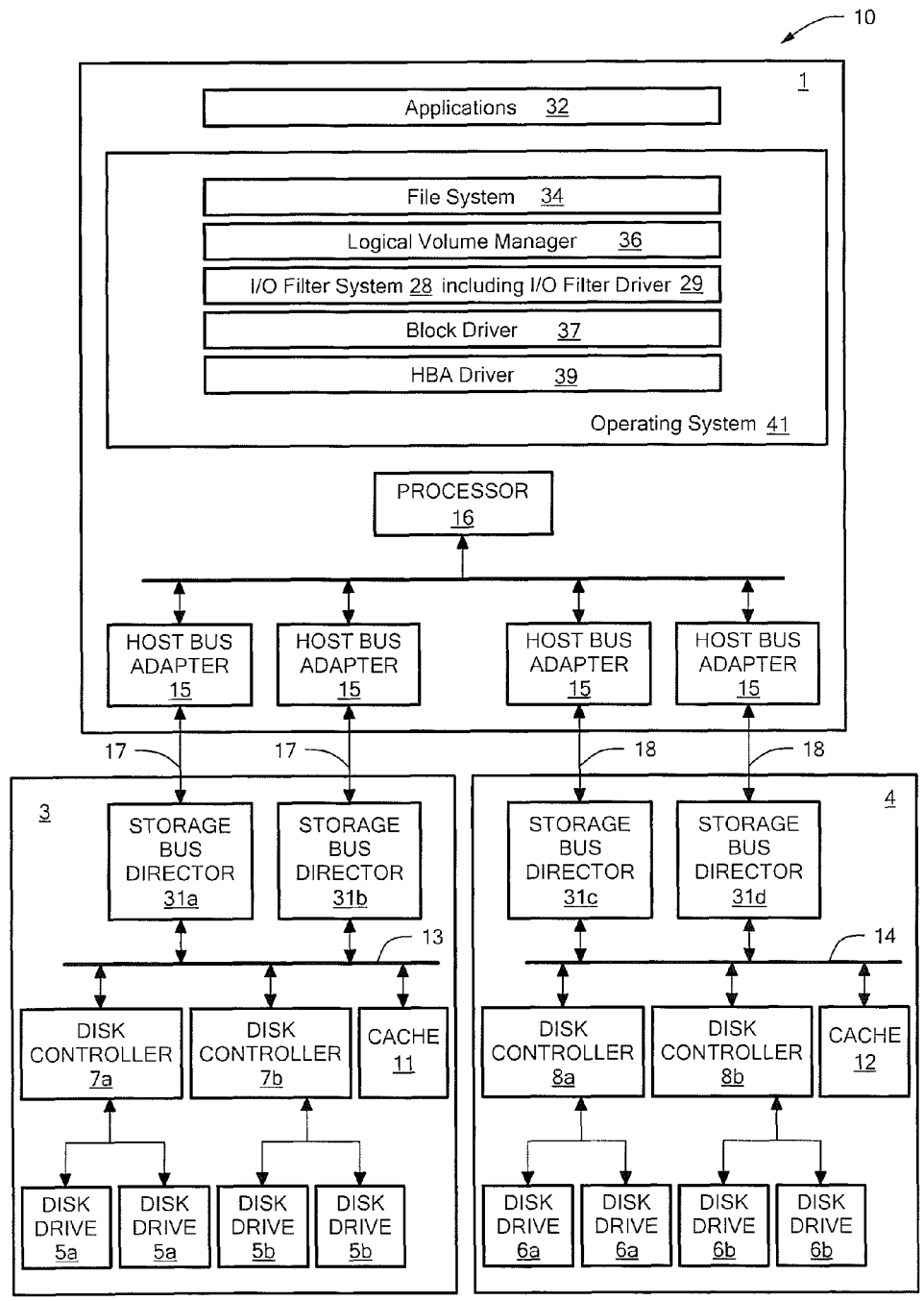
FIG. 1 is an illustration of an exemplary computer system in which at least one embodiment of the present invention can be embodied.

Referring now to FIG. 1, the host computer 1 (also referred to herein as a general purpose computer 1) includes a processor 16 (which can include one or more central processing unit (CPU) chips) and one or more host bus adapters 15 that each controls communication between the processor 16 and one of the storage systems 3, 4 via a corresponding one of the communication buses 17, 18. Each bus 17, 18 can be any of a number of different types of communication links, with the host bus adapter 15 and storage bus directors 31a-31d being adapted to communicate using an appropriate protocol via the communication buses 17, 18 coupled there between. For example, each of the communication buses 17, 18 can be implemented as a SCSI bus with the storage bus directors 31a-31b and host bus adapters 15 each being a SCSI driver. Alternatively, communication between the host computer 1 and the storage systems 3, 4 can be performed over a Fibre Channel fabric. In still another alternative embodiment, communication between the host computer 1 and the storage systems 3, 4 can be performed in accordance with standards for the Internet—Small Computer System Interface (iSCSI) or the Fibre Channel over Ethernet (FCoE). Other implementations are, of course, possible.

In addition, those of skill in the art who are familiar with such general purpose computer systems 1 know that such systems can include elements not explicitly illustrated in FIG. 1, such as random access memory (RAM) for storing programs and/or data, an input/output (I/O) controller, a network interface, a display device, one or more input devices, and, optionally, one or more removable storage devices, including but not limited to a CD/DVD drive unit, a floppy disk drive unit, a tape drive unit, a PCMCIA or other card drive, a USB-based flash drive unit, and the like, and a data bus coupling these components to allow communication therebetween.

The CPU can be any type of microprocessor, such as a PENTIUM processor, made by Intel of Santa Clara, Calif. The display device can be any type of display, such as a liquid crystal display (LCD), cathode ray tube display (CRT), light emitting diode (LED), and the like, capable of displaying, in whole or in part, any outputs generated in accordance with the systems and methods of the invention. The input device can be any type of device capable of providing the inputs described herein, such as keyboards, numeric keypads, touch screens, pointing devices, switches, styluses, and light pens. The network interface can be any type of a device, card, adapter, or connector that provides the computer system with network access to a computer or other device, such as a printer, a computer network, a storage area network, etc.

In at least some embodiments of the invention, one or more computer programs (such as applications 32 and an operating system 41) define the operational capabilities of the computer system 1. Operating systems usable with at least some embodiments of the invention include (but are not limited to) systems available from Sun Microsystems, and running the Solaris operating system (a version of Unix), HP-UX (a Hewlett-Packard operating system, running a Hewlett-Packard version of the Unix operating system), available from Hewlett-Packard Corporation, AIX (an IBM version of Unix), available from IBM Corporation, and/or any other operating system such as LINUX, WINDOWS VISTA, WINDOWS XP, or WINDOWS NT (the latter three are available from Microsoft Corporation). These programs can be loaded into the computer system 1 in many ways, including but not limited to a hard disk drive, a CD/DVD drive, and the network interface. Alternatively, the programs can reside in a permanent memory portion (e.g., a read-only-memory (ROM)) chip) of the main computer system 1 memory. Further, those of skill in the art will recognize that the computer system 1 can include specially designed, dedicated, hard-wired electronic circuits that perform all functions described herein without the need for instructions from computer programs.

The I/O filter system 28 includes an I/O filter driver 29. The I/O filter driver 29 portion of the I/O filter system 28 facilitates the sending of I/O requests from applications 32 running on the computer system 1 (which can, for example, be a host) to the data storage subsystem 3, 4. For example, in at least some embodiments, the I/O filter driver 29 queues I/O requests from the computer system 1 directed to data storage subsystems 3, 4, 9 (note that data storage subsystem 9 is illustrated further in FIGS. 2A-2C as comprising a combination of primary storage systems 3 and replica storage systems 4). In addition, in some embodiments, the I/O filter driver 29 implements algorithms to decide which I/O requests to send, how many I/O requests to send, and the speed at which to send I/O requests. The I/O filter driver 29, in some embodiments, keeps a record of I/O requests that are sent to data storage subsystems 3, 4 until the I/O request is processed by data storage subsystems 3,4. An exemplary host I/O filter system 28 that includes an I/O filter driver 29 is the POWERPATH software, available from EMC Corp.

At least some embodiments of the systems, methods, and apparatuses of the invention described herein are intended for use in connection with storage area networks (SANs) that include data storage systems, such as the SYMMETRIX Integrated Cache Disk Array System or the CLARIION Disk Array System available from EMC Corporation of Hopkinton, Mass., as well those provided by vendors other than EMC Corporation, especially SANs including arrays where replication takes place, such as by using array or switch facilities.

The storage systems 3, 4 (which can be logical units) make storage resources available to the host computer for assignment to entities therein, such as a file system 34, a database manager (not shown), a logical volume manager 36, an I/O filter system with driver 28, a block driver 37, and an HBA driver 39. If the storage systems are so-called "dumb" storage systems, the storage resources that are made available to the host computer will correspond in a one-to-one relationship to physical storage devices within the storage systems. However, when the storage systems are intelligent storage systems, they will present logical units of storage to the host computer 1 that need not necessarily correspond in a one-to-one relationship to any physical storage devices within the storage system. Instead, the intelligent storage systems may map each logical unit of storage presented to the host across one or more physical storage devices.

One environment in which the storage systems 3, 4 of FIG. 1 may be used is as part of an enterprise storage system. Enterprise storage systems store data in large-scale environments and differ from consumer storage systems in both the size of the environment and the types of technologies that store and manage the data. SANs are commonly used in enterprise storage systems to transfer data between computer systems and storage devices. An exemplary SAN provides a communication infrastructure, including physical connections between computer systems, storage devices, and a management layer, which organizes the connections, storage devices, and computer systems.

In a SAN environment, computer systems, typically referred to as hosts, connect to the SAN via one or more host bus adapters. The SAN itself may include thousands of different inter-related logical and physical entities. In the case of a Fibre Channel SAN, these entities, which comprise the connections between hosts and storage devices may include Fibre Channel host bus adapters, Fibre Channel switches, Fibre Channel routers, and the like. The entities may be physically connected through the use of twisted-pair copper wire, optical fiber, or any other means of signal transmission.

Storage devices 3, 4 may include multiple disk drives 5, 6 that combine to form a disk array. A typical disk array includes a disk array controller, a cache, disk enclosures, and a power supply. Examples of disk arrays include the SYMMETRIX Integrated Cache Disk Array System and the CLARIION Disk Array System, both available from EMC Corporation of Hopkinton, Mass. Such a data storage device system and its implementation is fully described in U.S. Pat. No. 6,101,497 issued Aug. 8, 2000, and also in U.S. Pat. No. 5,206,939 issued Apr. 27, 1993, each of which is assigned to EMC (the assignee of this invention) and each of which is hereby incorporated by reference. Consequently, the discussion herein makes only general references to the operation of such systems.

A disk array controller 7, 8 is a piece of hardware that provides storage services to computer systems that access the disk array. The disk array controller 7,8 may attach to a number of disk drives 5,6 that are located in the disk enclosures and communicates with the storage bus director 31 via an internal bus 13, 14. For example, the disk drives 5,6 may be organized into RAID groups for efficient performance and data protection. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive.

Disk array controllers 7,8 connect to storage bus directors 31a-31d via internal buses 13, 14 and via a port. A port serves as an interface between the disk array controller 7,8 and other devices, such as the hosts, in the SAN. As FIG. 1 illustrates, the storage bus directors 31a-31d connect to a SAN. Each disk array controller 7, 8 typically includes two or more ports. Disk array controllers 7, 8 may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host) and a "target" (e.g., a storage device) via a path. For example, a path may include a host bus adapter, an associated SCSI bus or Fibre Channel cabling, and a single port of a disk array controller. For example, the aforementioned path management software (e.g., EMC POWERPATH ENCRYPTION with RSA) can be used to manage the paths used to communicate data in the SANs and, among other things, can detect load imbalances for storage bus directors 31a-31d in a SAN and can select alternate paths through which to route data.

Data storage devices such as disk drives 5a-5b may be presented to one or more hosts, such as host computer 1, as a logical volume. A logical volume can represent a particular physical storage device, such as one of disk drives 5a-5b. Note that a physical disk is formatted into a "physical volume" as presented by the storage device for use by management software (such as Logical Volume Manager (LVM) software available from EMC). It should be noted that LVM functions can be implemented in several places, including within arrays and on hosts; in FIG. 1, however, the LVM 36 is illustrated as functioning on a host. Each physical volume is split up into discrete chunks, called physical partitions or physical extents. Physical volumes are combined into a "volume group." As those of skill in the art know, a "logical volume" consists of some number of physical partitions/extents, allocated from a single volume group, where a volume group is a collection of disks (which could be a physical volume), treated as one large storage area. A logical volume may also be referred to as a logical unit (LU). An identifier of a logical volume, also called a logical volume identifier, includes information specific to the logical volume it identifies. One example of a logical volume identifier is the Fibre Channel World Wide Names (WWN) of the logical volume. Another example of a logical volume identifier is information that was assigned by the array manufacturer and that is provided in response to a SCSI inquiry. Still another logical volume identifier is the world wide name (WWN) which also can be provided in response to a SCSI inquiry. Note also that, as used herein, a device is a generic term for any number or kind of logical unit, especially used for storage.

In one embodiment, the I/O filter system 28 is implemented to use pseudodevices to represent devices that it is managing. The pseudodevice is a logical representation of the device that assigns it a name chosen by the I/O filter driver 29 instead of the name assigned it by the Operating system 40. Use of pseudodevices to represent devices that the I/O filter system 28 is managing is advantageous when the I/O filter driver 29 is transforming those devices in some way, such as using a part of the device to write metadata.

As is understood in the art, a pseudodevice is a special type of port, located in the kernel of an operating system, that acts like a device but does not correspond to any actual hardware and doesn't interface to a hardware device; instead, the pseudodevice interfaces to a managing device driver that maps it to one or more underlying hardware devices. Thus, a host interacting with a pseudodevice treats the pseudodevice as sort of a "forwarding mechanism" through which a physical device can be reached, such that the host treats a pseudodevice as if it were a physical I/O device even though it is not. With some embodiments of the invention (which can use multipathing), in the I/O filter system 28 of the invention, a pseudodevice represents a single logical device, as defined by I/O filter system 28, and the path set leading to it, which can contain any number of physical paths. In at least some further embodiments of the invention, a pseudodevice (explained further herein) is used to represent the eVLU (which has a hidden private region of metadata that is only available to the filter driver 28). A pseudoname is the name used to identify the pseudodevice.

In at least one embodiment of the invention, the computer system 1 of FIG. 1 is networked to other devices, such as in a client-server or peer to peer system. This is illustrated and described in greater detail in connection with FIGS. 2A-5 herein, which include example embodiments showing first and second computer systems 1A, 1B networked to each other via a host interconnect network 22 (which can, for example be a local area network (LAN) or a wide area network (WAN)), as well as embodiments showing a host computer 1 running a client application that communicates with a remote server application running at a remote host. The network 22 could be an internet protocol (IP) network, but many other types of networks are usable, as will be appreciated by those of skill in the art. The computer system 1 thus includes elements that can act as a client system, a server system, or a peer system, and the entire computer system 1 likewise can act as a client, server, or peer. It should be noted, however, that although the computer/host 1 can act as a server in a general sense, the key manager server 26 is a very specific and particular type of server (as explained elsewhere herein) and will not necessarily have the same behavior as when the host 1 acts as a server.

As will be explained further herein, the client can be any entity, such as the system, host computer 1, and/or or specific components thereof (e.g., terminal, personal computer, mainframe computer, workstation, hand-held device, electronic book, personal digital assistant, peripheral, etc.), or a software program (e.g., an I/O filter driver system 28 program) running on a computer directly or indirectly connected or connectable in any known or later-developed manner to any type of computer network, such as the Internet. A client may also be a notebook computer, a handheld computing device (e.g., a PDA), an Internet appliance, a switch, a mobile communications device, a telephone, an electronic reader device, and/or any other such device capable of connecting to a computer network or a storage network.

Of course, those skilled in the art will appreciate that computer systems 1 embodying the invention need not include every one of the aforementioned elements and that equivalents to each of the elements are intended to be included within the spirit and scope of the invention.

A brief summary of the overall operations of one embodiment of the invention is now provided, followed by detailed descriptions of the various aspects, components, and processes of embodiments of the invention.

In one aspect, the invention provides an I/O filter system 28 that provides an information-centric protection mechanism for data (e.g., user data) stored on logical units (LUs). The I/O filter system 28 encrypts and decrypt all data (although not necessarily operating system (OS) metadata or the I/O filter system 28 metadata) on an encrypted, virtualized logical unit (eVLU), where the virtualization is done by the I/O filter system 28. Data on such an LU is encrypted and decrypted transparently by the I/O filter system 28—no application changes are required. This also means, however, that data on such an LU is encrypted and thus accessible only through I/O filter system 28, (note that backup applications that run on plaintext data above the I/O filter system 28 are backing up plaintext, and not cipher text, and thus such applications are accessible independent of the I/O filter system 28)

A user is able to encrypt existing data by copying it from a plain text LU to an eVLU using a data migration or data copying tool (one example of such a tool usable with at least some embodiments of the invention is the POWERPATH MIGRATION ENABLER (PPME) product, available from EMC Corporation of Hopkinton, Mass.) These features also enable protection of data on storage devices (e.g., drives) that are removed from arrays. Because metadata on the LU stores information, in plaintext, that can be used to obtain the key for the data on the LU, given permission to obtain the key it is possible for replicas to be made of a logical unit where the replica keeps intact the encryption and also includes in the replica the information necessary to obtain a key for decryption.

In a further aspect of the invention, to protect an entire drive's contents, all the LUs that are using the physical drive are encrypted. However, in another embodiment, if it is desired to protect only some of the content on an LU (e.g., to protect only the sensitive and/or confidential data on an LU, but not necessarily all data), it may be sufficient for only those LUs that contain such data to be encrypted on a particular physical drive. The I/O filter system 28 described herein also is useful to prevent unauthorized access to a volume's content on a per-host basis.

In one embodiment, the I/O filter system 28 provides a command line interface (CLI) to perform various actions needed to manage the eVLU. For example, the CLI allows an administrator to designate a particular LU to be encrypted, which renders any previously existing user data on the LU inaccessible through the I/O filter system 28. When an LU is designated to be encrypted, it will be converted to an eVLU and a key will be provisioned for it and cached in the I/O filter system 28 kernel. At the same time, a key identifier (key_id), associated with that key is stored in the I/O filter system 28's metadata region 46 on the LU. In some embodiments of the invention (for example, some embodiments that use the RSA Key Manager as the key manager), the key_id is a globally unique key_id. In at least some other embodiments (e.g., some embodiments that use a key manager other than the RSA Key Manager), the key_id is unique within a given domain, but not necessarily globally unique. In still further embodiments, the key_id need not be unique Once the key_id is stored in metadata, all writes to the eVLU are encrypted and all subsequent reads are decrypted. The device can then be put into service as a new LU or it can be used as the target, e.g., of a PPME migration, where the source is an LU with existing data. Note that when migrating from an existing LU, for some of the embodiments of the invention, the target may need to be slightly larger in order to accommodate the I/O filter system 28 metadata required for a virtualized LU.

When the I/O filter system 28 starts up after a host boot, the I/O filter system 28 detects all encrypted, virtualized LUs. Reads and writes to encrypted parts of the VLU will be disabled to these devices until the key is looked up and cached in the kernel. The I/O filter system 28 gets the key for each eVLU, based on information stored in the I/O filter system 28 metadata which is in a private region of the LU.

Advantageously, in the I/O filter system 28, data at rest encryption is built on top of VLUs to enable the I/O filter system 28 to detect and properly handle replicas, such as replicas created by products such as EMC Symmetrix Remote Data Facility (SRDF), EMC MirrorView, EMC Snapview, EMC Timefinder, as well as other mirroring, disaster recovery, and/or replication products. An eVLU contains metadata that enables the I/O filter system 28 to identify the LU as virtualized and as encrypted. In the case of a replica, the I/O filter system 28 metadata ensures that the key associated with the eVLU is the same as the key of the source eVLU for the replica.

As those of skill in the art will appreciate, embodiments of the invention can greatly simplify making replicas of encrypted storage devices and managing the associated encryption keys. In prior art systems, a manual operation is needed to associate each replica with the key that was provisioned for the primary device. Thus, without the advantages provided in the embodiments of the present invention, every time a device being used as a replica is re-purposed, another manual operation is required.

Having described the environment of the invention and provided a brief overview of one embodiment of the invention, including its advantages for replication, the details of at least some embodiments of the invention are now provided.

Figure 2A:
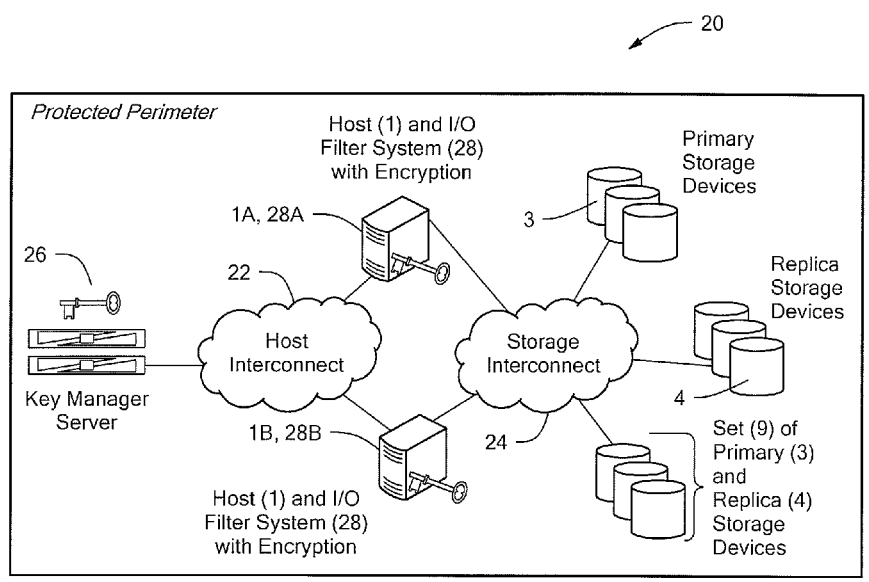
FIG. 2A is an illustration showing a first protected perimeter configuration, in accordance with one embodiment of the invention.

FIG. 2A is an illustration showing a first protected perimeter configuration 20, in accordance with one embodiment of the invention. By "protected" it is meant that the perimeter covers the domain that the I/O filter driver is protecting. The protected perimeter 20 is a collection of hosts 1A, 1B, storage devices 3, 4, 9, and one or more key manager servers 26 that are trusted in a single environment; that is, all components inside the protected perimeter 20 are considered to be trusted relative to each other. In some instances, the protected perimeter 20 corresponds to a physically secure area within a data center, but it should be understood that not all components in a protected perimeter need to be physically present in the same place or location. Some components, such as key manager servers 26, storage devices 3, 4, 9, etc., can be remotely located (which can be advantageous and even necessary for disaster recovery, for example).

Figure 2B:
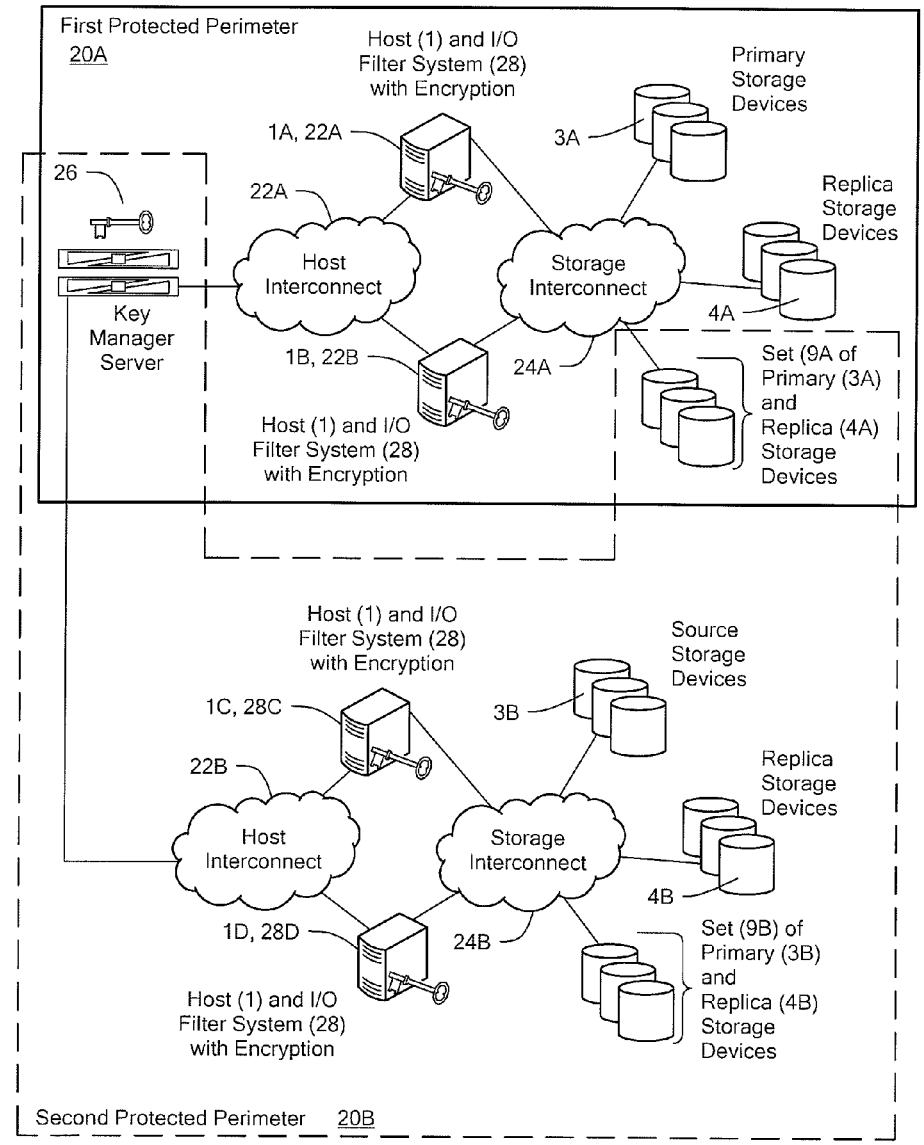
FIG. 2B is an illustration showing a second protected perimeter configuration, in which two protected perimeters share the same key manager server, in accordance with one embodiment of the invention.

Note also that two separate protected perimeters can share selected elements (i.e., have elements in common). Consider, for example, FIG. 2B, which is an illustration showing a second protected perimeter configuration, in which two protected perimeters 20A, 20B share both a key manager server 26 and a set 9A that includes primary storage devices 3A and replica storage devices 4A. It should be understood that protected perimeters that share components are not required to share any or all of the shared components specifically shown in FIG. 2B. The specifically illustrated shared components in FIG. 2B are provided by way of illustration only and are not limiting. In other embodiments, for example, the storage interconnect 24 could be the shared component. Generally, however, the host 1 and I/O filter system 28 are not shared between protected perimeters 20.

A pair of protected perimeters also can be in communication over a network and arranged so that a first protected perimeter 20A serves as a primary protected perimeter and a second protected perimeter 20B serves as a replica of the primary protected perimeter 20A. Together, the interconnected protected perimeters 20A, 20B can form a third protected perimeter 20C. Consider, for example, FIG. 2C, which is an illustration showing a third protected perimeter configuration 20C that consists of first protected perimeter 20A and a second protected perimeter 20B connected via a remote network 21, in which there is a key manager server 26*b* for each of the primary and replica logical units, in accordance with one embodiment of the invention. The embodiment and configuration of FIG. 2C can be especially useful for disaster recovery applications. For example, the configuration of FIG. 2C can be used with replication for disaster recovery, where the arrays of the storage devices 3A, 4A, 9A of protected perimeter 20A are replicated into the arrays of the storage devices 3B, 4B, 9B, respectively of protected perimeter 20B, and where the replica key manager server 26B is a replica of primary key manager server 26A. In a disaster recovery application (e.g., SRDF), the replica key manager server 26B is a disaster recovery replica of primary key server manager 26A, primary storage device 3*b* is a disaster recovery replica of primary storage device 3A, and the primary portion of replica set 9*b* is a disaster recover replica of the primary portion of replica set 9A. Thus, for disaster recovery, all the primary storage of protected perimeter 20A is replicated in protected perimeter 20B. In some embodiments, however, local replicas within a protected perimeter 20 (e.g., the replica 4A of perimeter 20A) has a remote replica in protected perimeter 20C, as those of skill in the art will appreciate.

Figure 2C:
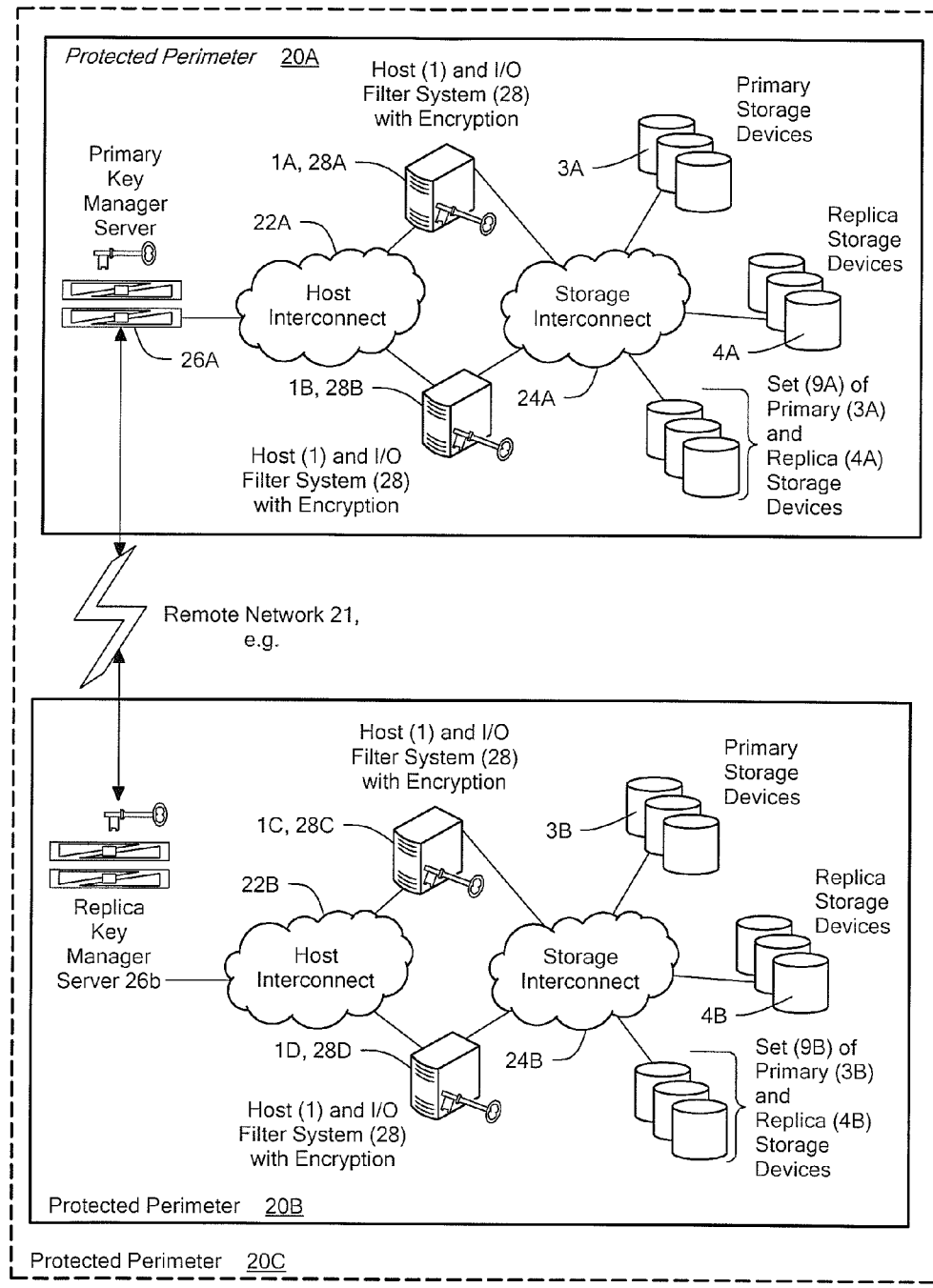
FIG. 2C is an illustration showing a third protected perimeter configuration, in which there is a key manager server for each of the primary and replica logical units, in accordance with one embodiment of the invention.

Referring now to FIGS. 2A-2C, each protected perimeter 20 also illustrates some components used to implement at least one embodiment of the invention, including a pair of host computers, 1A, 1B (similar to the computer 1 of FIG. 1), each host computer 1A, 1B having a respective I/O filter system with encryption 28A, 28B. The host computers 1A, 1B in this embodiment are shown for illustrative purposes to be in operable communication with each other (but it should be noted that the host computers 1A, 1B being in operable communication is entirely optional, so long as each host computer 1 is in communication with the key manager server 26). The hosts computers 1A, 1B communicate with the external key manager server 26 via a host interconnect 22. In addition, the hosts computers 1A, 1B communicate via storage interconnect 24 with a plurality of primary storage devices 3, replica storage devices 4, and a set 9 that includes both primary 3 and replica 4 storage devices.

A host computer 1 that is initialized and configured with the I/O filter system 28 with encryption (which can, for example, be provided as the EMC POWERPATH ENCRYPTION with RSA product) are considered to be within the protected perimeter 20. As will be explained further herein, using the I/O filter system 28 with encryption helps to ensure that if any storage devices 3, 4, 9 within the protected perimeter are physically removed from the protected perimeter, the data contained on the storage devices will be encrypted so as to maintain confidentiality.

The storage interconnect 24 of FIG. 2A can be any type of network capable of interconnecting storage devices with host computers. In some embodiments, the storage devices and host computers are interconnected in a manner such that, to the operating systems running on the host computers 1A, 1B, the storage devices appear as locally attached, but this is not required for the invention. The storage interconnect 24 provides communications between the various entities in the protected perimeter 20, such as the host computers 1A, 1B and storage devices 3, 4, 9. The storage interconnect 24 may be a shared, public, or private network and encompasses a wide area or local area and can be implemented through any suitable combination of wired and/or wireless communication networks. Furthermore, the storage interconnect 24 may include a local area network (LAN), a wide area network (WAN), an intranet, or the Internet. For example, in one embodiment, the storage interconnect 24 works with Fibre Channel connectivity and is implemented via a SAN. In another embodiment, the storage interconnect 24 works with internet protocol (IP) connectivity and is implemented via an Internet—Small Computer System Interface (iSCSI) (for Fibre Channel). Those of skill in the art will recognize that other implementations are, of course, possible.

Figure 5:
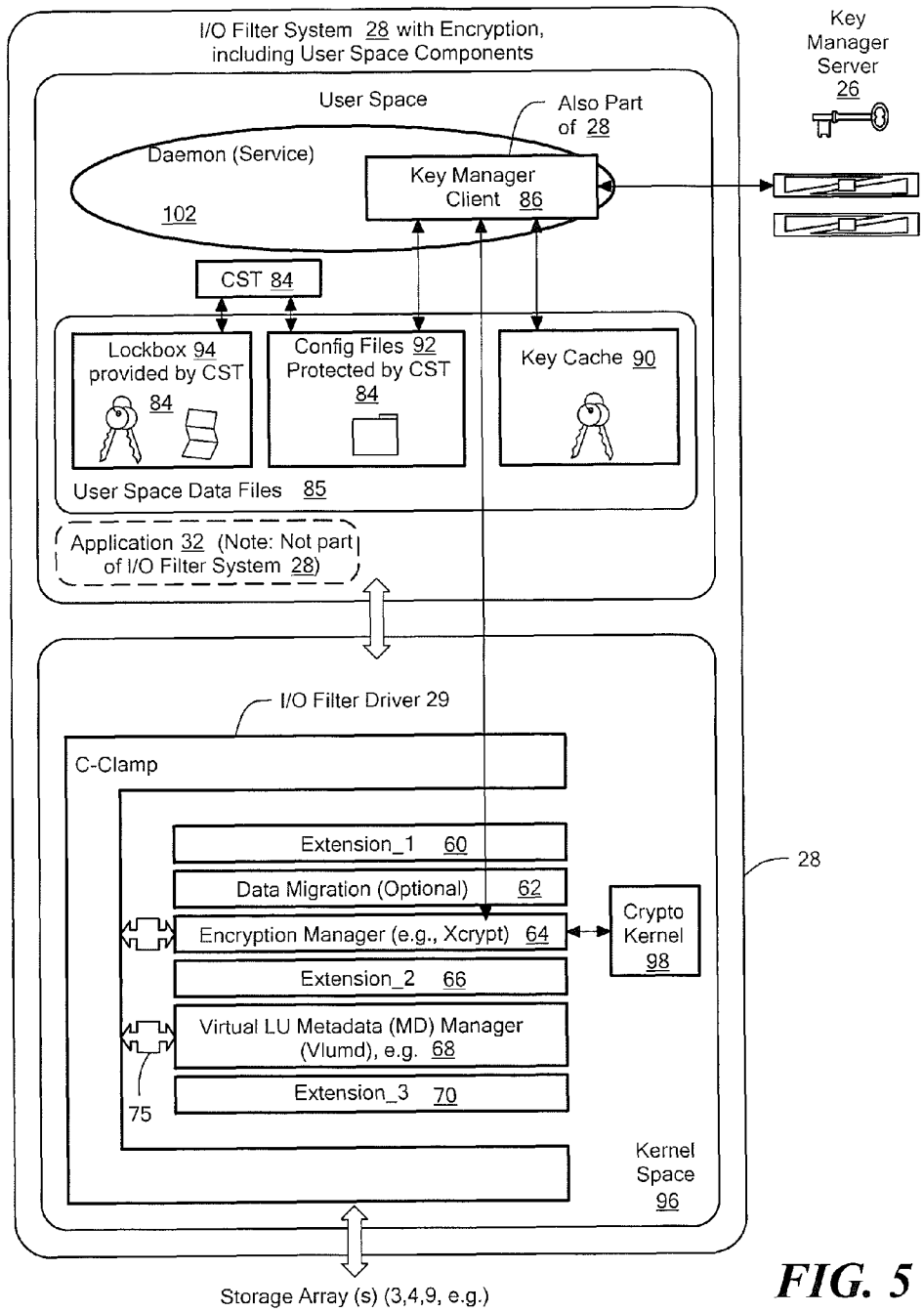
FIG. 5 is a block diagram showing information and I/O flow during unattended operation of the I/O server of FIG. 1, in accordance with one embodiment of the invention.
Figure 6:
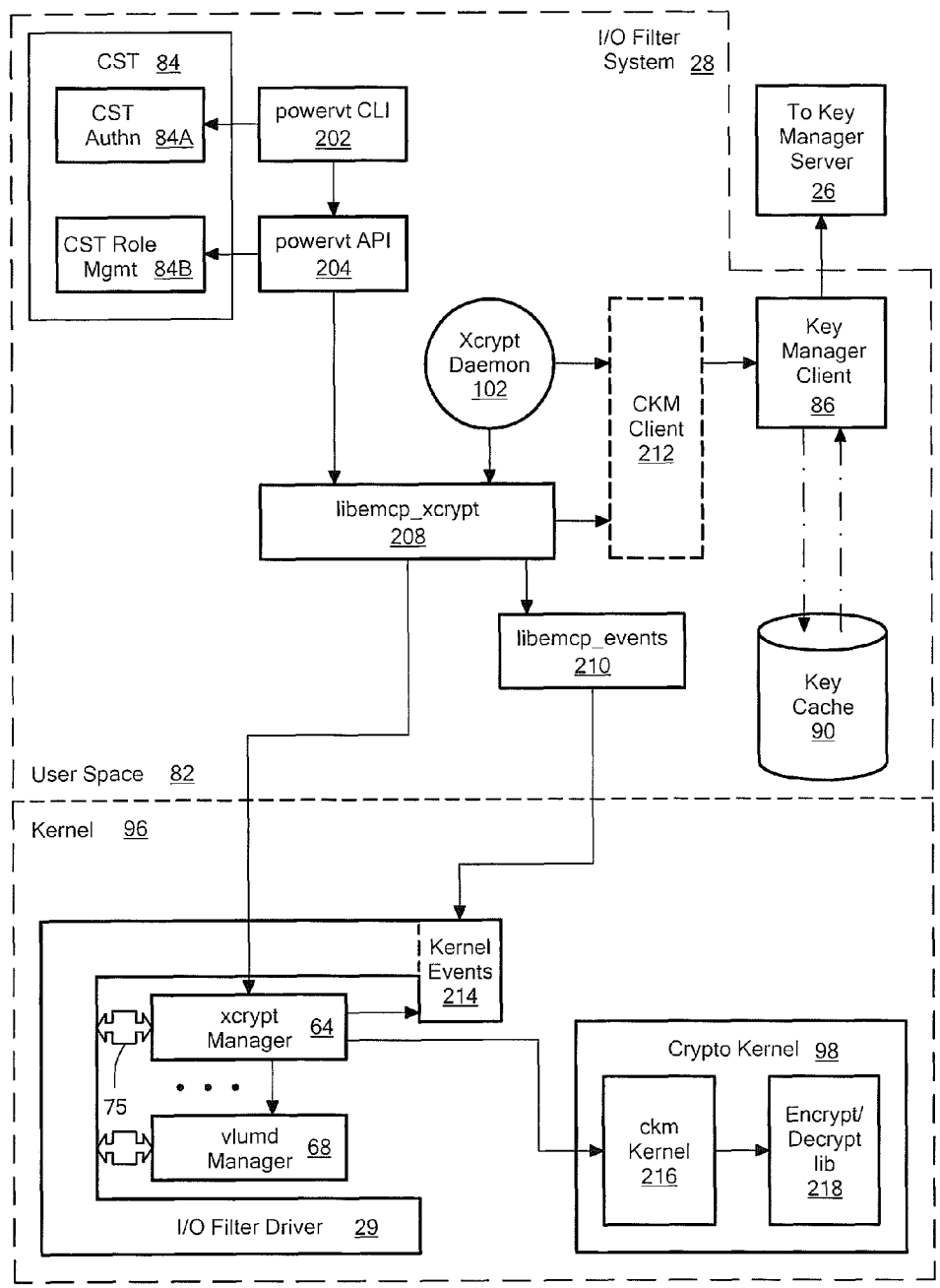
FIG. 6 is an architectural diagram showing components of a system for creating, using, and replicating encrypted virtual logical units (sVLUs), and also components for removing the encryption property of eVLUs, in accordance with one embodiment of the invention.

The key manager server 26 provides key manager functionality, and the key manager server 26 communicates and cooperates with a key manager client 86 running at each host 1A, 1B (for simplicity, the key manager client 86 is not shown in FIG. 2A but is illustrated in FIGS. 5 and 6). The key manager server 26 is, in one embodiment, a server appliance that includes all components required to be a key manager for the datacenter within the protected perimeter 20 and which is capable of looking up a globally unique identifier. An illustrative example of a key manager server 26 usable with at least some embodiments of the invention is the RSA KEY MANAGER appliance manufactured by EMC Corporation of Hopkinton, Mass.; however, the invention is not, of course, limited to use of the RSA KEY MANAGER.

The key manager server 26, in cooperation with the key manager client 86 (which operates remotely and in concert with the key manager server 26) running at the host, controls the generation, protection, storage, replacement, and elimination of encryption keys. In particular, the key manager server 26 creates encryption keys and also creates the key_id (an identifier that is associated with the encryption key and can be used to obtain the encryption key, provided that all permissions and credentials are in place) and is responsible for that association and for allowing lookup of an encryption key using the key_id. (Note that the key_id, in some embodiments (e.g., those using the RSA KEY MANAGER), is globally unique. In some embodiments, the key_id is unique within a domain. In other embodiments, the key_id might not necessarily be unique.) Thus, one role of the key manager server 26 in FIG. 2A is to securely create, store and return keys to authorized entities, such as the I/O filter system 28 with I/O filter driver 29 of FIG. 2A (e.g., such as EMC POWERPATH ENCRYPTION with RSA). It should be understood, however, that the key_id could instead be created at the host 1. It is more advantageous to create the key_id at the key manager server 26 as this results in fewer process steps overall.

Figure 3A:
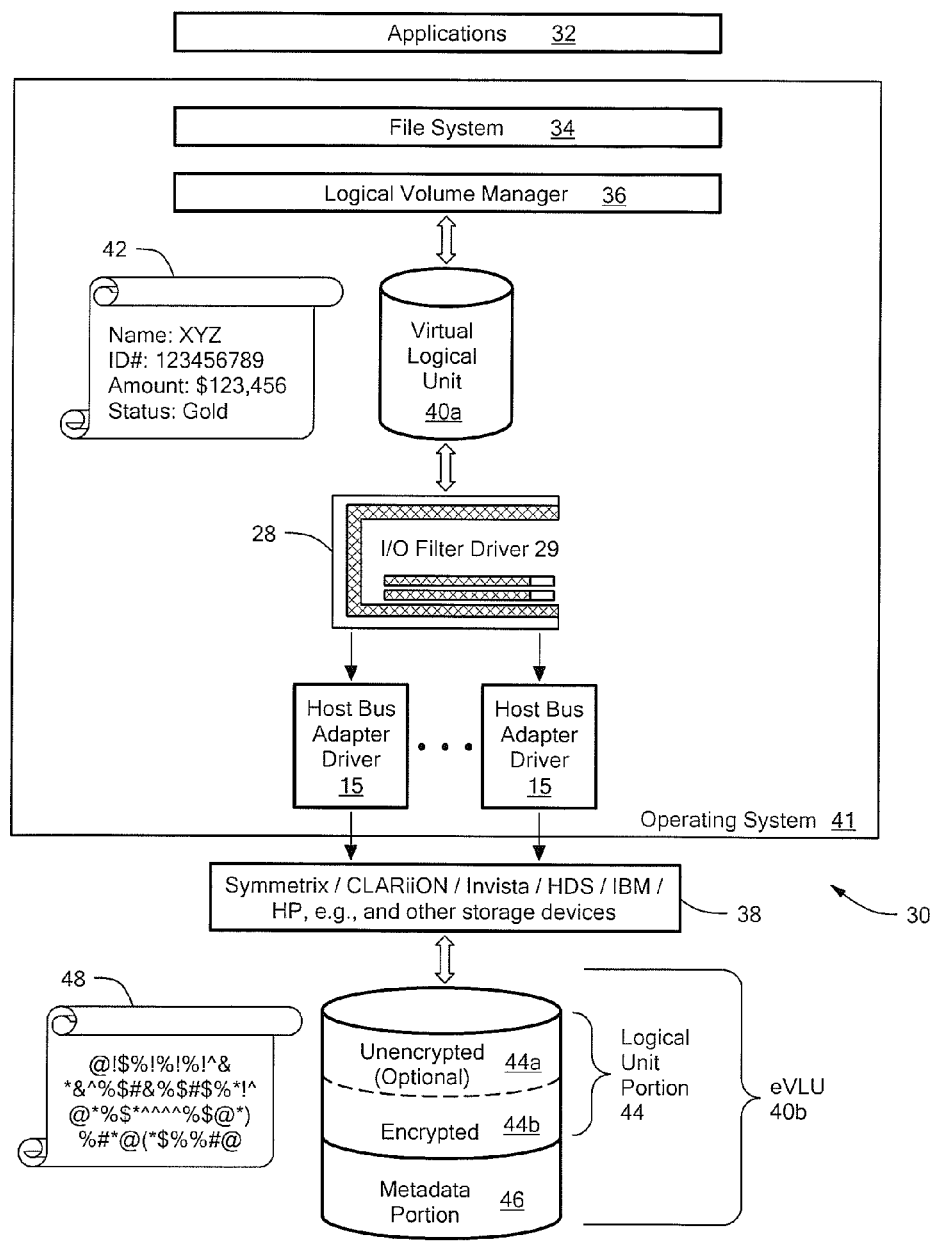
FIG. 3A is a block diagram illustrating a first input/output (I/O) stack configuration, illustrating the location of the I/O filter system with driver, in accordance with one embodiment of the invention.

As will be explained in greater detail herein, plaintext data (e.g., data generated by an application running at the host 1) transmitted from a host system 1 to a storage device 3, 4, 9 is encrypted using an encryption key provided by the key manager server 26. As will also be explained in greater detail herein, the encrypted data is stored on an encrypted virtual logical unit (eVLU) 40b on one or more of the storage devices 3, 4, 9, along with the key_id, which is later used to get an encryption/decryption key from the key manager server 26. An eVLU 40b (also known as a cipher text logical unit) is a logical unit with encryption turned on. Note that all eVLUs are also virtual LUs. FIG. 3A is a first block diagram illustrating a first input/output (I/O) stack configuration 30, illustrating the location of the I/O filter driver 29 of the I/O filter system 28 (of FIGS. 1-2C), relative to other components in the stack, in accordance with one embodiment of the invention, and FIG. 3B is a block diagram illustrating a second input/output (I/O) stack configuration 30 that includes a SCSI driver in the stack and illustrates the location of the I/O filter driver 29 of the I/O filter system 28, relative to other components in the stack, in accordance with one embodiment of the invention FIGS. 3A and 3B also provides a schematic representation of a number of mapping layers that exist in exemplary embodiments of the computer system 1 of FIG. 1, as well as schematic illustrations of an eVLU 40b.

Figure 3B:
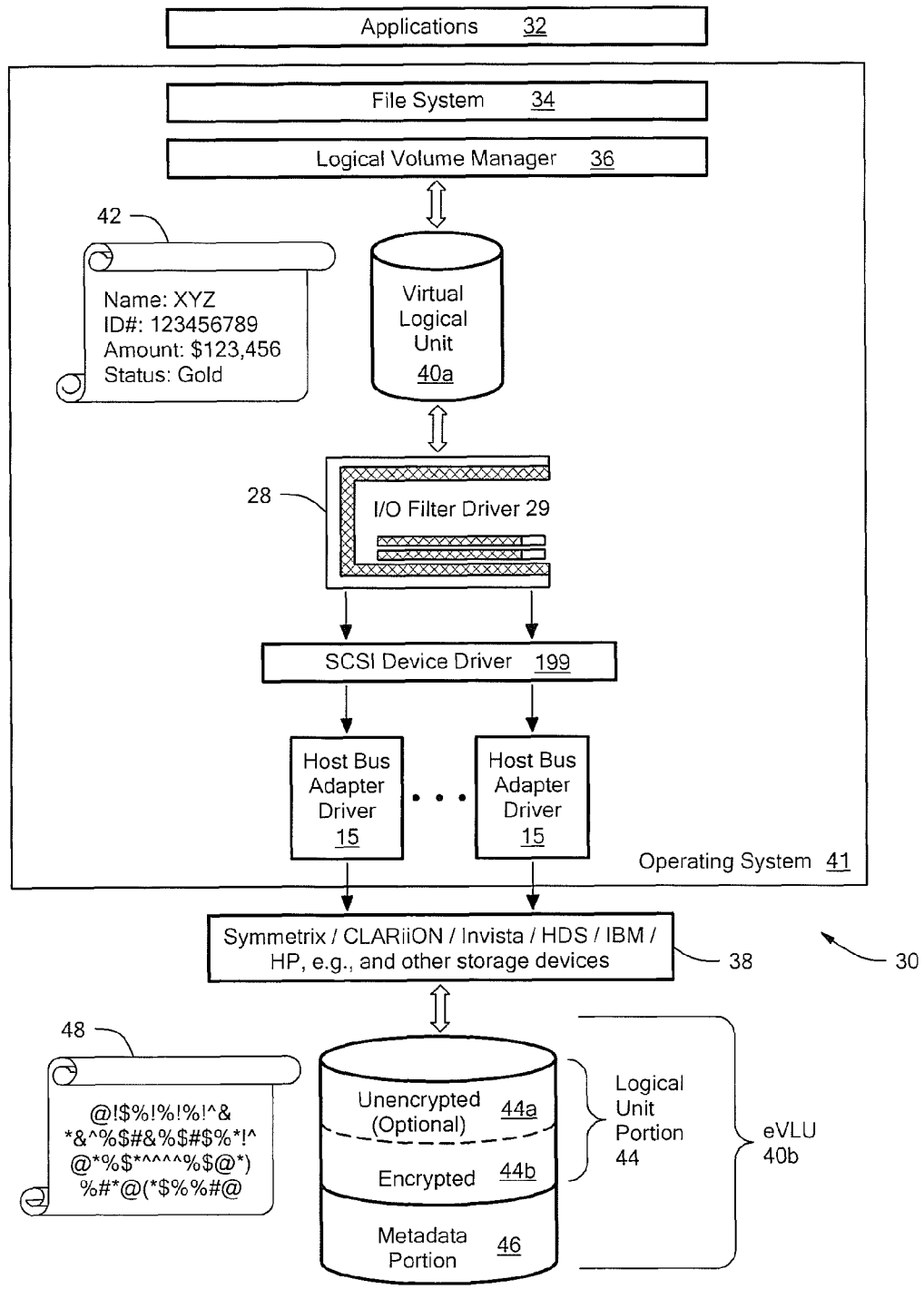
FIG. 3B is a block diagram illustrating a second input/output (I/O) stack configuration that includes a SCSI driver, illustrating the location of the I/O filter system with driver, in accordance with one embodiment of the invention.

Referring to FIGS. 3A and 3B, the I/O stack configuration 30 includes an application layer 32 which includes application programs executing on the processor 16 of the host computer 1. The application layer 32 generally will refer to storage locations used thereby with a label or identifier such as a file name, and will have no knowledge about where the file is physically stored on the storage system 3, 4, (FIG. 1). Below the application layer 32 is the file system 34 layer, followed by the logical volume manager (LVM) layer 36. The LVM layer 36 presents a logical volume to the file system layer 34. The LVM layer 36 maps that logical volume to what appears to be a physical volume to the LVM 36, but, which may be another logical construct presented by a layer lower in the stack. In the illustration of FIGS. 3A and 3B, for example, the LVM 36 maps to the logical unit (LU) 40 (also referred to herein as a virtual logical unit, when the LU has been virtualized).

In the embodiments of the invention, both the file system layer 34 and the LVM layer 36 are optional layers. An optional database manager layer also could be implemented in connection with the embodiments of the invention, and the database manager layer would be outside the kernel at the same level or below the application layer 32. Of course, one of skill in the art will recognize any particular application can make use of none, some, or all of the layers described herein and/or illustrated in FIGS. 3A and 3B.

The virtual logical unit (VLU) 40a represents a device presented by the I/O filter driver 29 to the layers above it. In contrast, an LU 40 represents the VLU 40a as seen without virtualization. The VLU 40A as illustrated in FIGS. 3A and 3B is shown as containing plaintext data 42 (also referred to as clear text). A virtualized LU 40*a* represents what any entity above the I/O filter driver 29 gets when accessing the eVLU 40*b*—that is, the entity gets the plaintext version of the data; the VLU 40*a* is a logical representation of the eVLU 40*b* as seen by entities above the I/O filter driver 29. The plaintext data 42 will be encrypted via the I/O filter driver 29, and written to the storage device 3, represented by the eVLU 40*b*. The eVLU 40*b* is used in the same manner as any other logical unit: that is, the eVLU 40*b* can be used for raw access, file systems can be mounted on it, and it can be placed under control of the LVM 36. Encrypted Data 48 on the eVLU 40*b* (excepting the metadata 46, which is unencrypted) is returned as cipher-text to any application 32 or other entity/user that accesses the data without going through the I/O filter system 28. For example, if a database is configured to read the native device corresponding to a device containing an eVLU 40*b*, and the database does not go through the I/O filter driver 29, the database retrieves cipher-text.

In the embodiments of FIGS. 3A and 3B, the I/O filter driver 29, which is part of I/O filter system 28 (not shown), sits below the applications 32, file system 34, and LVM 36 in the I/O stack 30. Note that the invention does not require that the I/O filter driver 29 be implemented below the LVM 36 or file system 34 in the I/O stack 30. In the particular embodiment illustrated in FIG. 3B, the OS 41 includes an I/O filter driver 29 that sits above a SCSI device driver 199. For some embodiments of the invention that include the SCSI device driver 199, the LU 40 that happens to be an eVLU 40*b* is read by portions of the OS that live below the I/O filter driver 29 or execute before the I/O filter driver 29 is loaded, such as the SCSI device driver 199. As explained further herein, in connection with certain embodiment of the invention, if the eVLU 40*b* can be read by portions of the OS 41 that live below the I/O filter driver 29 or execute before the I/O filter driver 29 is loaded, then the I/O filter driver 29 stores information indicating the portions of the eVLU 40*b* that can be read by those portions of the OS 41, so that the portions read by the OS can be left unencrypted. The information can be stored, for example, in the metadata of the eVLU 40*b*, but that location is not limiting. Those of skill in the art will appreciate that information designating unencrypted regions can be stored in many different structures in other embodiments (e.g., tables, the actual code itself, etc.)

In general, in accordance with the invention, the I/O filter driver 29 can sit above or below any component in the I/O stack 30 except that it cannot sit below the HBA driver 15. The I/O filter system 28 in which the I/O filter driver 29 resides includes functionality to act as an encryption manager in the I/O stack 30. As described previously, the I/O filter system 28, in one embodiment, is the EMC POWERPATH ENCRYPTION with RSA system.

Figure 4:
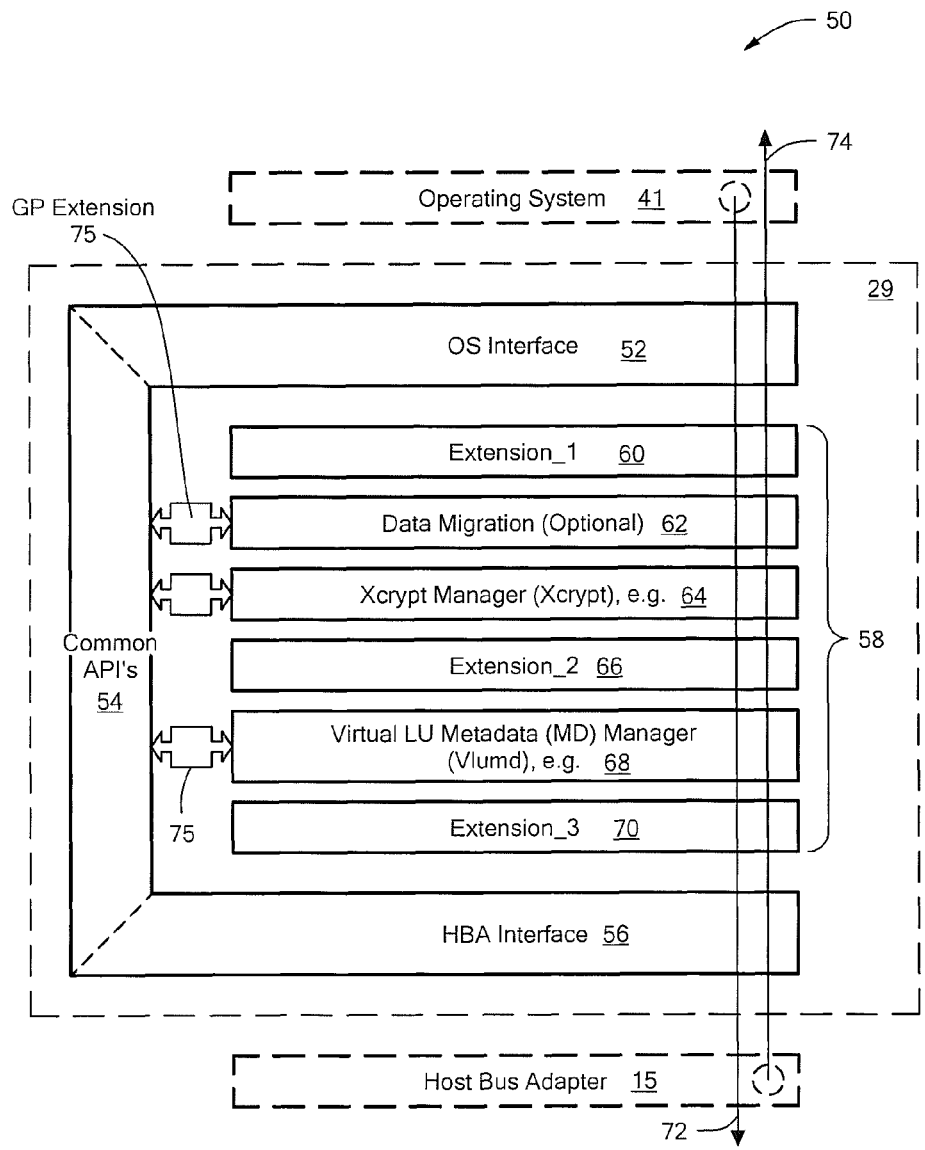
FIG. 4 is exemplary software architecture for of the I/O filter driver portion of the I/O filter system of FIG. 1, showing architectural elements to handle encryption and decryption of I/O requests and architectural elements that provide support for replication of encrypted virtualized logical units (VLUs), in accordance with one embodiment of the invention.

The I/O filter driver 29 creates a virtualized LUN designating some space in the LUN to store its metadata and the key_id in that metadata space. For example, a given storage device 3, 4, 9 is virtualized into a Virtual Logic Unit (VLU) 40*a* and at least one metadata storage space 46 is allocated in the physical space of the device, where the key_id is stored in the metadata storage space 46, so as to indicate that the LU is encrypted (i.e., the LU becomes an eVLU 40*b*; see FIG. 3). For example, a primary eVLU 3 can be replicated to a replica eVLU 4, where the replica eVLU 4 contains the same key_id as the primary eVLU 3 (indicating that the replica eVLU 4 is encrypted with the same key as the primary eVLU 3). FIGS. 4 through 6, described further below, provide more details about the components of the I/O filter system 28 itself.

Referring again to FIGS. 3A and 3B, anything executing "above" the I/O filter driver 29 (e.g., user applications 32, databases, file systems 34, logical volume managers 36, etc.) but that is using the I/O filter driver 29, sees data stored on the LU 40 as plaintext and cannot see the metadata 46 region on the underlying logical unit. That is, an application 32 or other component executing above the I/O filter driver 29 sees only a virtualized LUN, minus the metadata 46 (the metadata 46 is "invisible" to the component above the I/O filter driver 29.)

In at least some embodiments of the invention, the virtualizing of the LUN is more of a host-based virtualization than a switch-based or array-based virtualization. With at least some embodiments of the invention, the virtualization of the LUN is a generalized facility added to the I/O filter system 28 that allows for storing metadata (or properties) on a device for any reason. The Xcrypt manager extension 64 (described further below in connection with FIG. 4) uses this abstraction layer to store the key_id information for an encrypted device. The presence of the key metadata (or key property) on a device indicates the device is encrypted and should be treated by the Xcrypt manager 64 as such. It should be understood, however, that the actual encryption key is not stored in the metadata 46, as this would violate security requirements. Rather, as explained herein, what is stored in the metadata 46 is information about the key that allows lookup of the key from the Key Manager server 26, assuming the requester is allowed access to that key.

With the eVLU 40*b* and metadata 46 herein, the metadata 46 is created during virtualization, where the virtualization driver I/O filter driver 29 (which can be accomplished using many techniques known to those of skill in the art) ensures that code running "above" the I/O filter driver 29 can see only the virtualized logical unit portion 44 of the eVLU 40*b*, without ever knowing that the metadata 46 is there. In one embodiment, this virtualization is accomplished using size spoofing of the LU, where the size spoofing involves showing the code running above the I/O filter driver 29 that the size of the device (e.g., LU 40) is the size minus the size of the metadata area 46, which has the effect that no entity other than the I/O filter system 28 (and I/O filter driver 29) is able to access the metadata region 46.

In a further embodiment, the virtualization is accomplished using geometry spoofing. Geometry spoofing is discussed further in Prakash Venkatanaryanan et. al, "Methods and Systems for Preserving Disk Geometry of Virtualized Data Volumes," application Ser. No. 11/478,897, filed Jun. 30, 2006, allowed Sep. 9, 2008, U.S. Pat. No. 7,469,313, which is hereby incorporated by reference. In a still further embodiment, areas of the LU that need to remain unencrypted, such as the metadata and OS-specific areas, can be put into a partition not used for data and/or put in some other area of the storage device and protected, by the I/O filter driver 29, from unwanted access.

The metadata 46 itself is not encrypted. Note also that the metadata 46 can, in at least some embodiments, be used to implement functions (such as mirroring and/or partitioning) in addition to providing a location on the eVLU 40*b* for storage of the key_id. In certain embodiments, the metadata stores information about regions of the eVLU 40*b* that are to be left as plaintext. In addition, note that, although only a single metadata region 46 is illustrated in FIGS. 3A and 3B, in some implementations, there can be more than one metadata region 46.

Referring again to FIGS. 3A and 3B, the eVLU 40*b* includes a logical unit portion 44, which stores the encrypted data 48, as well as a metadata portion 46, which stores metadata (which itself is unencrypted). In at least one embodiment of the invention, the logical unit portion 44 includes at least a section 44a that stores unencrypted data and a section 44b that stores encrypted data, and the I/O filter system 28 keeps track of these sections. The order of the sections shown is not limiting (that is, the first section need not be the one that stores unencrypted data; it could, for example, store encrypted data). The sections storing encrypted and unencrypted data can be anywhere in the eVLU 40b, and there can be more than one section of each type.

In one embodiment, described further herein, the metadata portion 46 includes information about which regions in the logical unit portion are designated plaintext (unencrypted) regions. The metadata 46 provides enough identification information (but not the actual encryption key itself) to enable a host 1 running the I/O filter system 28 and in communication with the eVLU 40b to get the actual encryption key from the key manager server 26, as is described further in connection with FIGS. 2A-2C and 11A-11B.

Providing a key_id in metadata 46, where the key_id is presented to a key manager server 26 to get a key, provides advantages, especially for replication, that would not be available with other arrangements. Consider, for example, an alternate arrangement where, instead of a key manager server 26 storing a database that associates a key_id with a key (as is done with the present invention), the key manager server 26 instead stored a database associating a given key with the unique identifier associated with a source LUN itself (e.g., a device ID). On the one hand, because every LUN has its own unique device ID, such an arrangement would provide a way to get an encryption key for a given LUN from a key manager server 26 based only on the device ID of a given LUN, and, furthermore, this alternative arrangement would not even require an area of metadata on a LUN. However, this alternate arrangement might not be as optimal for situations where replicas are made of a LUN, because the replica, being a different device, would have its own device ID, and the replica device ID that would not be the same as the device ID of the source from which it was replicated.

Thus if a source LUN in this alternately considered arrangement were encrypted with a given key (stored at a key manager server), and the key manager server stored info linking just the source LUN device ID with the encryption key, a replica LUN made of the source LUN would not be able to access the appropriate encryption key at the key manager server, because the replica is on a LUN with a different device ID. Thus, extra steps would be required for the replica to obtain the device ID of the source LUN and to present the source device ID to the key manager, so that the key could be obtained. This would require considerable extra steps as compared to the implementations of the invention described herein. Replication also could require extra steps, potentially requiring changes in existing scripts for replication. Further, this alternate arrangement would not permit replication, writing data, reading data, etc., to be transparent, as it is with the embodiments of the invention described herein.

In contrast, in accordance with embodiments of the invention described herein, providing a metadata area 46 that stores an identifier that can be used to acquire an encryption key helps to ensure that creating and reading encrypted replica eVLUs is transparent and requires no additional steps beyond a regular replication process (assuming security requirements are met). The information needed for decryption is inherently made part of any replica made with any replication method, in accordance with the embodiments of the invention. Furthermore, a replica eVLU, created in accordance with embodiments of the invention described herein, will still be subject to the protections that the key manager server 26 provides as to unauthorized access. Even if an unauthorized entity gains custody of a replica eVLU, the unauthorized entity still will not be able to access data because the key manager will fail any unauthorized attempts to look up the key; that is, the security checks on the key manager (see FIG. 11B) will not be met.

The invention can be implemented in many alternative embodiments, as well. For example, in one alternative embodiment, the device ID of a replica eVLU is registered in the key manager server 26 and is associated in some way there with the key of the source eVLU. In still another alternative embodiment, the device_ID of the primary eVLU is written in metadata 46 and then used to look up the key.

Referring again to FIGS. 3A and 3B, the key_id in metadata 46 also serves as identifier of sorts for the eVLU 40b, to help the kernel 96 of an operating system running on the host recognize that a given LU 40 is, in fact, an eVLU (this is discussed in more detail in connection with FIG. 11A). That is, when the I/O filter driver 29 is running and encounters a "new" logical unit, the I/O filter driver 29 can check first to see if the metadata region 46 is present and can be read, and second, to see if the metadata includes a key_id, which indicates that the logical unit 40 contains encrypted data (which tells the I/O filter driver 29 that the LU 40 is an eVLU 40B and that it needs to get the encryption key from the key manager server 26) (this process is described more fully in connection with FIGS. 11A-11B). Another advantage of writing the key_id in metadata 46 is with replication: any host 1 that has permissions to communicate with the key manager server 26 (and which meets all security requirements) can access every replica made of an eVLU 40b and get the key and decrypt the replica. In addition, in at least some embodiments of the invention, there are two or more separate pieces of information stored in the metadata, such as one that says the LU 40 is encrypted and another that gives information used to look up the key.

Accordingly, whatever protections a key manager server 26 has in place for restricting a host 1 from obtaining the key for an eVLU 40b are likewise in place for replicas of the eVLU 40b. Thus, even if an unauthorized entity physically takes a storage device containing a replica of an eVLU 40b and mounts it to a different, unauthorized host, the unauthorized entity won't be able to access the data on the replica because unauthorized host will not be able to meet the security requirements of the key manager server 26 and therefore will not be successful in obtaining the key. Further, this requires no extra steps or added management scripts to implement. These and other processes are explained in greater detail in connection with the flow charts of 7-17 herein.

In the eVLU 40b, the location of the metadata 46 is platform specific and may depend further on the formatting of the device on that platform. Its illustration in FIGS. 3A and 3B as being at the "end" of the eVLU 40b is not limiting, although it is applicable for at least some embodiments of the invention.

In at least one embodiment of the invention, the eVLU 40b includes two copies of metadata, referred to as the primary and alternate copies. The primary and alternate copies need not be in contiguous segments, but could be in separate segments (such as at the beginning and the end). A valid primary copy of metadata 46 is always the authoritative copy as metadata updates are always performed on the primary copy first (more below). The alternate copy of metadata is for robustness to rollback to previous metadata state as appropriate. A copy of metadata is composed of two parts: header and data areas. The metadata header is a single block (512 bytes) in size, but this size is not limiting. The metadata data area is a variable length list of property name, property value pairs. Each property name is also variable length. In one embodiment, the key_id stored in the data portion of the metadata 46 has a size of 16 bytes, and this size is illustrative and not limiting.

In addition, in at least some embodiments of the invention, the processes that perform encryption have predetermined knowledge that certain blocks or other regions in the LU 40 should be kept as plaintext (e.g., region 44a of FIG. 3) and not be encrypted. For example, with certain operating systems, the first block in a volume corresponds to the volume table of contents (VTOC) and must be kept plain; in addition, the VTOC can include information identifying the location of the beginning of alternate cylinders, where all data from that point on is to be kept plain. The point is that any OS metadata that is accessed below the I/O filter driver 29 or prior to the loading of the I/O filter driver 29 at startup of the host 1 must be kept in plain text, because the I/O filter driver 29 has not yet been loaded to unencrypt it. However, only OS metadata (not any application data) is accessed in this way.

As an example, in one embodiment, the eVLU 40b can be implemented where some areas of the eVLU 40b other than the metadata 46 are left unencrypted (that is, the entire logical unit portion 44 is not encrypted, but is divided into unencrypted region 44a and encrypted region 44b, as shown in FIG. 3). This helps to support the needs of certain operating systems 41 to access their own metadata when it is accessed at different places (e.g., "lower") in the I/O stack 30 than where the I/O filter driver 29 resides and/or at different times (e.g., startup) than the I/O filter driver 29 is running. For example, when using the IBM AIX OS, sector 0 in a logical unit cannot be encrypted. For WINDOWS, the device signature (written to the logical unit) is accessed below I/O filter driver 29 or before I/O filter driver 29 is loaded and must be kept in plain text. In another example, on THE SUN SOLARIS OS, VTOC formatted devices holds the label, VTOC, and geometry information in the first block (block 0). This block is not encrypted so that the kernel layers below the I/O filter driver 29 that need to access this information can do so without use of the Xcrypt manager 64. Access to this information does not in itself constitute a security violation. Another unencrypted region for VTOC formatted devices are areas known as the alternate cylinders. Other platforms may be different based on device format and operating system specifics.

Leaving certain areas 44a of the eVLU 40b unencrypted other than the metadata areas 46 helps to prevent the I/O filter system 28 from encrypting operating system metadata stored on the eVLU 40b. In one embodiment, the I/O filter driver 29 of the I/O filter system 28 determines whether a request to write data is to a portion of the eVLU 40b used by the operating system 41. In such instances, the I/O filter driver 29 keeps certain data unencrypted that an operating system (OS) 41 accesses below the level of the I/O filter driver 29. In one embodiment, this is accomplished by recording in code, a data structure, a map, a table, or in the metadata 46 itself, the block ranges that are and/or must be in plain text. The block ranges that are left as plaintext depend on the operating system, as will be appreciated by those of skill in the art.

FIG. 4 is exemplary software architecture for the I/O filter driver 29 portion of the I/O filter system 28 of FIGS. 1-2, showing architectural elements to handle and provide support for encryption and decryption of I/O requests and replication of encrypted virtualized logical units (eVLUs) 40b, in accordance with one embodiment of the invention. The I/O filter driver 29 of FIG. 4 may be thought of conceptually as having the form of a "C" clamp with a top horizontal arm (labeled as the OS Interface 52), a bottom horizontal arm (labeled as the HBA Interface 56), and a vertical connector (labeled as the Common API's 54) between the top and bottom horizontal arms, as well as one or more extensions (which are shown in FIG. 4 as the horizontal arms extending in parallel between the top horizontal arm and the bottom horizontal arm, including all the extensions from 60-70, as well as the general purpose (GP) extension 75). Note that the extensions other than the xcrypt manager 64 and the vlumd manager 68 are all external to the embodiments of the invention and are provided by way of illustration only.

The c-clamp I/O filter driver 29 supports components for providing platform independent functionality for the I/O filter driver system 28 (see FIGS. 1-3) and also supports various platform dependent components for supporting specific operating systems.

Referring again to FIG. 4, the OS interface 52 may be, for example, an interface to any operating system (OS) such as Sun's SOLARIS, IBM AIX, HPUX, LINUX, and/or Microsoft's WINDOWS NT. The HBA interface 56 includes platform-dependent code comprising an interface to relevant host bus adapters. The Common API's 54 comprises a series of common Application Programming Interfaces (APIs). An advantage of the C clamp configuration of FIG. 4 is that extensions can be written in a platform-independent manner because the OS Interface 52, HBA Interface 56, and Common API's 54 translate all of the platform-dependent communications into more generic communications. Various extensions 60 through 70 are enveloped between the OS Interface 52 and the HBA Interface 56. Note that, although each extension is illustrated as a single extension, each extension could consist of a plurality of extensions.

The vertical line 72 in FIG. 4 running vertically from the operating system 41 through the host bus adapter 15 and pointing downward helps to indicate the direction and order that data takes from the operating system 40, through the I/O filter driver 29, and to an eVLU 40b and generally corresponds to the order in which the extensions are executed in response to an IO request. As those of skill of the art will appreciate, if a first extension needs processing or input provided by a second extension, then the second extension must be processed before the first extension in the I/O stack. For example, input to the I/O filter driver 29 from the operating system 41 is acted upon by the OS Interface 52, then the xcrypt manager 64, then the virtual LU metadata manager (vlumd) 68 before it passes out through the HBA interface 56 to the host bus adapter 15. Similarly, the vertical line 74 running upward from the host bus adapter 15 towards the operating system 41 indicates the direction of that data takes when it is output from an eVLU to the operating system 41. This is the direction of configuration of a device/LU (as will be described further in connection with FIGS. 7-17), as well.

In addition to a plurality of existing extensions (all are not illustrated, but the data migration extension 52 is illustrative), two new extensions are added in the embodiment of FIG. 4 to manage I/O requests and encryption and decryption, as well as a number of other features of the present invention. These extensions are explained below and further herein.

Figure 9:
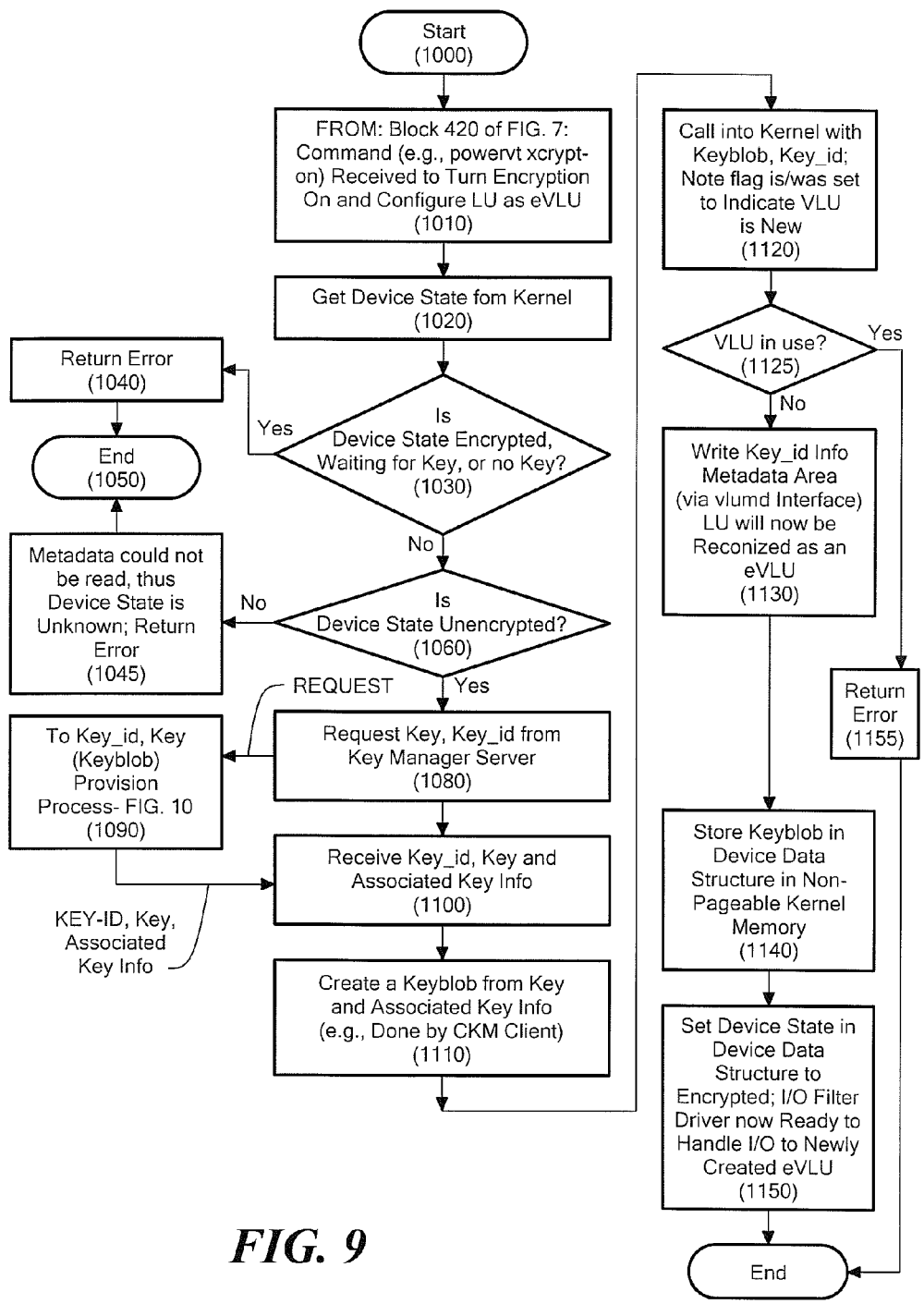
FIG. 9 is a flow chart of a method for configuring a new device as an encrypted VLU (eVLU), in accordance with one embodiment the invention.

The xcrypt manager extension 64 (xcrypt 64) is an extension that includes functionality to turn encryption on or off for a given logical unit, in response to a command from user space. The xcrypt manager extension 64 is the only extension that interacts with the crypto kernel 98 (see FIGS. 5 and 6) and can interface with various user space components (see FIGS. 5 and 6) using both kernel events mapped to the libemcp_events library 210 and IOCMDs (see FIG. 6). The xcrypt manager 64 supports several input-output commands (IOC- MDs) that are used by a component called libemcp_xcrypt 208 (see FIG. 6) to communicate with it. The libemcp_xcrypt 208 component services user commands from the powervt API 204 component and coordinates the events such as look up key event in the kernel 96. These commands, which are explained more fully as part of the flowcharts of FIGS. 7-17 herein, do the following things:

- Add the encryption property to a device (see, e.g., the flowchart of FIG. 9). This command also results in the provision of a key_id for the device and, optionally, other properties in addition to the key_id, if a given application requires it.
- Remove the encryption property of a device (see flowchart of FIG. 17).
- Push the KeyBlob (described further herein) to the xcrypt manager 64
- Return information as to whether a device is encrypted or not (see, e.g., flowcharts of FIGS. 9, 11A, 12, 13, 16 and 17)
- Update the xcrypt manager 64 internal device data structure for a particular device (whether it is encrypted or not)
- Optionally, resize an encrypted device Operationally, the xcrypt manager 64 itself also does the following:

- On configuration of a device (for instance, at host start up), checks whether the device has the encryption property (which is indicated by having a key_id stored in its metadata 46). If a device has such a key_id, the xcrypt manager signals an event to lookup the keyBlob (see FIGS. 11A-11B).
- On every read of a device (see FIG. 13), decrypt the data on the way back to the user. In one embodiment, this step happens as part of "IO DONE" (see FIG. 14) and may be done in interrupt context or queued to a helper thread, depending on performance needs.
- On every write of a device (see FIG. 12), encrypt the data before sending it down the I/O stack.

Whenever an eVLU 40b is encountered by the I/O filter driver 29 (usually at startup of the host 1), it is configured into the I/O filter system 28 by the xcrypt manager 64. At that point, the xcrypt manager 64 requests the key lookup of the encryption key by passing the key_id to a user space daemon (the xcrypt daemon 102—see FIGS. 5-6), where the daemon 102 is running a key manager client 86 that communicates with the key manager server 26 to get the key (see the processes of FIGS. 11A-11B). Once the key lookup is accomplished, the daemon 102 sends the encryption key to the xcrypt manager 64, which then has it available for doing I/O (see FIGS. 12-14). This request and response also contains a "device id" which identifies the underlying LUN that is encrypted and is used to lookup the data structure where the encryption key is stored in the kernel. As further described in connection with FIGS. 12-14, both read and write operations require the xcrypt manager 64 to allocate an additional buffer to hold the encrypted data. The original buffer will always hold the plain text version of the data.

The virtual logical unit metadata (MD) manager (vlumd) extension 68 takes care of establishing a metadata region 46 on a device, where the metadata region 46 can be unambiguously recognized, and provides controlled access to the metadata 46, protecting it from inappropriate access. The vlumd extension 68 also sets name value pairs into metadata 46 and gets the value back when presented with the name; it will be understood by those of skill in the art, however, that there are many other alternatives to the use of name/value pairs. The vlumd extension 68 provides a vlumd interface usable by the xcrypt manager extension 64. In one embodiment of the invention, the only user of the vlumd interface is the xcrypt manager extension 64. However, in other embodiments, the vlumd manager 68 is able to be extended to support other types of LU virtualization and LU functions, such as mirroring, striping, and thin provisioning.

The general purpose extension 75 is an intermediary between certain of the extensions (e.g., the xcrypt 64 extension, the data migration extension 62, and the vlumd 68 extension) and the c-clamp and provides more flexibility to the extensions by allowing dynamic loading.

FIG. 5 is a block diagram showing information and I/O flow during unattended operation of the I/O filter system 28 and computer system 1 of FIG. 1, in accordance with one embodiment of the invention, including many of the elements that are either part of the I/O filter system 28 or that interact with the I/O filter system 28. FIG. 6 is an architectural diagram showing, in greater detail, the I/O filter system components of FIG. 5 and illustrating, in accordance with one embodiment of the invention, a system for creating, using, and destroying encrypted virtual logical units (eVLUs) 40b. The architecture of FIGS. 5 and 6 may be implemented as part of the EMC POWERPATH ENCRYPTION with RSA product available from EMC Corporation of Hopkinton, Mass. The key manager server 26 can be, in one embodiment, the RSA KEY MANAGER product available from EMC Corporation. The Crypto Kernel 98 can be, in one embodiment, the BSAFE CRYPTO KERNEL available from EMC Corporation. In addition, as will be explained further herein, the system of FIGS. 5 and 6 can be used in cooperation with products that provide replication, such as SYMMETRIX REMOTE DATA FACILITY (SRDF) (available from EMC Corporation), TIMEFINDER (available from EMC Corporation), and MIRRORVIEW (available from EMC Corporation).

Referring now to FIGS. 5 and 6, the I/O filter system 28 includes components in both user space 82 and kernel space 96. The I/O filter system 28 components in kernel space 96 are the ones that interact with the storage arrays 3, 4, 9. In kernel space 96, the I/O filter system 28 includes an I/O filter driver 29 having the previously described (in FIG. 4) "C-clamp" architecture that includes an xcrypt manager 64 and a vlumd manager 68, along with kernel events 214. The kernel space 96 portion of the I/O filter system 28 is in communication with a crypto kernel 98 (which is illustrated in FIG. 5 as the B-SAFE CRYPTO KERNEL 98 and in FIG. 6 by the combination of the cryptography key manager (CKM) kernel 216 and encryption/decryption library 218, which together form a crypto kernel 98). The crypto kernel 98 (including the CKM kernel 216 portion) is in communication with the xcrypt manager 64 of the I/O filter driver 29.

In one exemplary embodiment, the crypto kernel 98 is implemented using the B-SAFE CRYPTO KERNEL product, available from RSA Security, which is owned by EMC Corporation of Hopkinton, Mass., to provide a cryptographic foundation for other security products that interact with the I/O filter system 28, such as the key manager server 26. In one embodiment, the crypto kernel 98 provides a collection of cryptographic algorithm implementations, including, for example, at least one of Advanced Encryption Standard (AES) (also known as Rinjdael) cipher block chaining (AES_CBC) encryption (256 bit keys) and/or AES tweakable block ciphers encryption (two 128 bit keys). Other cipher key strengths (e.g., a 128-, 192-, 256 or 512-bit encryption key sizes also are usable with embodiments of the invention.

Use of a symmetric encryption technique such as AES-based encryption is advantageous for embodiments of the invention where it is required that the size of the block remain the same after encryption as before (as those of skill in the art are aware, a number of encryption algorithms increase the size of a data block). As will be understood by those of skill in the art, the invention is not limited to only AES-based encryption algorithms. In certain embodiments, any encryption algorithm that does not change block size is usable. In at least some other embodiments, it may be possible to use encryption algorithms that do change the block size. Note that, in the embodiment of FIG. 5, the crypto kernel 98 protects its data via encryption using a data encryption key (DEK).

The kernel 96 provides abstraction layers for hardware, memory, processors, and input/output (I/O) and makes these tools available to the user space 82 through system calls. The kernel events 214 supports input/output commands (IOCMDs) such as waiting for an event, getting an event argument, and one call that any kernel extension can use to notify an event (that is put it on a queue for a user space entity to retrieve through a wait.

Referring again to FIGS. 5 and 6, the user space 82 components of the I/O filter system 28 include a common security toolkit (CST) 84, an xcrypt daemon 102 (which runs a key manager client 86), several user space data files 85 (including a set of configuration files 92 (signed and made tamper-proof by CST 84), a lockbox 94 (also provided by CST 84) and a key cache 90), a powervt command line interface (CLI) 202, a powervt application programming interface (API) 204, a cryptographic key manager (CKM) client interface 212, a key manager client 86, a libemcp_xcrypt userspace library 208, and a libemcp_events userspace library 210. One or more applications 32 also run in user space, but the applications 32 are not part of the I/O filter system 28. The I/O filter system 28 also includes several user space 82 scripts, including the xcrypt_config script and the xcrypt_startup script. The xcrypt_config script is run only once, after the initial installation of the I/O filter system 28, to execute all the commands that configure all the I/O filter system 28 components for performing encryption functions, using the configuration files 92 (see, e.g., block 640 of the process of FIG. 8). The xcrypt startup script is run to start the daemon 102 after reboot of the host 1 and is also called from the xcrypt config script to start the daemon 102 for the first time.

The key manager client 86 is a component of the key manager server 26 that operates remotely (incorporated into the 10 filter driver system 28 on host 1), and the key manager client 86 operates in concert with the key manager server 26 server. In the embodiment of FIGS. 5 and 6, keys are only provisioned by the key manager server by going through the key manager client 86. Referring again to FIGS. 5 and 6, provisioning happens starting in the powervt CLI 202 going through the powervt API 204, libemcp_xrypt 208 to CKM client 212 through key manager client 86 (not going through the daemon 102). It will be appreciated by those of skill in the art, however, that embodiments of the invention could be implemented where a different component provides keys to the key manager server 26, for provisioning to the I/O filter system 28 (that is, it is possible to generate keys outside of the key manager 26 itself, but later store the keys on the key manager 26).

The key manager client 86 can cache certain encrypted keys and therefore does maintain and obtain encryption keys, but only as a cache of what is on the key manager server 26 (which advantageously is the definitive source for encryption keys). The encryption keys include keys for encrypting and decrypting data. Note that there also are master keys for encrypting the encryption keys (i.e., key encryption keys (KEKs)), to provide further key security, but the KEKs are stored in the lockbox 94 and are used, in at least some embodiments of the invention (including but not limited to embodiments that are implemented in hardware based environments), to encrypt the data encryption keys (DEKs) stored in the client key cache 90. Only encrypted keys are stored in the key cache 90. Note that, in some embodiments the KEK is not used.

The I/O filter system 28 can be configured to work with various types of keys, such as 64, 128, or 256 bit keys, and with various encryption algorithms. In one embodiment, the keycache 90 is accessible only in user space 82. In another embodiment, the keycache 90 grants read-only access to the kernel 96.

The CST 84 includes command line interfaces (CLIs), application programming interfaces (APIs) and libraries to help provide functions such as user authentication (e.g., via CST Authentication 84*a*), role management (authorization) (e.g., via CST role management 84*b*) account verification, security functionality, and password protection. In addition, the CST 84 includes a lockbox 94 to securely store security information, configurations and passwords, including a CST master key. Passwords are encrypted, using CST facilities and stored in the lock box 94, or in the configuration files 92 in the encrypted form. The Lockbox 94 keeps the key for these encryptions in a secure fashion. The CST 84 also stores configuration files 92 in a tamper-proof fashion by implementing configuration services to securely sign configuration files for the key manager client 86 (and the configuration files 92 are signed to detect tampering with configuration information). The CLI 202 uses the CST 84 to authenticate users of the CLI 202. Authorization happens in the API 204 using role management and the authentication token passed in to the API 204 from the CLI 202.

The key manager client 86 can cache encryption keys (also referred to as data encryption keys (DEK)) locally in the secure key cache 90, along with other key attribute information. Usually this is done at the time the encryption key is first created and sent to the key manager client 86 by the key manager server 26, as will be explained further herein. These locally cached data encryption keys in the keycache 90 are encrypted using a locally and automatically generated key encryption key (KEK) that is secured using a master key provided via lockbox 94 and the CST encryption function. In one embodiment, the keycache 90 is accessible only in user space 82. In another embodiment, the keycache grants read-only access to the kernel 96. Note that the KEK is automatically generated at the time the host 1 is setup to use encryption services.

Communications between the I/O filter system 28 (including those of the key manager client 86) and key manager server 26 are protected in various ways, including use of trusted root and key manager server 26 certificates to prevent spoofing of the key manager server 26, and an encrypted secure sockets layer (SSL) protecting the communications themselves.

The CKM client 212 provides an abstract interface to the key manager client 86. For at least some embodiments of the invention, it is advantageous to abstract the interface to the key manager client 86 and key manager server components 26 so that other code providing these functions could be used in the future and to separate cryptography from the I/O control and operational paths. One concept for this abstraction is to create a context used by encrypt/decrypt in the kernel 96. The context includes a keyblob.

The keyBlob is an abstraction that contains all the information stored by the key manager server 26 that is needed by the encrypt/decrypt code. None of the information stored internally in the keyBlob is needed by the I/O filter system 28, so it is possible for the structure of the keyBlob to be opaque to the I/O filter system 28. There is a unique keyBlob for each logical unit, and, as explained further in the flowcharts of FIGS. 7-17 herein, the keyBlob is looked up by key_id (a globally unique identifier) and provisioned by a policy, such as key class. A keyblob includes the actual encryption key plus other information used by a given encryption algorithm, provided in accordance with a class definition provided to the key manager server 26. The key class definition includes information relating to information stored in the keyBlob, which include (but are not limited to): Key, key length, encryption algorithm, and mode of encryption algorithm. Note that although the keyBlob is a data structure handled in both user space 82 and the kernel 96, in at least some of the embodiments described herein, the keyblob is primarily used for encryption in the kernel 96, and the keyblob's handling in user space 82 is primarily related to getting the keyblob to the kernel 96.

The xcrypt daemon 102 launches the key manager client 86 to look up keys (actually keyBlobs) on behalf of the xcrypt manager 64 running in the kernel 96. The xcrypt daemon 102 calls into the library libemcp_xcrypt 208 (see FIG. 6) to wait for key lookup requests and once the xcrypt daemon 102 receives the request, the daemon 102 looks up the keyblob (which may involve requesting it form the key manager server 26 or could involve getting it from the client cache and then pushing the keyblob back into the kernel). The xcrypt daemon 102 is launched when the one-time use script, xcrypt_config, is run and every time the host 1 is rebooted.

As shown in FIG. 6, the powervt CLI interface 202 is a command interface to the powervt API 204. In other implementations, a web-based interface (not shown) may be included in addition to, or in alternative to the powervt CLI interface 202. The powervt API 204 represents an implementation of an application program interface (API) that provides a set of routines in libraries for implementing encryption on logical units.

The libemcp_xcrypt library 208 is the userspace 82 interface to the xcrypt manager 64 running in the kernel. The xcrypt library 208 interfaces with the libemcp_events 210 event subsystem, the xcrypt manager 64 and the CKM client 212 and provides functions to do the following:

Wait for a lookup key request (called by xcrypt daemon 202)

Push KeyBlob into kernel 98 to xcrypt manager 64 (called by xcrypt daemon)

Add encryption property to a device by calling into kernel 98 to xcrypt manger 64

Remove encryption property from a device by calling into kernel 98 to xcrypt manger 64

Inquire as to the encryption information of a device by calling into kernel 98 to xcrypt manger 64

The libemcp_events 210 is a userspace 82 library that supports the events subsystem. The userspace calls go through this library to wait for events from the kernel events 214. Libemcp_events 210 is used by the xcrypt daemon 102 to wait for key lookup events posted by the xcrypt manager 64 through the kernel events subsystem 214.

Figure 7:
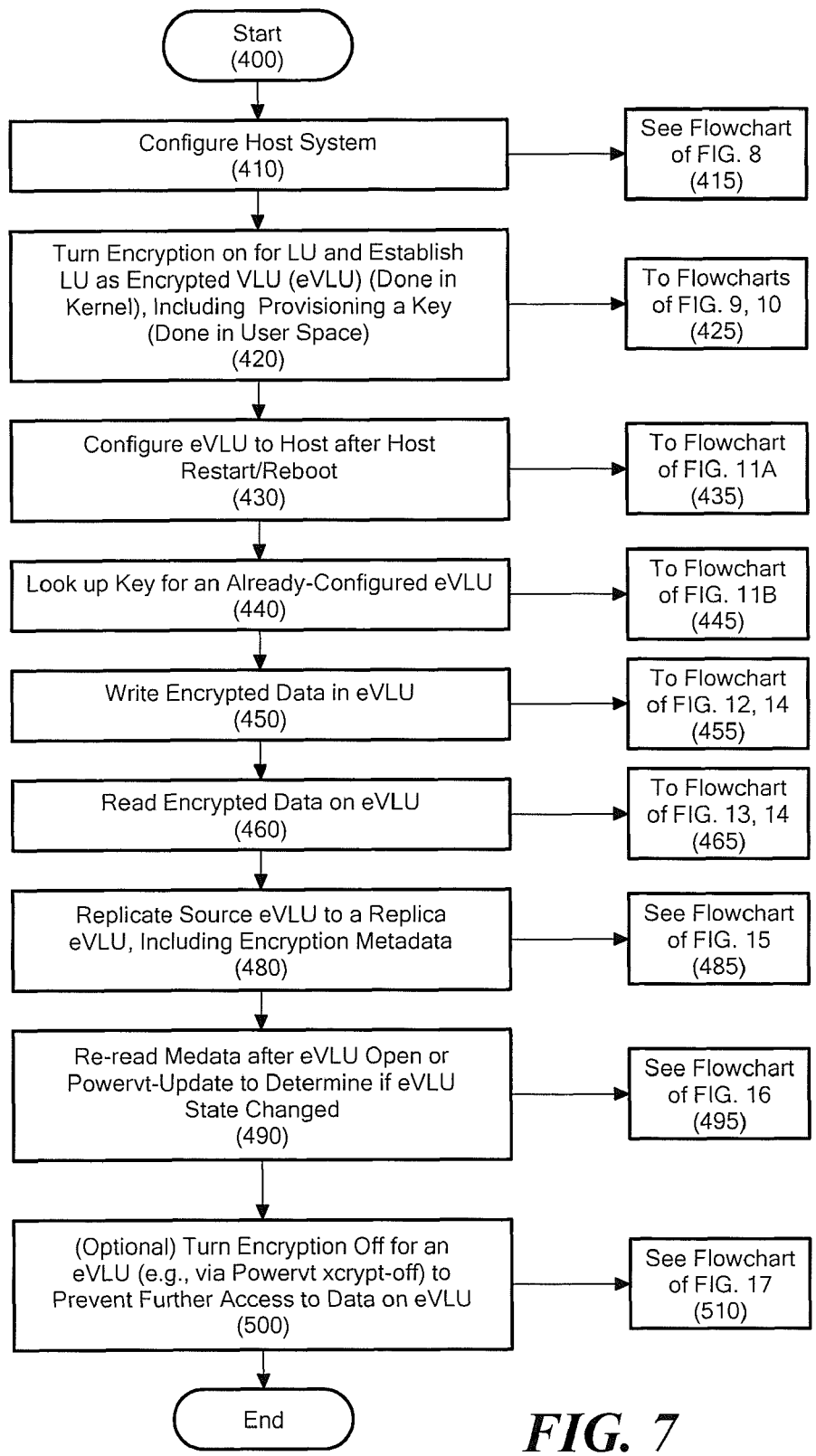
FIG. 7 is a high-level flow chart showing processes that can occur in the systems of FIGS. 1-6, in accordance with one embodiment of the invention.

FIG. 7 is a high-level flow chart showing processes that can occur in the system of FIG. 1, in which an I/O filter system 28 in accordance with one embodiment of the invention has been implemented. For the flowcharts of FIGS. 7-17, in many instances reference is made, as well, to components illustrated in FIGS. 1-6.

The processes of FIG. 7 are illustrated approximately in the order that they would occur. Note, however, that not every process shown in the blocks of FIG. 7 necessarily will occur for every I/O filter system 28. Initially, the host 1 is configured (block 410), using, e.g., the process of FIG. 8 (block 415). When configuration is done, encryption is turned on for a storage device 40 and the storage device 40 is established as an eVLU 40*b* (block 420), e.g. via the process of FIG. 9. Note that the VLU 40*a* represents a logical version of eVLU 40*b*, and the LU 40 is the combination of 40*a* and 40*b* together—the actual device. Block 420 includes provisioning a key, as well, via the process of FIG. 10. Another process that can occur is configuring the eVLU 40*b* to a host after the host has restarted or is rebooted (block 430), which process is discussed in greater detail in FIG. 11A (block 435).

Figure 11B:
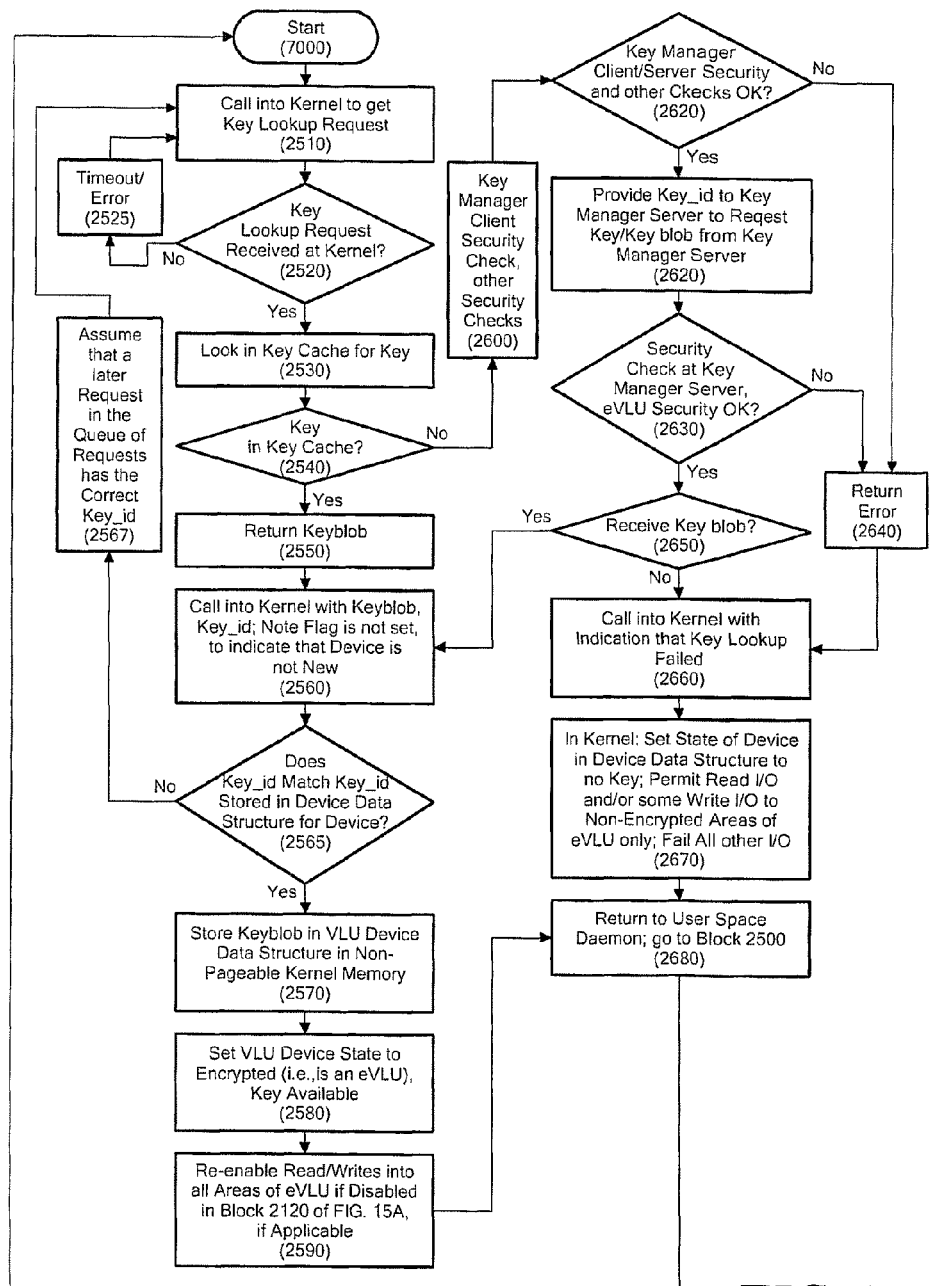
FIG. 11B is a flow chart showing a method for getting a key for a device that is being configured to a host via the method of FIG. 11A, in accordance with one embodiment of the invention.

A process for looking up a key for an already-configured eVLU 40*b* also can occur (block 440), as further shown in FIG. 11B (block 445). Processes for writing encrypted data to and reading encrypted data from an eVLU 40*b* (blocks 450, 460, respectively) also are provided, corresponding to the flowcharts of FIGS. 12-14. The source eVLU 40*b* can be replicated to a replica eVLU 40*b'* (block 480), via the process of FIG. 15, and the metadata on an eVLU 40*b* can be re-read to determine if the state of an eVLU 40*b* has changed (block 490), via the process of FIG. 16. Finally, an optional process is provided for turning encryption off for an eVLU 40*b* (block 500), via the process of FIG. 17.

Figure 8:
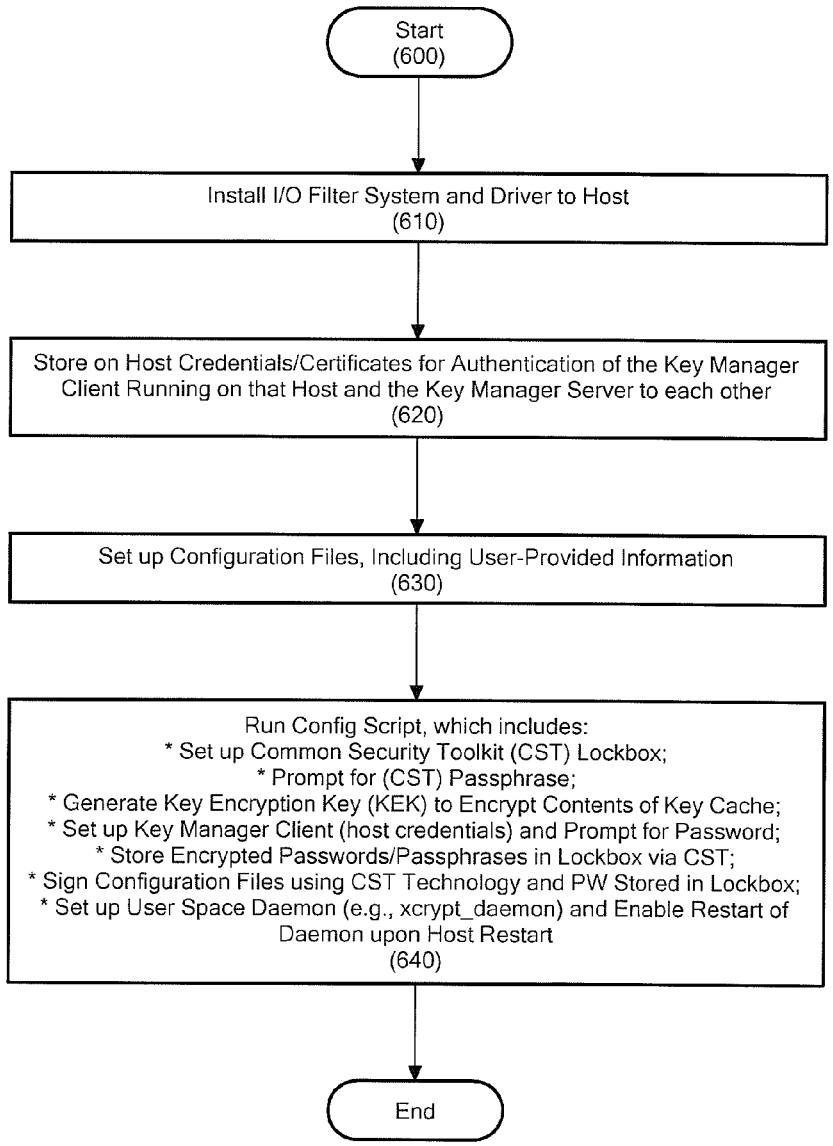
FIG. 8 is a flow chart of a method for configuring a host to use the I/O filter system and I/O filter driver system with encryption, in accordance with one embodiment of the invention.

FIG. 8 is a flow chart of a method for configuring a host to use the I/O filter driver system 28 with encryption, in accordance with one embodiment of the invention. The I/O filter system 28 and I/O filter driver 29 are installed to a host 1 (block 610), including installation of all host components and templates for configuration files. Credentials and/or certificates are stored on the host 1 (block 620) to authenticate the key manager client 86 and key manager server 26 to each other. Configuration files are set up (block 630) and configuration file templates are edited, e.g., by a user, to provide correct information. The file templates edited can include:

templates relating to a transport service (e.g., the location of the key manager server 26, credentials for communicating with the key manager server 26 over SSL, and other properties of communication between the key manager server 26 and key manager client 86' templates relating to cache services, logging services, and key class

Note that, in some embodiments of the invention, the host 1 must receive a license for the I/O filter system 28 (e.g., a license for POWERPATH ENCRYPTION WITH RSA) before running the configuration script below.

In block 640, a configuration script (e.g., xcrypt_config, as described herein) is run to enable the host 1 for encryption. The xcrypt_config is run once and only once on a host 1. Running xcrypt_config implements a number of components and actions, including setting up the CST lockbox 94 prompting for a CST passphrase to the CST lockbox 94 prompting for a PKCS (Public Key Cryptography Standard) password, which is created at the same time as the client credential file and which goes with the certificate that authenticates a host 1 to the key manager server 26 generating a key encryption key (KEK) to encrypt contents of the key cache 90

Storing encrypted passwords and passphrases in the lockbox 94 via CST (Optionally, passwords/passphrases can be encrypted and stored with configuration files instead of in lockbox) 84

Signing the configuration files using CST 84 and the password stored in the CST lockbox 94

Setting up the user space daemon 102 (e.g., xcrypt daemon 102) and enabling restart of the daemon 102 upon restart of host 1.

FIG. 9 is a flow chart of a method for configuring a new device as an encrypted VLU (eVLU) 40b, in accordance with one embodiment the invention. Note that FIG. 9 presumes that a host 1 has been configured per FIG. 8 and also performs a check that the device to be configured is not already in use. When the I/O filter system 28 is installed to a host and a command is executed that turns encryption on (e.g., powervt xcrypt—on) (block 1010) for a given device 4, 5, 9 (e.g., LU 40), the I/O filter system 28 first gets the state of the device (LU 40) from the xcrypt manager 64 in kernel 96, e.g. via a call from libemcp_xcrypt 208 into the kernel (block 1020). For example, a command queries the xcrypt manager 64 as to "what is the state of this device/LU?" The xcrypt manager 64 stores the state of every device it connects to. In response to the query as to whether the device/LU 40 is encrypted (1030), the xcrypt manager 64 will respond yes, no, or that the xcrypt manager 64 does not know.

If the xcrypt manager 64 indicates that the state of the device/LU 40 is already encrypted (i.e., a valid key_id already exists in the metadata 46), an error is returned (block 1040) and the process ends (block 1050). If a device state is not encrypted, waiting for key or no key, and not unencrypted, it is in an unknown state and an error also is returned (block 1045), and the process ends (block 1050). If, at block 1060, a device's state is returned as "unencrypted", a process begins to turn on encryption for the device (LU 40).

Figure 10:
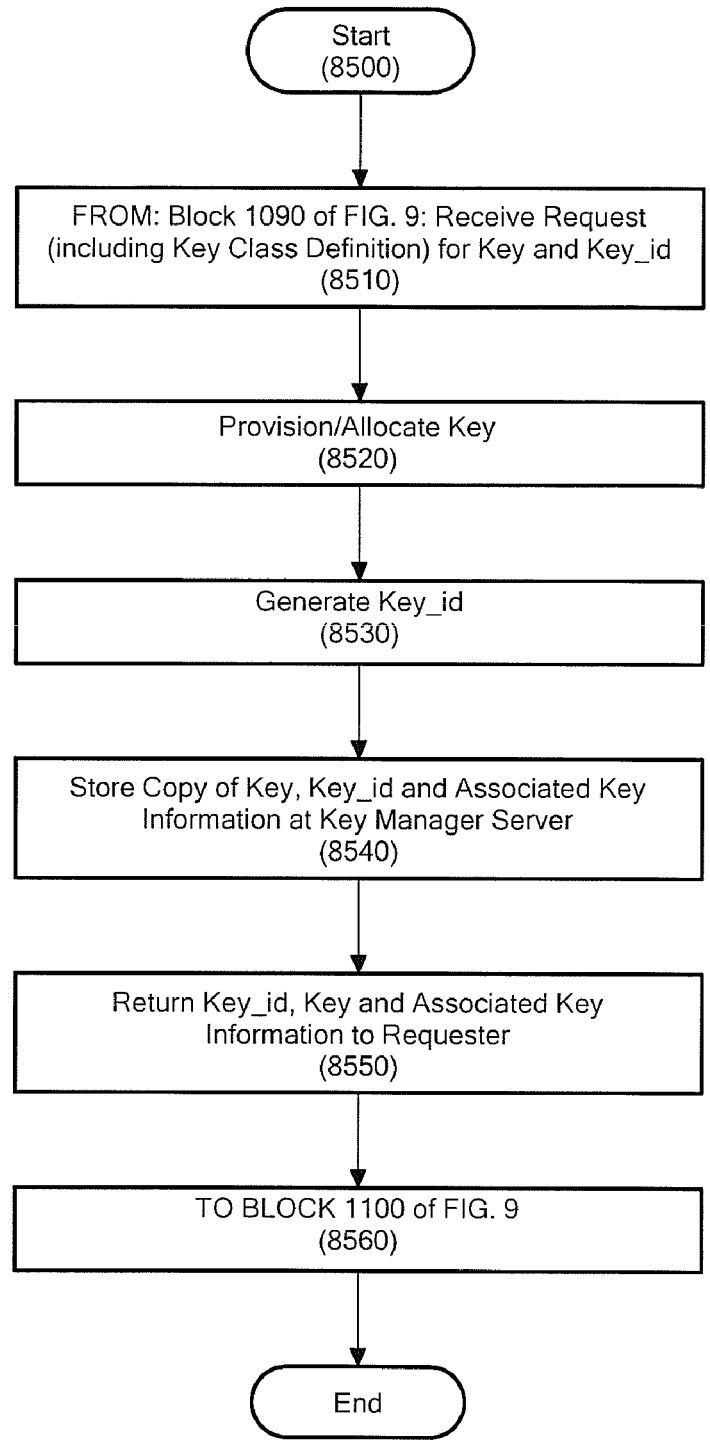
FIG. 10 is a flow chart showing a method of provisioning a key and key_id for a device configured in accordance with the process of FIG. 9, in accordance with one embodiment of the invention.

If the device (e.g., LU 40) is unencrypted, the process begins to get a key. A key and key_id are requested from the key manager server 26 (blocks 1080 and 1090), in the context of a call into libemcp_xcrypt to turn encryption on for a particular LU 40. At this point, the code in libemcp_xcrypt calls into the key manager client 86 code through the CKM interface 212 to provision a key. Referring briefly now to FIG. 10, FIG. 10 is a flow chart showing a method of provisioning a key_id and key (keyblob) for a device configured in accordance with the process of FIG. 9, in accordance with one embodiment of the invention. The blocks of FIG. 10 are processed at and in cooperation with the key manager server 26, in one embodiment of the invention. When the request for a key and key_id are received (block 8510), an encryption key is provisioned (block 8520). A unique key_id also is generated (block 8530); note that generation of the key_id could take place at another entity other than the key manager server 26, and then be provided in response to the request of block 8510.

A copy of the key, key_id, and associated key information (which is used to accomplish encryption/decryption and which will later become part of a keyblob) is stored at the key manager server 26 (block 8540). The key_id, key, and associated key information also are returned (block 8550) to the requester. Note that the key lookup of FIG. 10 can, in one embodiment, be accomplished locally, via a lookup to the keycache 90 that the key manager client 86 keeps on the host 1 and/or in the host 1 file system, where the key cache 90 can be preloaded with a "new" key; however, in this alternate embodiment, the steps of FIG. 10 would be performed in advance of turning on encryption for a particular device/LU 40. Alternately, as described herein, the key can be obtained directly from the key manager server 26.

Referring again to FIG. 9, at block 1100, the key_id, key, and associated key information (e.g., key length, key algorithm) are received (block 1100) at the I/O filter system 28, into libemcp_xcrypt 208. A keyblob is created (e.g., by the CKM client 212) based on the received key and associated key information (block 1110). The libemcp_xcrypt 208 then calls into the kernel to push the keyblob into the kernel. The keyblob and key_id are sent to the xcrypt manager (64) through an IOCMD. In addition, a flag is set to indicate that the VLU is "new" (i.e., this is a device newly having encryption turned on). (block 1120) After the keyblob and key_id are pushed, a check is made as to whether the VLU is in use (block 1125). If yes, then an error is returned (block 1155). If no, then the xcrypt manager 64 writes the key_id into the metadata 46, such as via the vlumd manager 68 (block 1130), which allocates metadata space, writes a signature into metadata space, and writes the key_id into metadata space. After the completion of block 1130, the LU will be recognized by a host or other entities as an eVLU (because the key_id has been written into metadata). The xcrypt manager 64 stores the keyblob and key_id in a device data structure kept in non-pageable kernel memory (block 1140) which ensures that the keyblob and key_id are protected by the kernel 96 and never get written to a persistent storage device, like a disk. The device data structure on the eVLU also includes device identifier (device_id) information, where the device_id is used to identify the underlying LUN that is encrypted and is used to lookup the data structure where the encryption key is stored in the kernel. Once block 1140 is complete, the state of the eVLU is set to encrypt in the device data structure, and the device 3, 4, 9 is now an eVLU 40b. At this point, the I/O filter driver 29 is ready to handle I/O to the newly created eVLU 40b.

FIG. 11A is a flow chart showing a method for configuring a device to a host after a host restarts or reboots, and whenever a device is configured to a host after the host starts up, in accordance with one embodiment of the invention. Note that the entire process of FIG. 11A is repeated for each device that is detected upon restart or reboot. Upon restart or reboot of a host 1 that has been configured with the I/O filter system 28 of the invention, a process begins to detect and configure all devices connected to the host, including eVLU devices (block 2010). This detection begins with an attempt to see if there is a metadata region on the device and, if so, can the metadata be read.

First, a determination is made as to whether metadata can be read (block 2020). For example, the xcrypt manager 64 attempts to read the key_id from the metadata 46, via the vlumd manager 68. If the metadata region cannot be read, it is presumed that the device state is unknown, and the device state is set to unknown in the device data structure (block 2050). If the device state is unknown, read access is permitted to areas of the LU 40 device that are known not to be encrypted, regardless of whether or not the device is an encrypted eVLU, and all other I/O to the device/LU 40 is failed (block 2050). Note that, in at least some embodiments of the invention, the I/O filter system 28 keeps track of regions or blocks of a device that are kept in plain text, even if the device is encrypted. Furthermore, in accordance with at least some embodiments of the invention, there are two types of regions that are unencrypted. As noted previously, some regions are known to be unencrypted for any device (block 0 on Solaris or Windows or AIX, for instance). Other regions are device dependent, stored in the metadata and can't be known at this point; the regions are known only after metadata can be read.

If the metadata location 46 was able to be read (block 2020), a check is made as to whether there is valid metadata in the location and whether that metadata contains a key_id (block 2060). For example, in one embodiment, the xcrypt manager 64 of the I/O filter driver 29, in one embodiment, checks whether there is valid metadata in the location. Note that a virtualized LUN could have a defined metadata region with metadata on it, but the metadata might not include a key_id. As those of skill in the art are aware, there are other types of metadata. If the answer to either of those questions is no, then it is presumed that the device is unencrypted, the device state is set to unencrypted in the device data structure, and all I/O to all regions of the device is permitted (block 2070), consistent with the type of device (for example, if the device is read only, write I/O will not, of course, be permitted). All I/O to all regions of the device is permitted by xcrypt.

If the metadata region 46 contains a key_id (block 2065), then the key_id can be used to get a key for access to data on the eVLU 40*b* (block 2090). A request for key lookup is made to the key manager client 86, such as via the xcrypt daemon 102 (block 2100). The request includes the device_id and the key_id, which is provided for key lookup. The device_id, in one embodiment, is used to identify the underlying LUN that is encrypted and is used to lookup the data structure (e.g., the xcrypt manager 64 within the I/O filter driver 29) where the encryption key is going to be stored in the kernel 96. The key lookup request goes into a queue of kernel requests (block 2105), as part of the kernel events 214. Note that there is a queue of requests in the kernel 96, and this request is added to the queue. The user space daemon 102 is constantly waiting for requests to be added to the queue in the kernel 96.

At the kernel 96 in the xcrypt manager 64, the key_id is stored in the device data structure for the device denoted by the device id for later checks (block 2110). The state of the eVLU is set to waiting for key (block 2120). In the waiting for key state, for an eVLU, I/O to all encrypted areas is disabled and/or pended until the key is looked up and cached in the kernel 96 in xcrypt manager 64. I/O is permitted, however, to non-encrypted areas as described above for the state being unknown. For example, if there are device specific regions that are in plain text, the device specific regions can also have I/O access, because the metadata can be read to get this information as to the regions that are in plaintext. The daemon 102 will request this particular event (lookup of a key).

As FIG. 11A illustrates, the state of each device also is stored in the device data structure; that is, the state as kept by the xcrypt manager 64 (which also keeps the device data structure). While the state of the eVLU 40*b* is waiting for a key, processing moves to FIG. 11*b*, which is a flow chart showing a method for getting a key for a device that has encryption turned on in accordance with one embodiment of the invention. This process is executed by the daemon 102. At block 2510, a call is made into the kernel 96 (into I/O filter driver 29) to get a key lookup request. If the key lookup request is not received at the kernel (block 2520), then a timeout occurs (block 2525), and calls are made again into the kernel, and the daemon 102 waits in the kernel until either a key lookup request arrives or the timeout occurs. If the key lookup request is received by the daemon 102, daemon 102 goes through the key manager client 86 to request the key associated with the unique key_id in the request. The key manager client 86 first attempts to find the key in the keycache 90 (block 2540). If the key is in the keycache, then the keyblob is returned (block 2550) and a call is made into the kernel with the keyblob and key_id (block 2560). Note that, in this block, when the keyblob is pushed, a flag is not set (as it was in block 1120 of FIG. 9) because the device in this block is not newly having encryption turned on.

A check is made (block 2565) as to whether the key_id provided in the IOCMD sending the keyblob into the kernel matches the key_id that was previously stored in the device data structure at the time the key lookup request was made (i.e., at block 2110 of FIG. 11A). For example, the IOCMD sending the keyblob into the kernel includes the unique key id and device id that were part of the key lookup request in block 2520. The xcrypt manager 64 uses the device id to locate the device data structure and then matches the unique key id. If there is no match (block 2567), it is assumed that a later request in the queue of requests will have the correct key_id, and the process returns to the user space daemon 102 running at block 2510 to wait for such a request.

If the key_id matches at block 2565, the keyblob is stored in the device data structure (block 2570) and the eVLU device state is set to encrypted (block 2580). Because the encryption key is available, reads and writes are enabled into all areas of the eVLU that were previously disabled, if applicable (block 2590), and the process returns to the user space daemon 102 running at block 2500 to wait for further key lookup requests.

If, at block 2540, the key was not in the keycache 90, then the key must be obtained from the key manager server 26. Note that, although not illustrated explicitly in FIG. 11B, if the key server is not found or cannot be connected to, an error can be returned, as would be expected by those of skill in the art. First, security checks are performed between the key manager client 86 and the key manager server 26, to verify that the host where the client is running is allowed access to the server and that the server is authentic (blocks 2600, 2620). If the security checks fail, an error is returned (block 2640), and the kernel (xcrypt manager 64) is informed that the key lookup failed (block 2660). If security checks pass, then the key_id is provided to the key manager server 26 to request a key and keyblob related information from the key manager server 26 (block 2620). An additional security check is performed at the key manager server 26 (block 2630), to verify that the host where the client is running is allowed to access the key associated with the unique key id. If the security is not OK, an error is returned (block 2640) indicating that key lookup failed (block 2660). If the security is OK, however, a check is made as to whether the key manager server 26 has returned a keyblob (block 2650). If the keyblob was returned, aforementioned blocks 2560 through 2680 are performed, as discussed previously.

If the keyblob was not returned at block 2650, a call is made into the kernel 96 (xcrypt manager 64) to indicate that the key lookup failed (block 2660). When key lookup fails, the state of the device is set to encrypt but no key. Read I/O (and write I/O, in some instances) is permitted to non-encrypted areas of the eVLU only, but all other I/O fails (block 2670). The process proceeds back to the userspace daemon 102 and block 2500 (block 2680).

With the flowcharts of FIGS. 11A and 11B, it is still important to remember that having the key_id alone is not enough to get a key to decrypt data. It is still necessary to fulfill all other security requirements, including for replicas. These security requirements include (but are not limited to):

- Using trusted root and key manager server certificates to prevent spoofing of the key manager server 26
- Encryption of communications between the host 1 (including key manager client 86) and key manager server 26 with SSL
- Signed configuration files (see FIG. 8) to enable detection of tampering with configuration information
- Use of host credentials to prevent unauthorized host access to the encryption key
- Requiring a user operating on a host 1 to have root access and/or administrator access
- Users interacting with the key manager client 86 and/or key manager server 26 must meet whatever security requirements are in place by the vendor of the key manager server, if applicable Of course, those of skill in the art will appreciate that many different security techniques and implementations are usable with one or more embodiments of the invention.

Figure 12:
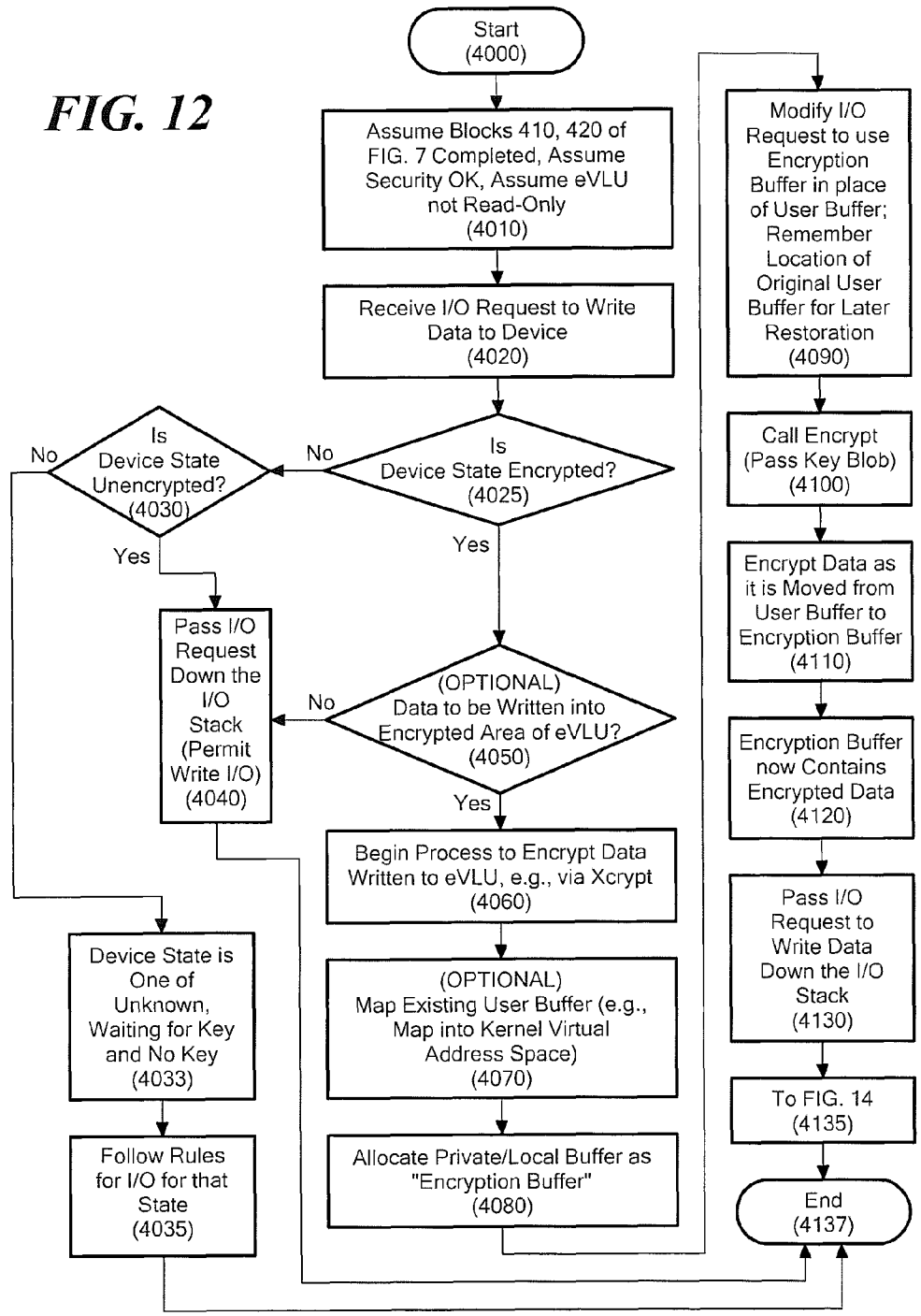
FIG. 12 is a flow chart showing a method of writing data to an eVLU, in accordance with one embodiment of the invention.

FIG. 12 is a flow chart showing a method of writing data to an eVLU 40*b*, in accordance with one embodiment of the invention. Referring to FIG. 12, it is assumed (block 4010) that the host system 1 associated with the eVLU has been configured per FIG. 8 and that the eVLU 40*b* has been configured to a host (with encryption turned on and a key provisioned, etc.), per. FIGS. 9 and 10. When an I/O request to write data to a device is received (block 4020), the I/O filter system 28 (actually the I/O filter driver 29 and within that the xcrypt manager 64) checks whether the device state stored in the device data structure is set to encrypted (block 4025). If the device state stored in the device data structure is not set to encrypted, a check is made as to whether that state is set to unencrypted (block 4030). If the state of the device is set to unencrypted, then all I/O is permitted (block 4040) and the write request is passed down the I/O stack (4040). If the device state is encrypted, an optional check is made as to whether the request to write data involves writing data to an encrypted area of the eVLU 40*b* (block 4050). Recall that, in some embodiments, the eVLU 40*b* can be configured so as to have, in addition to the metadata region 46, a non-encrypted area 44*a* and an encrypted area 44*b*. If the eVLU 40*b* is configured such that all areas of it (excepting the metadata 46) are encrypted, then the optional check at block 4050 may not be necessary.

Referring again to FIG. 12, if the device state is encrypted but the I/O request is to write data to a nonencrypted area or block of the eVLU 40*b* (block 4050), then write I/O is permitted (block 4040) and the I/O request is passed down the I/O stack. If the device state is encrypted and the I/O request is to write data to an encrypted area of the eVLU 40*b* (whether by default—because the entire eVLU 40*b* is encrypted, or because the I/O filter driver 29 of the I/O filter system 28 is aware that the blocks to be written to are encrypted blocks), then the process to encrypt data written to the eVLU 40*b* is begun (block 4060). The xcrypt manager 64 is used to accomplish this, as well as the other steps of FIG. 12, except for the encrypt call itself (block 4100), which is made from the xcrypt manager 64 to the crypto kernel 98 module/code.

Optionally, the existing user buffer is mapped into the kernel virtual address space in order to make it accessible from the kernel (block 4070). The xcrypt manager 64 allocates a private/local buffer as an "encryption buffer," to hold the encrypted data before it is written to the eVLU 40*b* (block 4080). To ensure that the data to be written is going to be encrypted before being written, the I/O request is modified so as to (temporarily) use the encryption buffer in place of the user buffer (block 4090). The location of the original user buffer is retained for later restoration.

The xcrypt manager 64 calls encrypt by passing the device-specific keyblob to the CKM kernel 216 of the crypto kernel 98, and the CKM kernel 216 passes the keyblob to the encrypt/decrypt lib 218 of the crypto kernel 98. The crypto kernel 98 uses the keyblob to encrypt data as it is moved from the user buffer to the encryption buffer (block 4110). The encryption buffer now contains encrypted data (block 4120). The I/O request to write data is passed down the I/O stack (block 4130). I/O then passes through its normal places in the I/O stack (e.g., as partially shown in FIGS. 3 and 4), eventually passing through the HBA 15 and to the storage device. Processing at this point proceeds to the process of FIG. 14 (block 4135).

Figure 14:
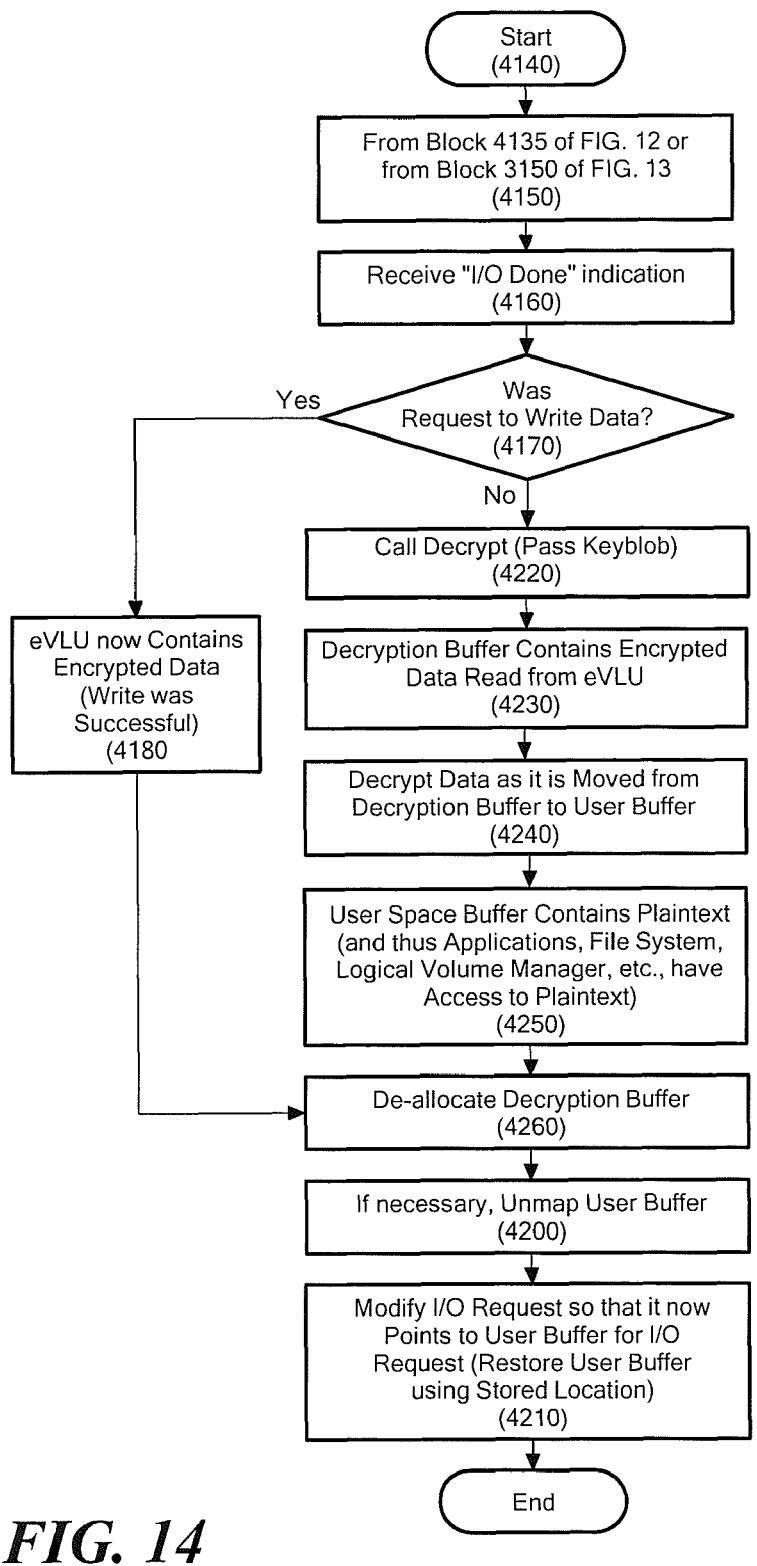
FIG. 14 is a flow chart showing a method of completing input/output and restoring the user buffer after the methods of either

Before proceeding with FIG. 14, one path in FIG. 12 still requires discussion. In block 4025, if the state of the device isn't encrypted, a check is made as to whether the state of the device is unencrypted (block 4030). If the device state is not unencrypted, and isn't encrypted, then the device state is one of three other states (unknown, waiting for key, no key (block 4033). In one embodiment, the I/O filter system follows a set of I/O rules for the state and conditions applicable to the device based on device state which depends on the validity and/or availability of the key_id and the keyblob (block 4035). Table 1 lists some exemplary rules for at least one embodiment of the invention for encrypted regions of the device, and, in accordance with another embodiment of the invention, for unencrypted regions of the device, is provided below (these rules are illustrative and not limiting.

TABLE 1

Table of device states and I/O path behavior for encrypted and unencrypted regions of the device

| Device Key State | Description | Unique_ KeyID | KeyBlob | I/O Path Behavior in encrypted regions | I/O path behavior in unencrypted regions |
|---|---|---|---|---|---|
| Un-encrypted | Device is not Encrypted | Not Valid | Not Valid | Pass through I/O | Pass through I/O |
| Encrypted | KeyID known; key available | Valid | Valid | Encrypt/decrypt I/Os | Pass through I/O |
| Waiting for Key | KeyID known; waiting the hear back from daemon | Valid | Not Valid | Pend I/Os; pend or allow opens | Pass through I/O |
| No Key | KeyID known; key lookup failed on last attempt | Valid | Not Valid | Fail I/Os | Pass through I/O |
| MD Unknown | State of vlumd (metadata) is unknown (e.g., can't read metadata) | Not Valid | Not Valid | Fail I/Os | Pass through I/O |

Figure 13:
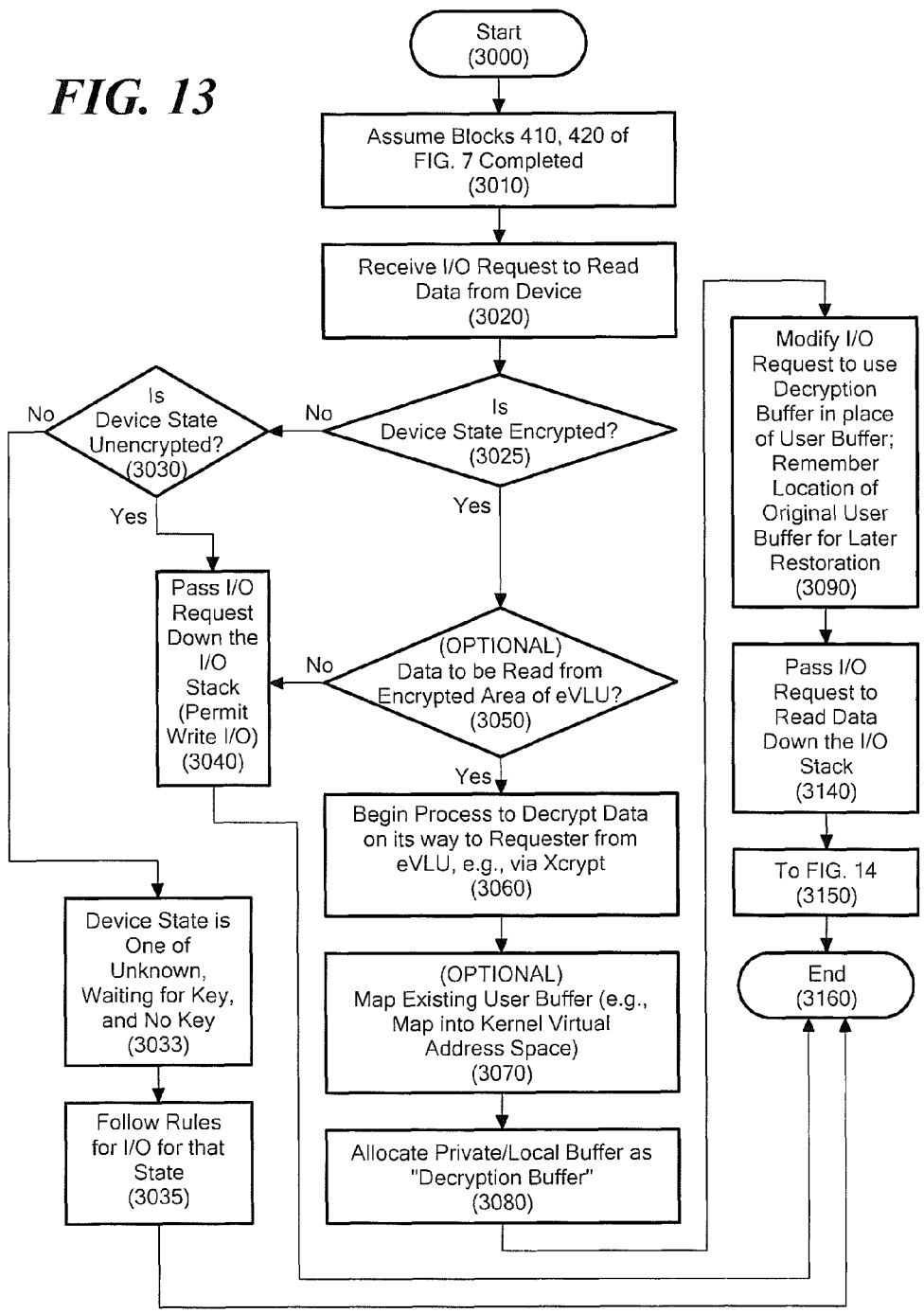
FIG. 13 is a flow chart showing a method of reading data from an eVLU, in accordance with one embodiment of the invention.

FIG. 14 is a flow chart showing a method of completing input/output and restoring the user buffer after the methods of either FIG. 12 or FIG. 13 are completed. In the context of the writing of data to the eVLU 40*b* in accordance with the process of FIG. 12, for asynchronous I/O, as is known in the art, whenever data is sent, an acknowledgement such as an "I/O DONE" interrupt is received (block 4160). If the original request was to write data (block 4170), and the I/O done interrupt is received, then the eVLU 40*b* now contains encrypted data, and the write data request was successful (block 4180). It is possible that the I/O request will return an error instead of the I/O done interrupt, as will be well understood by those of skill in the art; if an error is returned instead of "I/O done", then the action being requested (a write or a read) will not occur.

Referring again to FIG. 14, the encryption buffer is de-allocated (block 4260). If necessary, the user buffer is unmapped from kernel (if such mapping occurred in block 4070 of FIG. 12 or block 3070 of FIG. 13) (4200). The I/O request is modified so that it again points to the user buffer (block 4210).

FIG. 13 is a flow chart showing a method of reading a device, in accordance with one embodiment of the invention.

In many respects, the method of reading data is quite similar to the method of writing data of FIG. 12, except that decryption (for the read) is done after the I/O request returns from the disk. Referring to FIG. 13, it is assumed (block 3010) that the host system 1 associated with the device has been configured per FIG. 8 and that the eVLU 40b has been configured to a host (with encryption turned on and a key provisioned, etc.), per. FIGS. 9 and 10. It is advantageous, although not required, for the eVLU 40b to actually contain data written to it since encryption was turned on. If an attempt is made to read an encrypted eVLU 40b where the eVLU 40b contains no data written since encryption was turned on, then the read will return "garbage" or "nonsense" data, because it will use the key associated with this device to decrypt whatever the contents at the read location is.

When an I/O request to read data from a device is received (block 3020), the I/O filter system 28 (actually the xcrypt manager 64 within the I/O filter driver 29) checks whether the device state stored in the device data structure is encrypted (block 3025). If the device state isn't encrypted, then all read I/O is permitted (block 3040). In block 3025, if the state of the device isn't encrypted, a check is made as to whether the state of the device is unencrypted (block 3030). If the device state is not unencrypted, and isn't encrypted, then the device state is one of three other states (unknown, waiting for key, no key (block 3033). In one embodiment, the I/O filter system follows a set of I/O rules for the state and conditions applicable to the device based on device state, which depends on the validity and/or availability of the key_id and the keyblob (block 3035). Table 1, listed above in connection with block 4035 of FIG. 12, also is applicable to block 3035 of FIG. 13.

If the device is encrypted (i.e., is an eVLU 40b), an optional check is made as to whether the request to read data involves reading data from an encrypted area of the eVLU 40b (block 3050). Recall that, in some embodiments, the eVLU 40b can be configured so as to have, in addition to the metadata region 46, a non-encrypted area 44a and an encrypted area 44b. If the eVLU 40b is configured such that all areas of it (excepting the metadata 46) are encrypted, then the optional check at block 3050 may not be necessary.

Referring again to FIG. 13, if the eVLU 40b is encrypted but the I/O request is to read data from a nonencrypted area or block of the eVLU 40b, then read I/O is permitted (block 3040) and the I/O request is passed down the I/O stack. If the eVLU 40b is encrypted and the I/O request is to read data from an encrypted area of the eVLU 40b (whether by default—because the entire eVLU 40b is encrypted, or because the I/O filter system 28 (in particular the xcrypt manager 64 in driver 29) is aware that the blocks to be read from are encrypted blocks), then the process to decrypt data written to the eVLU 40 is begun (block 3060). The xcrypt manager 64 is used to accomplish this, as well as the other steps of FIG. 13, except for the decrypt call itself (block 4220 of FIG. 14), which is made from the xcrypt manager 64 to the crypto kernel 98 module/code.

Optionally, the existing user buffer is mapped into the kernel virtual address space in order to make it accessible from the kernel (block 3070). The xcrypt manager 64 allocates a private/local buffer as a "decryption buffer," to hold the encrypted data (cipher text) when it is read from the eVLU 40b (block 3080). To ensure that the data to be read is going to be decrypted before being returned to the caller, the I/O request is modified so as to (temporarily) use the decryption buffer in place of the user buffer (block 3090). The location of the original user buffer is retained for later restoration. The I/O request to read data is then passed down the I/O stack (block 3140). I/O then passes through its normal places in the I/O stack (e.g., as partially shown in FIGS. 3 and 4). Processing at this point proceeds to the process of FIG. 14 (block 3150).

In the context of the reading data from the eVLU 40b in accordance with the process of FIG. 13, for asynchronous I/O, as is known in the art, whenever data is received, an acknowledgement such as an "I/O DONE" interrupt is received (block 4160). If the original request was to read data (block 4170), and the I/O done interrupt is received, then the xcrypt manager 64 calls decrypt by passing the device-specific keyblob to the crypto kernel 98 (block 4220). The crypto kernel 98 decrypts data as it is moved from the decryption buffer to the user buffer (block 4240). The user buffer now contains plaintext (block 4250), and the read request was successful. The encryption buffer is de-allocated (block 4260). If necessary, the user buffer is unmapped (4200) (i.e., if such mapping was done at block 3070 of FIG. 13). The I/O request is modified so that it again points to the user buffer (block 4210).

Figure 15:
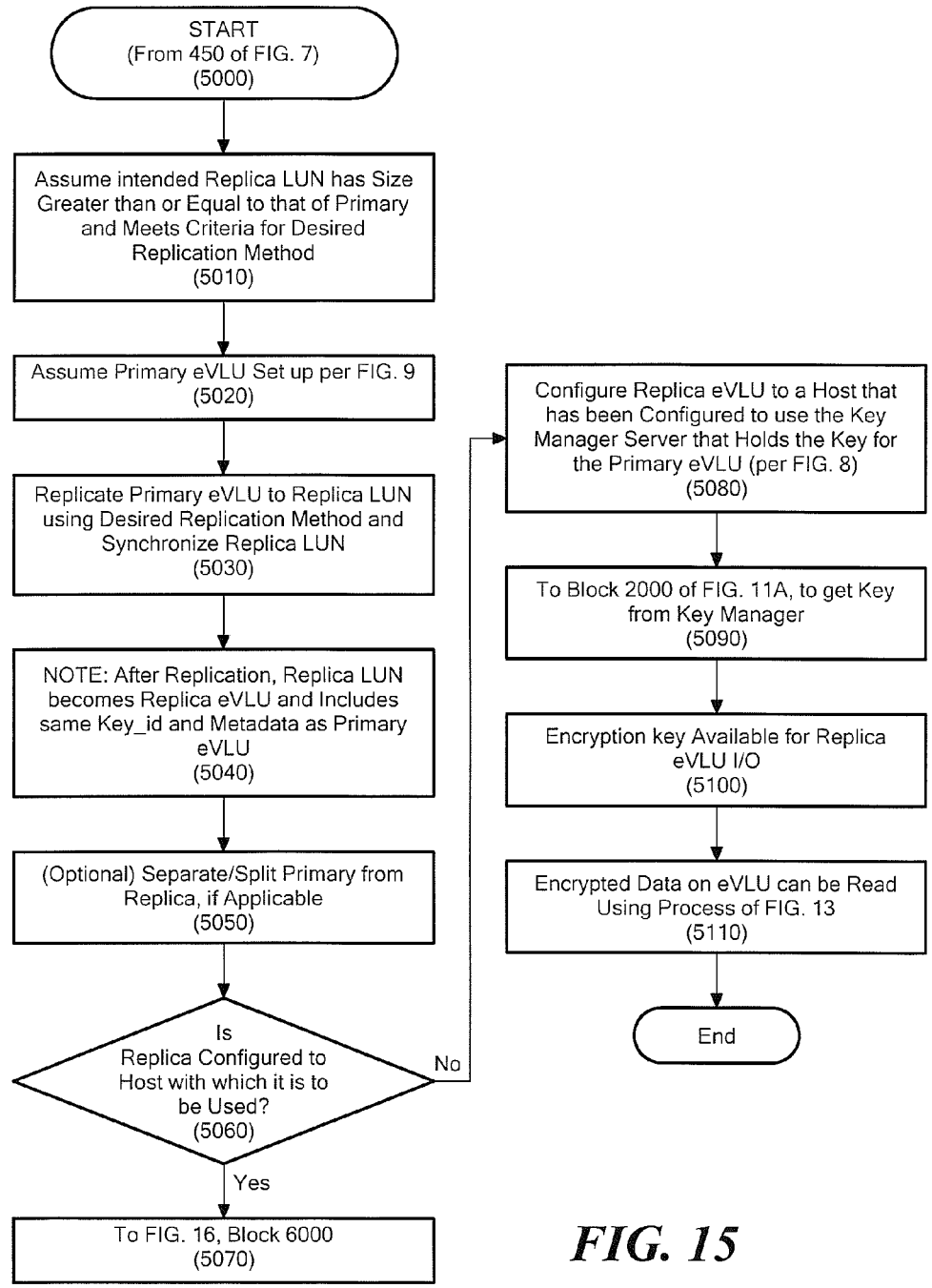
FIG. 15 is a flow chart showing a method of replicating an eVLU configured in accordance with the method of FIG. 9 and/or written to in accordance with the method of FIG. 12, in accordance with one embodiment of the invention.

FIG. 15 is a flow chart showing a method of replicating an eVLU 40b configured in accordance with the method of FIG. 9, where data may or may not have been written to the eVLU 40b in accordance with the method of FIG. 12, in accordance with one embodiment of the invention. At the start of the process of FIG. 15, it is assumed that the LUN to which a primary eVLU 40b is to be replicated has a size greater than or equal to the size of the primary (block 5010), so that there is sufficient room for a complete replica. Note that, in some embodiments (e.g., data migration situations where the size of the LU is being grown), the size of the replica eVLU can be larger than the size of the primary eVLU. In these embodiments, the location of the metadata in the replica may be different than its location in the primary, and a powervt resize command moves the metadata and adjusts the size as allowed by the vlumd manager 68, so that the additional space can be seen and used by those functions above the I/O filter driver 29 in the I/O stack. It also is assumed that the intended replica LUN meets the criteria for the desired replication method.

The primary/source eVLU 40b is replicated to a replica LUN. The replication can be by methods that include (but are not limited to) methods such as those used in the aforementioned SRDF, Timefinder, and Mirrorview products from EMC. As part of replication, the data on the replica LUN is synchronized with the data on the source eVLU 40b. Known replication technology, such as Timefinder (replication within an array) or SRDF (replication between arrays over a network that connects them directly) for the SYMMETRIX line of disk arrays (available from EMC Corp.), can, for example, be used for synchronization. In another example, an appliance or switch in the network can replicate between two devices on the network, on the same or different arrays. In still another example, where the source and replica logical volumes are located within a single array, data can be transmitted from the source logical volume to the target logical volume without involving a network or a host. During the synchronization, an application on host 1 may have continued access to the information on the source eVLU 40b.

The synchronization part of replication involves moving or copying the data from the source (or primary) eVLU to the replica LUN. As is understood in the art, various techniques can be used to perform synchronizations. For example, a mirroring facility, such as the SYMMETRIX Remote Data Facility (SRDF) available from EMC Corporation, Hopkinton, Mass., may be used to create minors between source and target volumes on different storage systems and to then synchronize them so that the storage systems themselves perform the copy.

In another situation, the replica eVLU might be removed from the host while synchronizing and is then configured back to the host when synchronization is complete. Note that removing a device from the host causes the host to notice that the device has been removed, and the host discards its cached information about the device.

Referring again to FIG. 15, after replication and synchronization, the replica LUN becomes a replica eVLU and, because the metadata was also replicated, the replica eVLU has in its metadata the same key_id as the metadata on the source/primary eVLU (block 5040). Optionally, the source/primary eVLU can be separated or split from the replica eVLU, if that step is required by the replication method (block 5050). If the replica eVLU was already configured to the host 1 with which it is to be used (block 5060), then processing proceeds to FIG. 16, block 6000 (block 5070). If, however, the replica eVLU is not yet configured to the host 1 with which it is to be used, then the process of FIG. 11A is run to configure the replica eVLU to a host that has been configured to use the key manager server that holds the key for the primary eVLU (per FIG. 8) (block 5080). Depending on the protected perimeter desired, the replica eVLU can be configured to the same host as the source eVLU, or can be configured to a different host. However, the replica eVLU and the source eVLU need access to the same key manager server or replicas of that key manager server.

Note that configuration will lead to looking up a key for the replica eVLU (block 5090), where the key itself will be the same as that for the source eVLU. Once the replica eVLU is configured to a host and the key is available (block 5100), encrypted data on the replica eVLU can be read, such as via the process of FIG. 13.

One point that should be appreciated regarding the process of FIG. 15 is that no extra steps are required over what is required to replicate a plain text volume, so long as each host that "sees" an eVLU is properly configured with the I/O filter system 28 and that all hosts that share replicas (e.g., like the arrangement shown in the protected perimeter of FIG. 2B) use/have access to the same key manager server. Generally, for replica eVLUs, the key to access encrypted data on the eVLU is looked up either by configuring the replica (block 5080) or by "opening" the replica eVLU (for those operating systems that have device open as a feature). The key_id stored in the metadata in the replica eVLU is used to obtain the key, the same as occurs with a non-replica eVLU. For some situations (e.g., those running on WINDOWS-based operating systems and other situations where a replica LUN is not opened before access), a command such as powervt update might need to be run to trigger the kernel to recognize the change in state of a device (e.g., a LUN going from unencrypted to being an eVLU). This is further addressed in FIG. 16. In another situation, the replica device is removed from the host while synchronizing and is then configured back to the host when synchronization is complete; in this case, the processes shown in FIGS. 11A and 11B will be executed, and the powervt update command is not needed.

Figure 16:
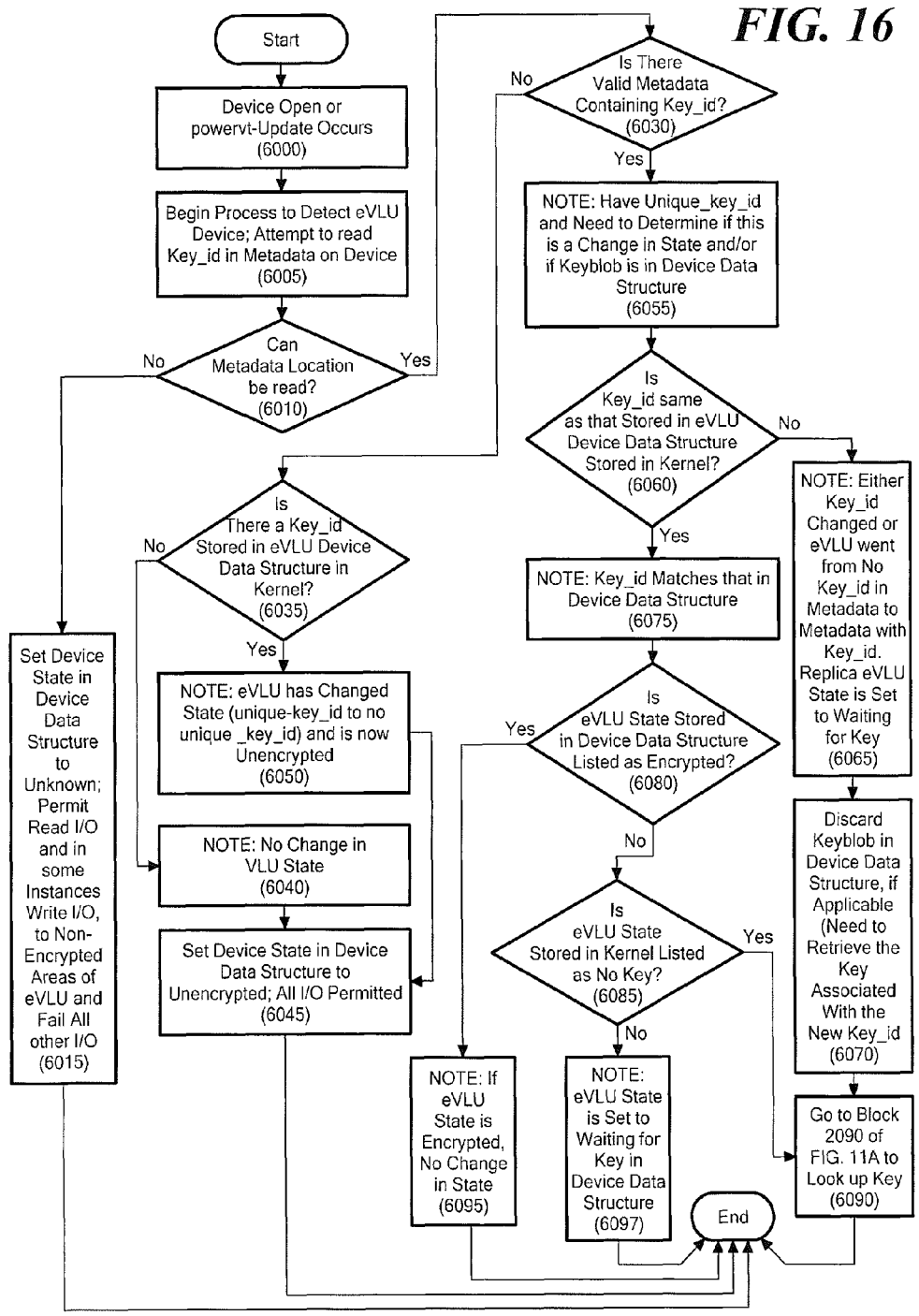
FIG. 16 is a flow chart showing a method of re-reading the metadata for a device, including a device whose state may have changed since host restart, in accordance with one embodiment of the invention.

FIG. 16 is a flow chart showing a method of re-reading the metadata for a device, including a device whose state may have changed since host restart, in accordance with one embodiment of the invention. Generally, metadata 46 on an eVLU 40b needs to be re-read when certain things occur, such as after data has been replicated to a device, after opening a device (on nearly all non-WINDOWS systems, there is a device open before writing data to or reading data from a device), and in situations where powervt update is run, such as on a WINDOWS system and/or to cover situations where metadata is changed on a device. Another situation that can trigger a change in metadata is a replica being synchronized with a different source device. In the flow chart of FIG. 16, it is assumed that the a given device has already been configured into the I/O filter system 28 such that the kernel 96 (xcrypt manager 64 in driver 29) has stored the device state in the device data structure at the time of host restart or the last time the procedure in FIG. 16 has been run.

In block 6000 of FIG. 16 a device open or powervt update has occurred, or some other event has occurred that triggers a re-read of metadata on a device. A process is begun to detect whether a particular device, being opened or updated is an eVLU device 40b, starting with an attempt by the vlumd manager 68 to read metadata 46 on the device, to determine if there is a key_id is in the metadata 46 (block 6005). If the metadata location cannot be read (block 6010), then the state of the device is set to unknown (that is—it cannot be determined if the device is an eVLU), and read I/O, and in some instances write I/O is permitted to non-encrypted areas of the device (assuming that the I/O filter system 28 has knowledge of which areas, if any, are non-encrypted), but all other I/O fails (block 6015). The situation of a metadata location being unable to be read can occur, for example, if a storage device is offline or "not ready" (which is the state of a TIMEFINDER business continuance volume (BCV), for example, when it is being synchronized with the primary device.)

If, at block 6010, the metadata location 46 can be read, a check is made as to whether there is valid metadata containing a key_id (block 6030). If there is not valid metadata containing a key_id, a check is made, e.g., by the vlumd manager 68, whether a key_id is stored in the device data structure in the xcrypt manager 64 (block 6035). If no key_id is stored in the device data structure, then there has been no change in the state of the device (block 6040), and the device state remains unencrypted, and all I/O is permitted (block 6045). Note that all blocks in FIG. 16 after block 6005 take place, in one embodiment, in the kernel.

If there is not valid metadata containing a key_id, but there was a key_id stored in the kernel (i.e., a yes answer at block 6035), then that indicates that the device has changed state (block 6050); namely, going from having a key_id to having no key_id, meaning that the device has changed state from encrypted to unencrypted. For the unencrypted device state, all I/O is permitted (block 6045).

If there is valid metadata that can be read and it contains a key_id, then a determination must be made if this represents a change in state and/or if the key is in the device data structure (block 6055). If a key_id was returned in block 6030, then determinations need to be made as to whether this represents a change in state for the device, whether the key_id is the same as that previously stored in the device data structure, and also whether the keyblob associated with the key_id is stored in the device data structure (block 6055). If the key_id returned in block 6030 is the same as that stored in the device data structure in the kernel (block 6060), then a check is made as to whether the device state stored in the device data structure is encrypted. If the state is encrypted, then the associated keyblob is also stored in the device data structure (block 6080). If the device state stored in the device data structure is listed as encrypted, that means that there has been no change in state.

If the device state stored in the device data structure is not listed as encrypted, then a check is made as to whether the device state stored in the device data structure is "no key" (block 6085), which means that there is no keyblob in the device data structure, but the device is encrypted. If Yes, the key needs to be retrieved, and the process of FIG. 11A is used to look up the key that goes with the key_id (block 6090). If the device state is not "no key", then, by process of elimination, it must be "waiting for key" (block 6097). In this case, the key_id is unchanged and the request to lookup the key has not yet been responded to by the xcrypt daemon (102).

If, at block 6060, the key_id on the device being read is not the same as the key_id that was stored in the device data structure for that device, then one of two conditions has occurred. One alternative is that the key_id changed (e.g., from key_id_1 to key_id_2), which can indicate that a device that was synchronized with, e.g., "source device A" has, since system reboot (or since the last time the device was opened), been made the replica of and synchronized with "source device B". Under this alternative, the device state is set to waiting for the key (block 6065) that goes with the unique_device_id currently in the device metadata. The other alternative is that the device went from no key_id in metadata at the time of system reboot/last device open to having a key_id in metadata, which can occur when an unencrypted device becomes synchronized with an encrypted device. In this situation, as well, the device state is set to waiting for the key that goes with the unique_device_id currently in the device metadata. For either case, the next step is to discard the keyblob in the device data structure (if applicable, i.e., if there is one to discard), as a correct one will be pushed into the kernel to the xcrypt manager 64 when the correct key is returned. The process of FIG. 11A starting at block 2090 is used to look up the key that goes with the key_id.

Figure 17:
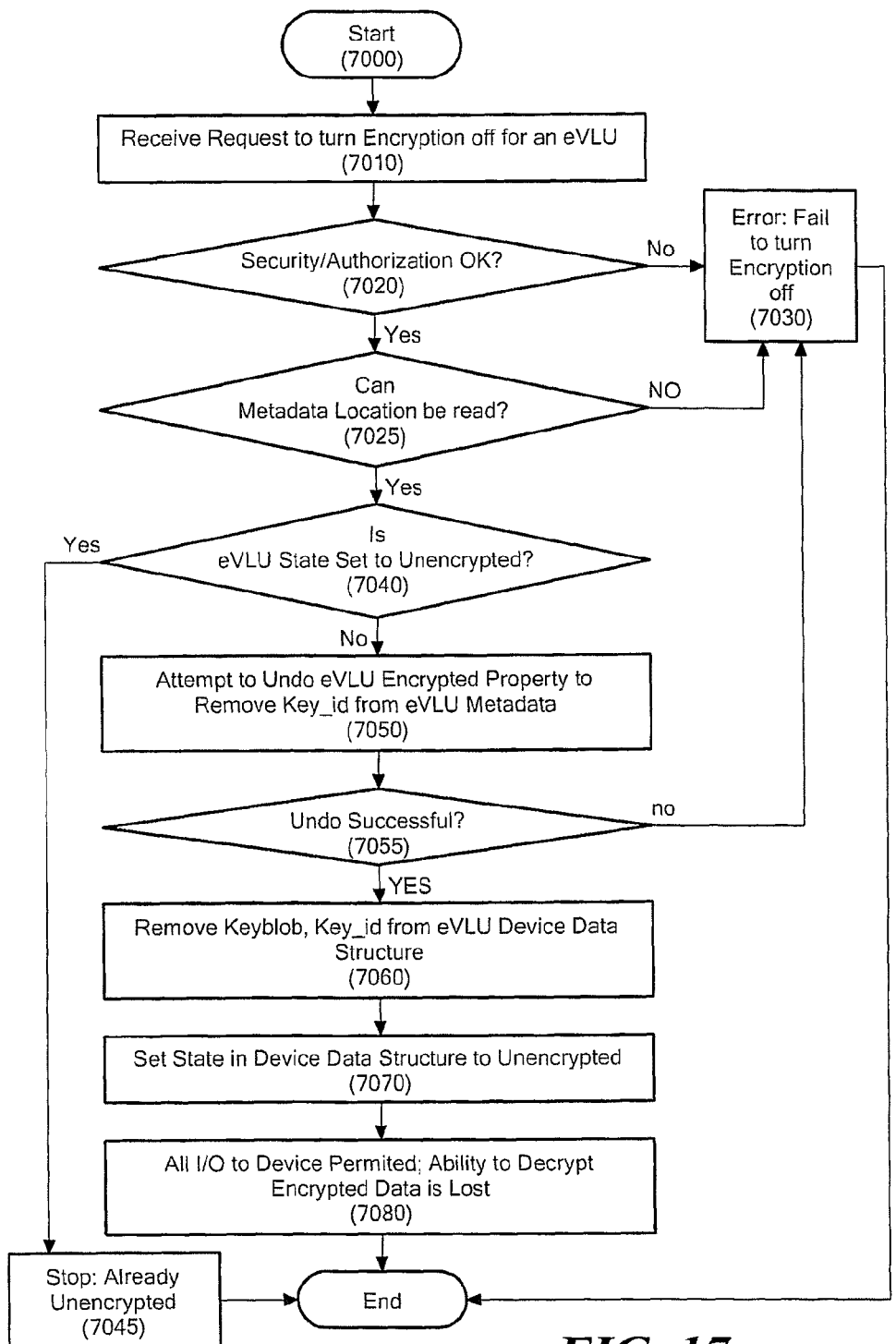
FIG. 17 is a flow chart showing a method for removing the encryption property of an eVLU, in accordance with one embodiment of the invention.

FIG. 17 is a flow chart showing a method for removing the encryption property of an eVLU, in accordance with one embodiment of the invention. In block 7010, a request is received to turn encryption off for a specific eVLU. In one embodiment, this is accomplished using the command powervt xcrypt-off, for the given device name. A security/authentication check is made (block 7020), to authenticate the user sending the command and to verify that the user has the appropriate security privileges. If not, the attempt to turn encryption off fails and an error is returned (block 7030).

If security is OK, a check is made to see if the metadata on the device can be read (as part of verifying that the device is, in fact, encrypted (block 7025)). If the metadata cannot be read, then the attempt to turn encryption off fails and an error is returned (block 7030). If the metadata location can be read, the metadata is checked to see if the eVLU is already unencrypted (e.g., by checking whether the metadata includes a device_id) (block 7040). If the device state is already unencrypted, then it is unnecessary to remove the encryption property and the process stops (block 7045).

If the device state is not unencrypted and the metadata location can be read, then the device is, in fact, encrypted (block 7050). An attempt is made to undo the eVLU encrypted property by attempting to remove the key_id from the metadata region of the eVLU (such as by setting a property of the key_id to null and size to zero, which indicates that the name/value pair for the key_id is no longer stored in the metadata.

If the attempt to undo the encryption property in metadata was unsuccessful (block 7055), then an error is returned. (Note that all processes from block 7025 on take place in the kernel). If the attempt was successful, then the keyblob and key_id are removed from the device data structure in the kernel 96 (block 7060). The device state is set in the device data structure to unencrypted. (Block 7070) and all I/O to the LU is permitted (including to unencrypted regions, if applicable), although ability to decrypt to the encrypted data is now lost (block 7080).

The methods disclosed herein are especially useful in computer systems utilizing an enterprise storage system; however, one of ordinary skill in the art will appreciate that the features and principles of the present invention may be implemented in many other types of computer systems. One of ordinary skill in the art will also appreciate that features and principles of the present invention may be implemented in different components of a computer system with at least one associated data storage subsystem.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

As those skilled in the art will recognize, the invention described herein can be modified to accommodate and/or comply with existing and/or newly developed technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

It should be understood that, in the Figures of this application, in some instances, a plurality of system elements or method steps may be shown as illustrative of a particular system element and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs. Moreover, the steps of the disclosed methods may be modified in any manner, including by reordering steps and/or inserting or deleting steps, without departing from the principles of the invention.

The processes, flow charts, and flow diagrams provided herein do not depict the syntax of any particular programming language. Rather, they illustrate the functional information one of ordinary skill in the art requires to fabricate circuits or to generate computer software to perform the processing required of the particular apparatus. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit and scope of the invention.

It is believed that computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C, C++, HTML, XML, or HTML with included Java applets. In addition, one or more of such software sections or modules can be integrated into computer system or browser software.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A method for establishing and controlling read/write access to at least one encrypted logical unit in operable communication with a host, the method comprising:
   providing an I/O filter driver to an I/O stack for a host in communication with a logical unit (LUN), the host disposed above the I/O filter driver in the I/O stack and the LUN being disposed below the I/O filter driver in the I/O stack;
   virtualizing the LUN into two logical entities, the first logical entity comprising an encrypted VLU (eVLU), the eVLU comprising an encrypted region, a plaintext data region, and a plaintext metadata region, the second logical entity comprising a virtual logical unit (VLU), the VLU comprising a logical representation of a portion of the eVLU as seen by entities disposed above the I/O filter driver in the I/O stack, the VLU comprising a plaintext version of information stored in the encrypted region and in the plaintext data region;
   configuring the encrypted region to store only encrypted data, such that write commands to the VLU go through the I/O filter driver, are encrypted using an encryption key, and are stored in the encrypted region of the eVLU as encrypted data, and wherein read commands to the VLU go through the I/O filter driver to be read from the encrypted region of the eVLU and are decrypted using the encryption key;
   configuring the plaintext data region to store only plaintext data, such that read/write commands to the plaintext region are permitted whether or not the I/O filter driver is available, wherein the plaintext data region of the eVLU corresponds to a predetermined region of the VLU, the predetermined region corresponding to a location that is accessed either by a process running on the system before the I/O filter driver is loaded to the system or by a process running below the I/O filter driver in the I/O stack, and wherein the I/O filter driver is configured to prevent any encrypted writes to the plaintext data region; and
   configuring the plaintext metadata region to store only plaintext metadata, the plaintext metadata comprising information relating to access to the encryption key, wherein the I/O filter driver is configured to prevent encrypted data from being written to the plaintext metadata region and is further configured to prevent read/write access to the metadata region by any entity except the I/O filter driver.

2. The method of claim 1, further comprising storing in the plaintext metadata region information defining the encrypted region, the plaintext data region, and the size of the plaintext metadata region.

3. The method of claim 1, further comprising storing in the I/O filter driver information defining the first encrypted region, the first plaintext data region, and the size of the first plaintext metadata region.

4. The method of claim 1, wherein:
   the first plaintext data region is further configured to store data that further comprises information available for read/write access to an operating system (OS) at the host even if the I/O filter driver is not loaded to the I/O stack.

5. The method of claim 1, further comprising:
   receiving a read/write request directed to the VLU prior to the I/O filter driver component being loaded to the I/O stack;
   permitting the read/write request if the read/write request is directed to a region of the VLU corresponding to the plaintext data region of the eVLU; and
   failing the read/write request if the read/write request is directed to a region of the VLU corresponding to the encrypted region of the eVLU.

6. The method of claim 1, further comprising:
   defining the first plaintext data region based at least in part on one of the operating system (OS), the type of LUN, and an arrangement of data on the LUN.

7. The method of claim 1, wherein the I/O filter driver is further configured to include encryption manager functions that enable the I/O filter driver to facilitate encryption of data written to the encrypted region and decryption of data read from the encrypted region.

8. The method of claim 1, wherein if the I/O filter driver has not yet been provided to the I/O stack of the system, permitting read/write access to the plaintext data region and to regions of the VLU corresponding to the plaintext data region and preventing all write access to the regions of the VLU corresponding to first encrypted region.

9. The method of claim 1, further comprising permitting an entity disposed below the I/O filter driver in the I/O stack to have read/write access to the first plaintext data region even if the I/O filter driver is not available.

10. The method of claim 1, further comprising setting a state of the eVLU, to be encrypted, such that the system stores in persistent memory that the state of the LUN is encrypted.

11. The method of claim 10, wherein if the I/O filter driver has been loaded to the I/O stack of the system and the encryption key is available, enabling the I/O filter driver to control all read/write access to the encrypted region.

12. The method of claim 10, wherein if the I/O filter driver has been loaded to the I/O stack of the system, the encryption key is not available, and a predetermined time limit has not expired, permitting read/write access only to the plaintext data region of the eVLU and to regions of the VLU corresponding to the plaintext data region of the eVLU, and pending all read/write access to the encrypted region of the VLU until the encryption key is available.

13. The method of claim 10, wherein if the I/O filter driver has been loaded to the I/O stack of the system, the encryption key is not available and a predetermined time limit has expired, permitting read/write access only to the plaintext data region of the eVLU and to regions of the VLU corresponding to the plaintext data region of the eVLU, and failing all read/write access to the encrypted region of the VLU.

14. The method of claim 1, wherein if the I/O filter driver has been loaded to the I/O stack of the system, and wherein a state of the VLU cannot be determined, permitting read/write access only to the region of the VLU corresponding to the plaintext data region of the eVLU and failing all read/write access to the encrypted region of the VLU.

15. The method of claim 1, wherein the plaintext data region is configured to store data that comprises at least one of the following:
   (a) information used by a predetermined entity disposed in the I/O stack below the I/O filter driver;
   (b) information used by a predetermined entity prior to the I/O filter driver being loaded to the I/O stack; and
   (c) information used by an operating system running on the host;

16. The method of claim 1, further comprising storing the state of at least one of the VLU and eVLU in a persistent memory location.

17. A system for controlling read/write access to an encrypted virtual logical unit (eVLU), the system comprising:
- an input/output (I/O) filter driver disposed within an I/O stack of the system, wherein the I/O filter driver is disposed on the I/O stack between a host and a logical unit (LUN);
- a first logical entity configured as a first virtualization of the LUN, the first logical entity comprising an encrypted VLU (eVLU), the eVLU comprising an encrypted region, a plaintext data region, and a plaintext metadata region;
- a second logical entity configured as a second virtualization of the LUN, wherein the second logical entity comprising a virtual logical unit (VLU), the VLU comprising a logical representation of a portion of the eVLU as seen by entities disposed above the I/O filter driver in the I/O stack, the VLU comprising a plaintext version of information stored in the encrypted region and in the plaintext data region;
- wherein the encrypted region is configured to store only encrypted data, such that write commands to the VLU go through the I/O filter driver, are encrypted using an encryption key, and are stored in the encrypted region of the eVLU as encrypted data, and wherein read commands to the VLU go through the I/O filter driver to be read from the encrypted region of the eVLU and are decrypted using the encryption key;
- wherein the plaintext data region is configured to store only plaintext data, such that read/write commands to the plaintext region are permitted whether or not the I/O filter driver is available, wherein the plaintext data region of the eVLU corresponds to a predetermined region of the VLU, the predetermined region corresponding to a location that is accessed either by a process running on the system before the I/O filter driver is loaded to the system or by a process running below the I/O filter driver in the I/O stack, and wherein the I/O filter driver is configured to prevent any encrypted writes to the plaintext data region; and
- wherein the plaintext metadata region is configured to store only plaintext metadata, the plaintext metadata comprising information relating to access to the encryption key, wherein the I/O filter driver is configured to prevent encrypted data from being written to the plaintext metadata region and is further configured to prevent read/write access to the metadata region by any entity except the I/O filter driver.

18. The system of claim 17, wherein the I/O filter driver is further comprises an encryption manager that enables the I/O filter driver to facilitate encryption of data written to the encrypted region and decryption of data read from the encrypted region.

19. The system of claim 17, wherein the I/O filter driver is configured to the system in a way such that access requests to the VLU can be received before the I/O filter driver is loaded to the I/O stack of the system, and wherein the persistent storage device stores information indicating that, if the state of the VLU is set to encrypted and the I/O filter driver has not been loaded to the I/O stack of the system, read/write access is permitted only to the plaintext data region of the VLU and write access to the encrypted region of the VLU is prohibited.

20. The system of claim 17, wherein the plaintext data region is configured to store data that comprises at least one of the following:
- (a) information used by a predetermined entity disposed in the I/O stack below the I/O filter driver,
- (b) information used by a predetermined entity prior to the I/O filter driver being loaded to the I/O stack; and
- (c) information used by an operating system running on the host.

* * * * *